(12) United States Patent
Takikawa et al.

(10) Patent No.: US 8,163,840 B2
(45) Date of Patent: Apr. 24, 2012

(54) POLYESTER RESIN FOR TONER, TONER COMPOSITION AND RESIN PARTICLE

(75) Inventors: Tadao Takikawa, Kyoto (JP); Shuhei Yahiro, Kyoto (JP)

(73) Assignee: Sanyo Chemical Industries, Ltd, Kyoto (JP)

( * ) Notice: Subject to any disclaimer, the term of this patent is extended or adjusted under 35 U.S.C. 154(b) by 0 days.

(21) Appl. No.: 13/091,342

(22) Filed: Apr. 21, 2011

(65) Prior Publication Data

US 2011/0200931 A1    Aug. 18, 2011

Related U.S. Application Data

(62) Division of application No. 10/581,974, filed as application No. PCT/JP2004/018508 on Dec. 10, 2004, now Pat. No. 7,951,518.

(30) Foreign Application Priority Data

Dec. 10, 2003 (JP) .................. 2003-412519
Feb. 25, 2004 (JP) .................. 2004-050305
May 19, 2004 (JP) .................. 2004-149723
May 31, 2004 (JP) .................. 2004-162599
Jun. 30, 2004 (JP) .................. 2004-192449
Jun. 30, 2004 (JP) .................. 2004-192592

(51) Int. Cl.
*C08G 63/60* (2006.01)
*G03G 9/00* (2006.01)

(52) U.S. Cl. ...... 524/599; 524/601; 528/272; 430/109.4

(58) Field of Classification Search .................. 524/599, 524/601; 528/272; 430/109.4

See application file for complete search history.

(56) References Cited

U.S. PATENT DOCUMENTS

| 4,977,054 A | 12/1990 | Honjo et al. |
| 5,015,724 A | 5/1991 | Kawabe |
| 5,116,713 A | 5/1992 | Uchida et al. |
| 5,266,432 A | 11/1993 | Hayashi et al. |
| 5,324,612 A | 6/1994 | Maeda et al. |
| 2003/0134215 A1 | 7/2003 | Kashiwabara et al. |
| 2003/0158372 A1 | 8/2003 | Shirai et al. |

FOREIGN PATENT DOCUMENTS

| JP | 56-065146 A | 6/1981 |
| JP | 03-050561 | 3/1991 |
| JP | 05-224461 A | 9/1993 |

(Continued)

OTHER PUBLICATIONS

Japanese Office Action and Summary thereof (in English language) describing the relevant parts of the Japanese Office Action.

*Primary Examiner* — Mark A Chapman
(74) *Attorney, Agent, or Firm* — Edwards Wildman Palmer LLP; Jun Umemuro; Lisa Swiszcz

(57) ABSTRACT

Disclosed is a heat-fusible electrostatic image developing toner which has an excellent balance between fixability at low temperatures and grindability and is excellent in glossiness after fixing. Also disclosed is a resin for toners. A polyester resin for toners which is obtained by polycondensing a polyol component and a polycarboxylic acid component is characterized by containing 20-100 weight % of one or more polyester resins (A1) having a storage elastic modulus from $2.5 \times 10^3$ Pa to $5 \times 10^6$ Pa at 150° C. wherein the molar average cohesive energy of the polyol component is between $7.0 \times 10^4$ and $1.4 \times 10^5$ J.

7 Claims, 1 Drawing Sheet

FOREIGN PATENT DOCUMENTS

| | | |
|---|---|---|
| JP | 06-003857 | 1/1994 |
| JP | 06-019197 | 1/1994 |
| JP | 07-013385 A | 1/1995 |
| JP | 08-101530 A | 4/1996 |
| JP | 08-194336 A | 7/1996 |
| JP | 10-078679 | 3/1998 |
| JP | 10-254170 | 9/1998 |
| JP | 10-260547 | 9/1998 |
| JP | 11-302361 | 11/1999 |
| JP | 11-305485 | 11/1999 |
| JP | 2003-005444 | 1/2003 |
| JP | 2003-107798 | 4/2003 |
| JP | 2003-176339 A | 6/2003 |
| JP | 2003-201342 A | 7/2003 |
| JP | 2003-207940 | 7/2003 |
| JP | 2003-231744 A | 8/2003 |
| JP | 2003-246920 A | 9/2003 |
| JP | 2003-262978 | 9/2003 |
| JP | 2003-302788 A | 10/2003 |

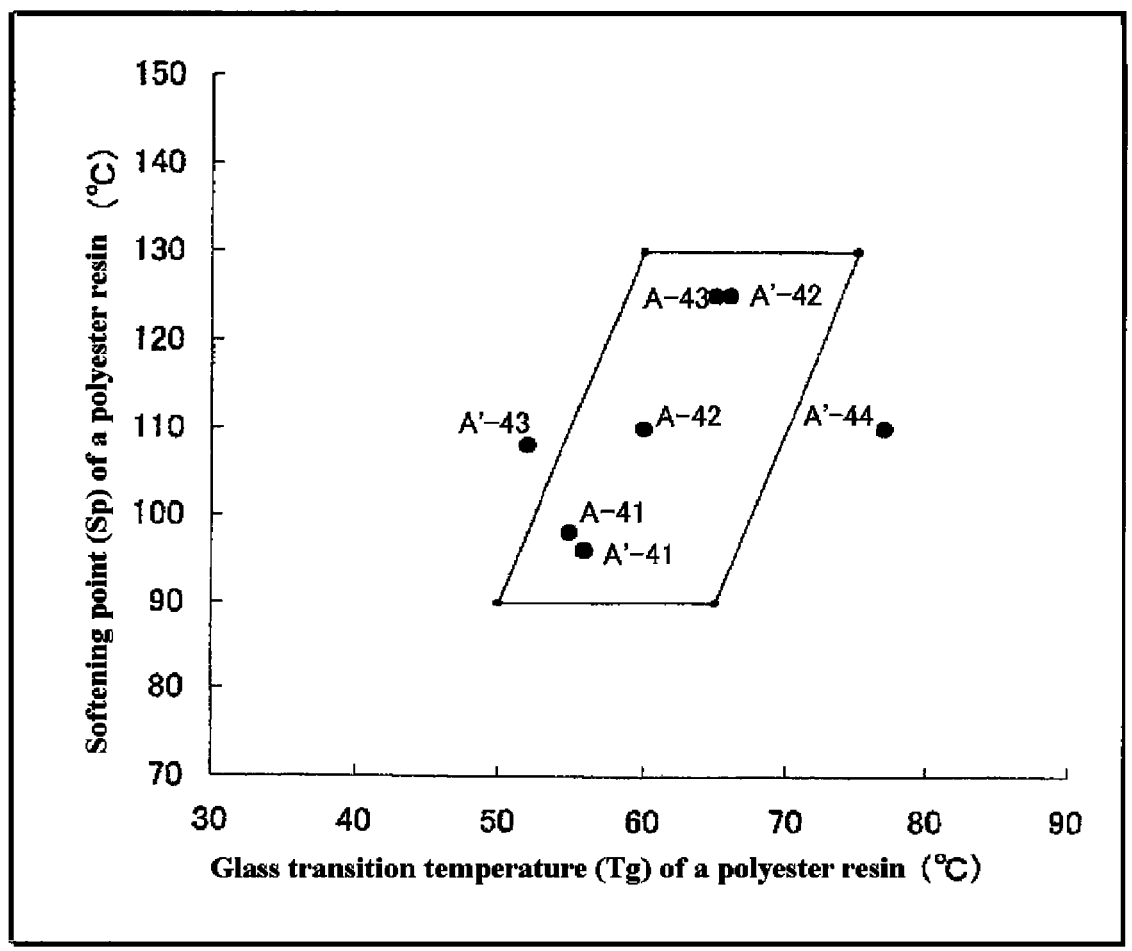

POLYESTER RESIN FOR TONER, TONER COMPOSITION AND RESIN PARTICLE

RELATED APPLICATIONS

This application is a divisional of U.S. application Ser. No. 10/581,974, filed Apr. 23, 2007, which is a U.S. national phase application, pursuant to 35 U.S.C. §371, of PCT/JP2004/018508, filed Dec. 10, 2004, which claims the benefit of priority of Japanese Patent Application Nos. JP 2003-412519, filed Dec. 10, 2003, JP 2004-050305, filed Feb. 25, 2004, JP 2004-149723, filed May 19, 2004, JP 2004-162599, filed May 31, 2004, JP 2004-192592, filed Jun. 30, 2004, and JP 2004-192449, filed Jun. 30, 2004. These applications are hereby incorporated herein by reference in their entireties.

TECHNICAL FIELD

The invention relates to a resin for a toner and a toner composition to be used for electrophotography, electrostatic recording, and electrostatic printing.

Moreover, the invention relates to resin particles. More particularly, the invention relates to resin particles useful for various uses such as a resin for slush molding, a powder coating, an electrophotographic toner, an electrostatic recording toner, an electrostatic printing toner, or hot-melt adhesive.

BACKGROUND ART

A toner for developing an electrostatic image to be used for a heat fixing method is required to be not fuse with a heat roll even at a high fixing temperature (hot offset resistance); fixed even at a low fixing temperature (low temperature fixing property); and good in the grindability of a resin thereof used in producing the toner. Generally the low temperature fixing property and the grindability of the resin at the time of toner production tend to be mutually contradictory properties. As a toner excellent in the low temperature fixing property and good in the grindability of the resin at the time of toner production is disclosed a toner containing a resin for a toner containing a specified amount of a monovalent aliphatic compound having 10 to 24 carbon atoms as a monomer component (reference to Patent Document No. 1).

Also, as an attempt to provide a toner that satisfies the low temperature fixing property and is free from high temperature offset, a toner having a loss tangent (tan δ) in a range from 1.0 or higher and lower than 2.0 in the case the loss modulus G" is in a range from $1 \times 10^4$ Pa to $1 \times 10^6$ Pa, and a loss tangent (tan δ) in a range from 0.5 or higher and lower than 1.0 in the case the loss modulus G" is $1 \times 10^3$ Pa is disclosed (reference to Patent Document No. 2).

However, although the toner proposed in Patent Document No. 1 is excellent in the low temperature fixing property, it is required to be improved in both low temperature fixing property and grindability for speed up and saving energy. Also, the toner proposed in Patent Document No. 2 is good in the low temperature fixing property and high temperature offset properties, however it is insufficient to give satisfactory image quality for the use of color images required to have luster.

To improve the moisture resistance and fixing capability of a polyester toner, it is known that long chain aliphatic hydrocarbon units are introduced into the main chains or side chains of polyester resins by co-condensing tri- or higher valent polyhydric alcohols with long chain aliphatic dicarboxylic acids or dicarboxylic acids having long chain aliphatic side chains (reference to Patent Document No. 3).

However, in these polyester resins, since sebacic acid or the like is used as a long chain aliphatic dicarboxylic acid and dodecenylsuccinic acid or the like as a dicarboxylic acid having a long chain aliphatic side chain is used, the number of carbon atoms of the aliphatic hydrocarbon unit to be introduced become so high and although the moisture resistance and fixing property of a toner are improved, the glass transition temperature (Tg) of the polyester resins is lowered to lead to a problem that the storage stability of a toner is deteriorated.

A toner for electrostatic image development to be used for a heat fixing method is required to be not fuse with a heat roll even at a high fixing temperature (hot offset resistance) and fixed even at a low fixing temperature (low temperature fixing property). To prevent hot offset, use of a wax is effective and to improve the low temperature fixing property, it is effective to use a polyester type resin as a binder for a toner.

However, compatibility of a wax and a polyester type resin is poor and the dispersion particle diameter of the wax becomes large in a toner. Accordingly, it results in fixing or filming of the wax on a photoconductor to deteriorate image quality or charging failure to deteriorate image quality. To solve these problems, Patent Document No. 4 proposes use of graft polymers having a graft structure formed by grafting styrene type polymer chains or styrene-(meth)acrylic polymer chains to wax components. Accordingly, the wax particle diameter in a toner is made controllable and toners which are excellent in hot offset resistance and do not cause filming or image deterioration are proposed.

However, the toners proposed in the Document are insufficient from a viewpoint of the low temperature fixing property although being effective in the hot offset resistance and causing no filming or image deterioration.

As particles having uniform particle diameter and shape and excellent in the electric property, thermal property, and chemical stability have been known resin particles obtained by a suspension method of removing organic solvents from suspensions of water-based media and mixed solutions containing resins and the organic solvents (reference to Patent Document No. 5).

However, with respect to resin particles to be used for heat fixing method/heat processing method, they are further required to be suitable for fixing and melting even at a low temperature from a viewpoint of saving energy and the resin particles described in Patent Document No. 5 are not necessarily sufficient as resins for slush molding, a powder coating, an electrophotographic toner, an electrostatic recording toner, an electrostatic printing toner, or hot-melt adhesive.

Patent Document No. 1: Japanese Patent Laid-Open (JP-A) No. 2003-337443
Patent Document No. 2: JP-A No. 2003-280241
Patent Document No. 3: JP-A No. 62-78568
Patent Document No. 4: JP-A No. 2001-134009
Patent Document No. 5: JP-A No. 2001-166538

DISCLOSURE OF THE INVENTION

Problems to be Solved by the Invention

An object of the invention is to provide resin particles for a toner excellent in low temperature fixing property and having good grindability of the resin at toner production.

Another object of the invention is to provide resin particles for a toner also having good luster.

Another object of the invention is to provide resin particles for a toner having good moisture resistance and fixing property when used for a toner and giving excellent storage stability of a toner.

Another object of the invention is to provide a resin composition for a toner giving a toner excellent in hot offset resistance without inducing defective image formation and excellent in low temperature fixing property.

Further, another object of the invention is to provide a non-magnetic single component type toner excellent in low temperature fixing property, grindability of the resin at toner production, and excellent in luster and transparency as a color toner.

Further, another object of the invention is to provide resin particles excellent in fixing property and heat melting property and having uniform particle diameter and shape by a suspension method.

Means for Solving the Problems

The present inventors made studies of solution to this problem and consequently have accomplished the invention.

That is, the invention includes the following 8 inventions:
[1] a polyester resin for a toner obtained by polycondensing a polyol component and a polycarboxylic acid component, wherein the polyol component has a molar average cohesive energy of $7.0 \times 10^4$ to $1.4 \times 10^5$ J and the polyester resin contains 20 to 100% by weight of at least one kind of polyester resin (A1) having a storage modulus in a range of $2.5 \times 10^3$ Pa to $5 \times 10^6$ Pa at 150° C.;
[2] a polyester resin for a toner obtained by polycondensing a polyol component and a polycarboxylic acid component, wherein the polyester resin contains 20 to 100% by weight of at least one kind of polyester resin (A2) having a softening point in a range from 120° C. to 180° C. and a loss tangent of 0.9 or higher at a temperature in a range from 130° C. to 200° C.;
[3] a polyester resin for a toner obtained by polycondensing a polyol component and a polycarboxylic acid component, wherein the polycarboxylic acid component comprises 80 to 100% by mole of terephthalic acid, isophthalic acid, and/or a lower alkyl (carbon atoms of the alkyl: 1 to 4) ester of them (a); the polyol component comprises 20 to 100% by mole of an aliphatic diol (80 to 100% by mole of the aliphatic diol is 1,2-propylene glycol) (b); and 0.1 to 20% by mole of the total of the polyol component and the polycarboxylic acid component are tri- or higher valent polyhydric alcohol and/or tri- or higher valent polycarboxylic acid (c) and the polyester resin has a softening point in a range from 95 to 160° C. and a glass transition temperature (Tg) in a range from 45 to 75° C.;
[4] a polyester resin composition for a toner described in one of [1] to [3] and an additive (B) for a toner comprising a modified wax (w1) produced by modifying at least a part of a wax (w) with a vinyl monomer (m);
[5] a toner composition containing the polyester resin for a toner as described in one of [1] to [3], a colorant, and if necessary, one or more kinds of additives selected from the group consisting of a release agent, a charge control agent, and a fluidizing agent;
[6] a non-magnetic single component toner to be used in an image formation method of developing a latent image by supplying a toner to a latent image carrier, wherein the toner comprises the polyester resin for a toner (A1), (A2), or (A3) as described in one of claims 1 to 3 and a colorant and has physical properties within an area surrounded by straight lines defined by the following equations (1) to (4) in xy-coordinates of glass transition temperature (Tg) of (A1), (A2), or (A3) as a variant in x-axis and softening point (sp) in y-axis, and one or more kinds of fine particles additives being situated on the surface of the toner particles.

$$sp=4Tg-110, \qquad \text{equation (1):}$$

$$sp=4Tg-170, \qquad \text{equation (2):}$$

$$sp=90, \text{ and} \qquad \text{equation (3):}$$

$$sp=130; \qquad \text{equation (4):}$$

[7] a resin particle comprising a resin (K) and an optional additive wherein the resin particle is obtained by removing a solvent from a water-based dispersion of (I) an oil based mixed solution containing at least the resin (K) and an organic solvent and (II) a water-based medium, wherein the resin (K) comprises one or more kinds of polyester resins (K1) obtained by polycondensing a polyol component and a polycarboxylic acid component and a tetrahydrofuran-soluble fraction of the resin(s) (K1) has a number average molecular weight of 1000 to 9500 and the polyol component comprises 85 to 100% by mole of an aliphatic diol having 2 to 6 carbon atoms or 70 to 100% by mole of 1,2-propylene glycol; and
[8] a composite resin particle comprising a resin particle (P) comprising a resin (p) and an optional additive and a resin particle (Q) comprising a resin (q) and an optional additive and adhering to the surface of the resin particle (P), wherein the resin (p) comprises one or more kinds of polyester resins (p1) obtained by polycondensing a polyol component and a polycarboxylic acid component and the polyol component comprises 85 to 100% by mole of an aliphatic diol having 2 to 6 carbon atoms or 70 to 100% by mole of 1,2-propylene glycol and a tetrahydrofuran-soluble fraction of the resin(s) (p1) has a number average molecular weight of 1000 to 9500, or the resin (p) comprising a resin (p2) containing the resin (p1) as a component unit.

Effects of the Invention

A toner excellent in low temperature fixing property can be obtained by using the polyester resins for a toner and toner composition of the first, second, and fifth inventions. Further, since the grindability of the resin at toner production is excellent, toner production is carried out economically at the time industrial production. Further, since high temperature offset does not occur at a temperature in a range from 130° C. to 200° C., the toner surface is kept smooth after fixing to give an image with luster.

The polyester resin of the third invention is excellent in blocking resistance, melt fluidity, low temperature fixing property, and electrostatic property even in a high moisture condition. Further, it has good resin properties even in the case no tin compound is used as a catalyst.

A toner excellent in hot offset resistance without inducing defective image formation and excellent in low temperature fixing property can be obtained by using the polyester resin composition of the fourth invention.

Use of the toner of the sixth invention gives excellent low temperature fixing property and luster and transparency as a color toner. Further, since the grindability of the resin at toner production is excellent, toner production is carried out economically at the time industrial production.

The resin particles of the seventh and eighth inventions have the following effects:
1. excellent in low temperature melting property and low temperature fixing property and thus saving energy consumption at the time of melting process and printing;

2. having uniform particle diameter and excellent in powder fluidity and storage stability;
3. being obtained by dispersion in water and thus produced at a low cost; and
4. having good heat resistance and giving a coating with good mechanical properties.

BRIEF DESCRIPTION OF THE DRAWINGS

FIG. 1 is a graph showing the relation between the glass transition temperature (Tg) and the softening point (Sp) of a polyester resin of the invention.

BEST MODES FOR CARRYING OUT THE INVENTION

Hereinafter, the invention will be described in detail.

The molar average cohesive energy of a polyol to be a component of the polyester resin (A1) of the first invention is generally $7.0 \times 10^4$ to $1.4 \times 10^5$ J. The lower limit is preferably $7.05 \times 10^4$ J and more preferably $7.1 \times 10^4$ J. The upper limit is preferably $1.25 \times 10^5$ J and more preferably $1 \times 10^5$ J. If the molar average cohesive energy is $7.0 \times 10^4$ J or higher, thermal storage property is excellent and if it is $1.4 \times 10^5$ J or lower, grindability is excellent.

The storage modulus of the resin (A1) consisting of the polyol having the above-mentioned molar average cohesive energy at 150° C. is generally in a range of $2.5 \times 10^3$ Pa to $5 \times 10^6$ Pa. The lower limit is preferably $3.0 \times 10^3$ Pa and more preferably $3.2 \times 10^3$ Pa and the upper limit is preferably $4.5 \times 10^6$ Pa and more preferably $4.3 \times 10^6$ Pa. If it is $2.5 \times 10^3$ Pa or higher, hot offset becomes excellent and if it is $5 \times 10^6$ Pa lower, the low temperature fixing property becomes excellent.

In the case two or more kinds of polyols are used, the component mole ratio of respective polyols is calculated from the amounts of used polyols and the amounts of recovered polyols at the time of reaction.

With respect to the molar average cohesive energy, it is described in Fedors et al, Polymer Engineering and Science, February, 1974, vol. 14, No. 2, p. 147-154.

To adjust the molar average cohesive energy, since the cohesive energy is an intrinsic value of each polyol, the mole ratio of polyols should be controlled. To adjust the storage modulus of a resin, for example, the molecular weight of the resin and the number of crosslinking points should be adjusted.

A polyester resin (A1) of the first invention is preferably a polyester resin (A2) of the second invention to be described later and/or a polyester resin (A3) of the third invention to be described later.

The softening point of the polyester resin (A2) of the second invention is generally in a range from 120° C. to 180° C. The lower limit is preferably 125° C. and more preferably 130° C. and the upper limit is preferably 175° C. If the softening point is 120° C. or higher, the hot offset resistance is improved and if it is 180° C. or lower, the low temperature fixing property is improved.

In the invention, the softening point is measured by using a flow tester CFT-500 manufactured by Shimadzu Corp., unless otherwise specified, in the following isokinetic heating conditions and defined as a point at which the flow rate becomes 1/2:
Load: 20 kg,
Die: 1 mmφ-1 mm, and
Heating speed: 6° C./min.

The loss tangent of the resin (A2) at a temperature in a range from 130° C. to 200° C. is generally 0.9 or higher, preferably 1.0 or higher, more preferably 1.02 or higher, furthermore preferably 1.05 to 30, and even more preferably 1.1 to 20. The luster is improved with the loss tangent of 0.9 or higher.

To adjust the softening point and loss tangent of the resin, for example, the molecular weight of the resin and the number of crosslinking points should be adjusted.

In the invention, the storage modulus and loss tangent of a polyester resin is measured by the following elastic modulus measurement apparatus:
Apparatus: ARES-24A (Rheometric Ltd.),
Tool; 25 mm parallel plates,
Frequency: 20 Hz,
Strain ratio: 5%, and
Heating speed: 5° C./min.

The loss tangent in temperature in a range from 130° C. to 200° C. is read in a graph obtained by plotting the measured values and showing the correlation between the temperature-loss tangent.

The polyester resin (A2) of the second invention is preferably the polyester resin (A1) of the first invention and/or the polyester resin (A3) of the third invention.

The polyester resin (A1) or (A2) to be used in the first and second invention is obtained generally by polycondensing at least one kind of polyol components and at least one kind of polycarboxylic acid components.

The polyol component to be used for the resin (A1) or (A2) is preferable to comprise 30 to 100% by mole of an aliphatic diol having 2 to 6 carbon atoms. Further, it is preferable that 1,2-propylene glycol is contained at least as a portion in the diol. The content of the aliphatic diol having 2 to 6 carbon atoms in the polyol component is more preferably 70 to 100% by mole, furthermore preferably 85 to 100% by mole, even more preferably 90 to 100% by mole, and most preferably 100% by mole. If the content is 30% by mole or higher, the resin strength becomes high and the low temperature fixing property is improved.

Examples of the aliphatic diol having 2 to 6 carbon atoms are alkane dials such as ethylene glycol, 1,2-propylene glycol, 1,3-propylene glycol, 1,4-butanediol, 2,3-butanediol, 1,5-pentanediol, 2,3-pentanediol, 1,6-hexanediol, 2,3-hexanediol, 3,4-hexanediol, and neopentyl glycol and two or more of them may be used in combination. Among them, ethylene glycol, 1,2-propylene glycol, and neopentyl glycol are preferable; ethylene glycol and 1,2-propylene glycol are more preferable; and 1,2-propylene glycol is furthermore preferable.

It is also preferable that the polyol component comprises 30 to 100% by mole of 1,2-propylene glycol and 0 to 30% by mole of another polyol containing an aliphatic diol having 2 to 6 carbon atoms other than 1,2-propylene glycol. In this case, the content of 1,2-propylene glycol in the polyol component is more preferably 70 to 100% by mole, furthermore preferably 85 to 100% by mole, even more preferably 90 to 100% by mole, and most preferably 100% by mole. If the content is 30% by mole or higher, the resin strength becomes high and the low temperature fixing property is improved.

The polyol component may contain polyhydric alcohols other than the aliphatic diol having 2 to 6 carbon atoms.

Examples of dihydric alcohol (dialcohol) among the polyhydric alcohols may include aliphatic diol having 7 to 36 carbon atoms (e.g. 1,7-heptanediol and dodecanediol); polyalkylene ether glycol having 4 to 36 carbon atoms (e.g. diethylene glycol, dipropylene glycol, polyethylene glycol, and polypropylene glycol); adducts (addition molar number 2 to 30) of alkylene oxides (hereinafter, abbreviated as AO) [e.g. ethylene oxide (hereinafter, abbreviated as EO) and propylene oxide (hereinafter, abbreviated as PO), and butylene oxide] having 2 to 4 carbon atoms and aliphatic diols having 2 to 6 and 7 to 36 carbon atoms; alicyclic diol having 6 to 36 carbon atoms (e.g. 1,4-cyclohexan dimethanol, hydrogenated bisphenol A); adducts (addition molar number 2 to 30) of AO having 2 to 4 carbon atoms to alicyclic diols; and adducts (addition molar number 2 to 30) of AO having 2 to 4 carbon atoms to bisphenols (e.g. bisphenol A, bisphenol F, and bisphenol S).

Examples of tri- to octa-hydric or higher hydric alcohols among the polyhydric alcohols are aliphatic tri- to octa-hydric or higher hydric alcohols having 3 to 36 carbon atoms (e.g. glycerin, triethylolethane, trimethylolpropane, pentaerythritol, sorbitol, 1,2,4-butane-triol, 2-methyl-1,2,3-propanetriol, 2-methyl-1,2,4-butanetriol, 1,2,5-pentanetriol, and 1,3,5-trihydroxymethylbenzene); adducts (addition molar number 2 to 30) of AO having 2 to 4 carbon atoms to the above-mentioned aliphatic polyhydric alcohols; adducts (addition molar number 2 to 30) of AO having 2 to 4 carbon atoms to trisphenols (e.g. trisphenol PA); and adducts (addition molar number 2 to 30) of AO having 2 to 4 carbon atoms to novolak resins (e.g. phenol novolak and cresol novolak; average polymerization degree of 3 to 60).

Preferable examples among them are polyalkylene ether glycol having 4 to 36 carbon atoms, alicyclic diols, adducts of AO having 2 to 4 carbon atoms to alicyclic diols having 6 to 36 carbon atoms, adducts of AO having 2 to 4 carbon atoms to bisphenols, adducts of AO having 2 to 4 carbon atoms to novolak resins; and more preferable examples are adducts of AO having 2 to 3 carbon atoms (EO and PO) to bisphenols and adducts of AO having 2 to 3 carbon atoms (EO and PO) to novolak resins.

Examples of the aliphatic (including alicyclic) dicarboxylic acids as the polycarboxylic acid component are alkanedicarboxylic acids having 2 to 50 carbon atoms (e.g. oxalic acid, malonic acid, succinic acid, adipic acid, lepargylic acid, and sebacic acid) and alkenedicarboxylic acids having 4 to 50 carbon atoms (e.g. alkenylsuccinic acid such as dedecenylsuccinic acid, maleic acid, fumaric acid, citraconic acid, mesaconic acid, itaconic acid, and glutaconic acid).

Examples of the aromatic dicarboxylic acids are aromatic dicarboxylic acids having 8 to 36 carbon atoms (e.g. phthalic acid, isophthalic acid, terephthalic acid, and naphthalenedicarboxylic acid).

Examples of the aliphatic (including alicyclic) tri- to hexa- or higher valent polycarboxylic acids as the polycarboxylic acid component are aliphatic tricarboxylic acids having 6 to 36 carbon atoms (e.g. hexanetricarboxylic acid) and vinyl polymers of unsaturated carboxylic acids [number average molecular weight (hereinafter abbreviated as Mn) measured by gel permeation chromatography (GPC): 450 to 10000] (e.g. α-olefin/maleic acid copolymers).

Examples of the tri- to hexa- or higher aromatic polycarboxylic acids as the polycarboxylic acid component are aromatic polycarboxylic acids having 9 to 20 carbon atoms (trimellitic acid and pyromellitic acid) and vinyl polymers of unsaturated carboxylic acids [Mn: 450 to 10000] (e.g. styrene/maleic acid copolymers, styrene/acrylic acid copolymers, and styrene/fumaric acid copolymers).

As the polycarboxylic acid component are usable anhydrides and lower alkyl (having 1 to 4 carbon atoms) esters (methyl esters, ethyl esters, and isopropyl esters) of these polycarboxylic acids.

Preferable examples among these polycarboxylic acid components are alkanedicarboxylic acids having 2 to 50 carbon atoms, alkenedicarboxylic acids having 4 to 50 carbon atoms, aromatic dicarboxylic acids having 8 to 20 carbon atoms, and aromatic polycarboxylic acids having 9 to 20 carbon atoms; more preferable examples are adipic acid, alkenylsuccinic acid having 16 to 50 carbon atoms, terephthalic acid, isophthalic acid, maleic acid, fumaric acid, trimellitic acid, pyromellitic acid, and combinations of these acids; even more preferable examples are adipic acid, terephthalic acid, trimellitic acid, and combinations of these acids. Anhydrides and lower alkyl esters of these acids are also preferable.

Further, as the polycarboxylic acid component, those consisting of an aromatic polycarboxylic acid and an aliphatic polycarboxylic acid and having a content of the aromatic polycarboxylic acid in a range of 60% by mole or higher are preferable. The lower limit of the content of the aromatic polycarboxylic acid is more preferably 70% by mole and even more preferably 80% by mole, and upper limit is preferably 99% by mole and even more preferably 98% by mole. If the content of the aromatic polycarboxylic acid is 60% by mole or higher, the resin strength is increased and the low temperature fixing property is further improved.

The polyester resin (A3) for a toner of the third invention is obtained by polycondensing one or more kinds of polyol components and one or more polycarboxylic acid components and the polycarboxylic acid component comprises 80 to 100% by mole of terephthalic acid, isophthalic acid, and/or a lower alkyl (carbon atoms of the alkyl: 1 to 4) ester of them (a); the polyol component comprises 20 to 100% by mole of an aliphatic diol (80 to 100% by mole of the aliphatic diol is 1,2-propylene glycol) (b); and 0.1 to 20% by mole of the total of the polyol component and the polycarboxylic acid component are tri- or higher valent polyhydric alcohol and/or tri- or higher valent polycarboxylic acid (c).

The polyester resin (A3) for a toner of the third invention is also preferably the polyester resin (A1) of the first invention and/or the polyester resin (A2) of the second invention.

The above-mentioned (a) means terephthalic acid, isophthalic acid, and/or a lower alkyl (carbon atoms of the alkyl: 1 to 4) ester of them and that the esters of lower alkyl having 1 to 4 carbon atoms includes hydroxyalkyl esters.

Practical examples of the lower alkyl ester are dimethyl terephthalate, dimethyl isophthalate, diethyl terephthalate, diethyl isophthalate, dibutyl terephthalate, dibutyl isophthalate, terephthalic acid propylene glycol diester, and isophthalic acid propylene glycol diester. Among of (a), in terms of the reaction speed and cost, terephthalic acid, isophthalic acid, dimethyl terephthalate, dimethyl isophthalate, terephthalic acid propylene glycol diester and isophthalic acid propylene glycol diester are preferable.

Since the component (a) has an effect to increase the glass transition temperature (hereinafter, referred to as Tg) of the polyester resin to be obtained and thereby improve the blocking resistance of a toner, it is contained in a range generally from 80 to 100% by mole, preferably from 85 to 100% by mole, and even more preferably from 90 to 100% by mole in the total polycarboxylic acid component.

Examples usable as a dicarboxylic acid other than (a) in the polycarboxylic acid component composing the polyester resin are the above exemplified alkane dicarboxylic acids having 2 to 50 carbon atoms, alkene dicarboxylic acids having 4 to 50 carbon atoms, aromatic dicarboxylic acid having 8 to 36 carbon atoms other than (a) (e.g. naphthalenedicarboxylic acid); anhydrides and lower alkyl (having 1 to 4 carbon atoms) esters [e.g. phthalic acid (anhydride)]. They may be used alone or two or more kinds of them may be used in combination.

In the third invention, the aliphatic diol (b) includes the above-mentioned aliphatic diols having 2 to 6 carbon atoms, the above-mentioned aliphatic dials having 7 to 36 carbon atoms, polyalkylene ether glycol having 4 to 36 carbon atoms; adducts of AO having 2 to 4 carbon atoms to the aliphatic diols having 2 to 6 and 7 to 36 carbon atoms; alicyclic diols having 3 to 36 carbon atoms; and adducts of AO having 2 to 4 carbon atoms to the alicyclic dials and they may be used alone or two or more of them may be used in combination.

Particularly, in terms of the balance between the fixing property of a toner and environment-dependency, it is preferably that 80% by mole or more of the aliphatic diol to be used is 1,2-propylene glycol. As other aliphatic dials other than 1,2-propylene glycol are preferably ethylene glycol, 1,4-butanediol, neopentyl glycol, and 1,4-cyclohexanedimethanol. Since these dials as (b) have an effect to lower the melt viscosity of the polyester resin, the fixing property of the toner is improved. The content is preferably 20 to 100% by mole, more preferably 45 to 100% by mole, furthermore preferably 60 to 100% by mole, and most preferably 70 to 100% by mole in the total of the polyol component. If the content of (b) is 20% by mole or higher, the fixing property of the toner is made excellent and decrease of the moisture resistance is suppressed.

As a diol other than (b) in the polyol component composing the polyester resin are exemplified the above-mentioned adducts of AO having 2 to 4 carbon atoms to bisphenols.

Examples of the tri- or higher (tri- to octa- or higher) polyhydric alcohol and/or tri- or higher (tri- to octa- or higher) polycarboxylic acid (c) may include the above exemplified tri- to octa- or higher hydric aliphatic polyalcohols having 3 to 36 carbon atoms; adducts of AO having 2 to 4 carbon atoms to the above-mentioned aliphatic polyalcohols; adducts of AO having 2 to 4 carbon atoms to the above-mentioned trisphenols; adducts of AO having 2 to 4 carbon atoms to the above-mentioned novolak resins; aliphatic tricarboxylic acids having 3 to 36 carbon atoms; the above-mentioned unsaturated carboxylic acid vinyl polymers; tri- to hexa- or higher valent polycarboxylic acids having 9 to 20 carbon atoms; and the above-mentioned unsaturated carboxylic acid vinyl polymers.

Preferable examples among them are adducts (average addition mole: 2 to 30) of AO having 2 to 4 carbon atoms to the novolak resins; tri- to hexa- or higher aromatic polycarboxylic acids having 9 to 20 carbon atoms (e.g. trimellitic acid and pyromellitic acid) and more preferable examples are adducts (average addition mole: 2 to 30) of AO (particularly EC and/or PO) having 2 to 4 carbon atoms to the novolak resins. These compounds may be used alone or two or more of them may be used in combination. These compounds (c) have an effect to increase non-offset property of a toner by crosslinking or branching the polyester resin.

The content of (c) is preferably 0.1 to 20% by mole, more preferably 0.5 to 18% by mole, in the total of the polyol component and polycarboxylic acid component. If it is controlled to be 0.1% or higher by mole, a polyester resin having a viscosity and Tg in respectively proper ranges can be obtained and thus both non-offset property and storage stability of the toner are made sufficient. If it is controlled to be 20% or lower by mole, crosslinking of the polyester resin is prevented in a viscosity equal to or lower than the proper range and thus the non-offset range can be widened.

In the third invention, unless the properties of the polyester resin are not deteriorated, other monomers, e.g. monocarboxylic acids such as benzoic acid, p-substituted benzoic acid, o-substituted benzoic acid, acetic acid, propionic acid, butyric acid, and their methyl and ethyl esters and anhydrides; mono-ols such as benzyl alcohol, p-substituted benzyl alcohol, o-substituted benzyl alcohol, lauryl alcohol, myristyl alcohol, and stearyl alcohol; and hydroxycarboxylic acid derivatives such as $\epsilon$-caprolactone, methylvarelolactone and its ring-opening polymers, can be used in a range of 10% by mole or less in the total of the polyol component and polycarboxylic acid component.

The polyester resin of the third invention obtained by polycondensing the above-mentioned components has a softening point in a range generally from 95 to 160° C., preferably 100° C. in the lower limit and 150° C. in the upper limit, and more preferably lower than 120° C. and Tg in a range generally from 45 to 75° C., preferably 50° C. in the lower limit and 70° C. in the upper limit.

If the softening point is controlled to be 95° C. or higher, the toughness of the polyester resin becomes preferable and on the other hand, if it is controlled to be 160° C. or lower, the melt fluidity and the low temperature fixing property of the toner can be made desirable.

If Tg is controlled to be 45° C. or higher, the blocking resistance of the toner is made preferable and if it is controlled to be 75° C. or lower, the fixing property of the toner is made desirable.

Tg is measured by a method (DSC method) as standardized in ASTM D3418-82 by DSC 20, SSC/580 manufactured by Seiko Instruments Inc.

The polyester resin (A1) to (A3) in the invention may be produced by a common polyester production method. For example, the production method may be carried out in an inert gas (e.g. nitrogen gas or the like), at a reaction temperature preferably 150 to 280° C., more preferably 160 to 250° C., and even more preferably 170 to 235° C. The reaction time is preferably 30 minute or longer and particularly preferably 2 to 40 hours in terms of reliable performance of polycondensation.

In this case, if necessary, an esterification catalyst may be used. Examples of the esterification catalyst are tin-containing catalysts (e.g. dibutyltin oxide, dioctyltin oxide, dictyltin dilaurate), antimony-containing catalysts (e.g. antimony trioxide), titanium-containing catalysts (e.g. titanium alkoxide, potassium titanyl oxalate, titanium terephthalate), zirconium-containing catalysts (e.g. zirconyl acetate), nickel-containing catalysts (e.g. nickel acetyl acetate), aluminum-containing catalysts (e.g. aluminum hydroxide and aluminum triisopropoxide), zinc acetate, and manganese acetate. Among them, in terms of the reactivity and environmental hygiene, catalyst containing one or more metals selected from titanium, antimony, zirconium, nickel, and aluminum are preferable. It is also effective to reduce the pressure in order to improve the reaction speed in the terminal period of the reaction.

It is preferable to determine an addition amount of the catalyst so properly as to make the reaction speed maximum. The addition amount is preferably 10 ppm to 1.9% and more preferably 100 ppm to 1.7% in the entire raw materials. If the addition amount is 10 ppm or higher, the reaction speed is increased and therefore it is preferable. Hereinafter, % means % by weight, unless otherwise specified.

The reaction ratio of the polyol component and the polycarboxylic acid component in the case of production of polyester resin (A1) to (A3) of the first to the third invention [hereinafter, collectively referred to as (A) for (A1) to (A3)] is preferably (2/1) to (1/2), more preferably (1.5/1) to (1/1.3), and even more preferably (1.3/1) to (1/1) on the basis of equivalent ratio [OH]/[COOH] of the hydroxyl groups and carboxyl groups.

The Mn of a tetrahydrofuran (THF)-soluble fraction of the resin (A) is preferably in a range from 1000 to 9500, more preferably in a range from 1200 to 9300, and even more preferably in a range from 1400 to 9100. If Mn is 1000 or higher, the resin strength is increased and if it is 9500 or lower, the low temperature fixing property and grindability of the resin are improved.

The peak top molecular weight (hereinafter, referred to as Mp) of the THF-soluble fraction of the resin (A) is preferably in a range from 1200 to 50000 and more preferably in a range from 1500 to 40000 in terms of the balance among the resin strength, low temperature fixing property, and grindability of the resin.

The amount of components with a molecular weight of 500 or less in a chromatogram by gel permeation chromatography of the THF-soluble fraction of the resin (A) is preferably 3% or less and more preferably 2.5% or less. If the amount of components with a molecular weight of 500 or less is 3% or less, in the case the resin (A) is used as a toner, the fluidity is further improved and the image stability is improved at the time of continuous printing. In the case of using two or more kinds of resins as the resin (A), even in the case a resin with a high quantity of the components with a molecular weight of 500 or less is contained, if the amount is within the above-mentioned range in the entire body of the resin (A), it is preferable.

The Mn, Mp, and the amount of the components with a molecular weight of 500 or lower of the THF-soluble fraction in the polyester resin are measured by GPC in the following conditions.
Apparatus: HLC-8120, manufactured by Tosho Corp.,
Column: TSK GEL GMH6 2 columns, manufactured by Tosho Corp.,
Measurement temperature: 40° C.,
Sample solution: 0.25% THF solution,
Injection amount of solution: 100 μL,
Detection apparatus: refractive index detector, and
Standard substance: standardized polystyrenes The molecular weight at the maximum peak height in the obtained chromatogram is named as the peak top molecular weight (Mp). The amount of the components with a molecular weight of 500 or lower is calculated by integration from 0 to 500 in the molecular weight distribution list. To carry out the measurement, one optional particle is selected among resin particles and dissolved in THF to obtain a sample solution. Such measurement of the sample solution is carried out for 10 particles.

Tg of the polyester resin (A1) and (A2) of the first and second inventions is preferably in a range from 40 to 90° C., more preferably in a range from 45 to 85° C., and even more preferably in a range from 50 to 80° C. in terms of the thermal storage property and low temperature fixing property.

THF-insoluble fraction in the resin (A) is preferably 70% or less in terms of the low temperature fixing property. The lower limit is more preferably 1%, even more preferably 2%, or most preferably 3% and the upper limit is more preferably 40% and even more preferably 30%.

The above-mentioned THF-insoluble fraction is measured by the following method. At first, 0.5 g of a sample is added to 50 ml of THF and the obtained solution is stirred and refluxed for 3 hours. After cooling, the insoluble fraction is separated by filtration with a glass filter and the resin component on the glass filter is vacuum-dried at 80° C. for 3 hours. The insoluble fraction is calculated from the weight ratio of the weight of the dried resin on the glass filter and the weight of the sample.

Hydroxy value (mgKOH/g) of the resin (A) is preferably 70 or lower, more preferably in a range from 5 to 40, and even more preferably in a range from 10 to 30. If the hydroxyl value is 70 or lower, the environment stability and the amount of the electrostatic charge are improved. Acid value (mgKOH/g) of the resin (A) is preferably 40 or lower, more preferably in a range from 1 to 30, and even more preferably in a range from 2 to 25, and most preferably 5 to 20. If the acid value is 40 or lower, the environment stability is improved. If the resin has a proper acid value, the rising up of charging is improved and thus it is preferable.

Two or more kinds of the polyester resin (A) of the invention may be used in combination and in terms of attainment of both satisfactory low temperature fixing property and hot offset resistance, respectively one or more kinds of linear polyester resins (Aa) and non-linear polyester resins (Ab) may be used in combination.

A linear polyester resin (Aa) is generally obtained by polycondensing the above-mentioned diol and dicarboxylic acid. It may be modified in the molecule terminals with an anhydride of the above-mentioned polycarboxylic acids (including tri- or higher valent polycarboxylic acids).

A non-linear polyester resin (Aa) is generally obtained by reaction of the above-mentioned dicarboxylic acid and diol as well as the above-mentioned tri- or higher valent polycarboxylic acids and/or tri- or higher hydric polyalcohols.

Examples of the tri- or higher valent polycarboxylic acids and/or tri- or higher hydric polyalcohols are preferably adducts (average addition molar number 2 to 30) of AO having 2 to 4 carbon atoms to novolak resins, tri- to hexa- or higher aromatic polycarboxylic acids having 9 to 30 carbon atoms (e.g. trimellitic acid and pyromellitic acid) and more preferably tri- to hexa- or higher aromatic polycarboxylic acids.

With respect to the ratio of the tri- or higher valent polycarboxylic acids and tri- or higher hydric polyalcohols in the case of obtaining the resin (Ab), the total of the moles of them in the total moles of the polyol components and the polycarboxylic acid components is preferably in a range from 0.1 to 40% by mole, more preferably in a range from 1 to 25% by mole, and even more preferably in a range from 3 to 20% by mole.

The THF-insoluble fraction of the resin (Aa) is preferably 3% or less, more preferably 1% or less, and even more preferably 0%. As the THF-insoluble fraction of the resin (Aa) is less, it is more preferable in terms of the low temperature fixing property.

The THF-insoluble fraction of the resin (Ab) is preferably 1 to 70%. The lower limit is more preferably 2% and even more preferably 5% and an upper limit is more preferably 60% and even more preferably 50%. Including the THF-insoluble fraction within the above-mentioned range is preferable in terms of the improvement of the hot offset resistance.

The polyester resin for a toner of the invention may contain other polyester resins to an extent that the properties of the polyester resin (A) are not deteriorated. Examples of other polyester resins are polyester resins having Mn in a range from 1000 to 1,000,000, more preferably in a range from 1000 to 9500 other than resins (A1) to (A3). If the resin (A) is the non-linear polyester resin (Ab), another resin to be used in combination is preferably a linear polyester resin other than the resin (Aa).

The content of (A) in the polyester resin is in a range generally from 20 to 100%, preferably from 25 to 100%, and even more preferably from 30 to 90%. If it is 20% or higher, the properties of the invention are sufficiently exhibited.

The polyester resin for a toner of the fourth invention contains the above-mentioned polyester resin (A) for a toner and an additive (B) for a toner comprising a modified wax (w1) produced by modifying at least a part of a wax (w) with a vinyl monomer (m).

The wax (w) to be used as a starting material of the additive (B) may include polyolefin waxes, natural waxes, aliphatic alcohols having 30 to 50 carbon atoms, fatty acids having 30 to 50 carbon atoms, and their mixtures.

Examples of the polyolefin waxes are (co)polymers [obtained by (co)polymerization and including thermal degradation polyolefins] of olefins (e.g. ethylene, propylene, 1-butene, isobutylene, 1-hexene, 1-dodecene, 1-octadecene, and their mixture); oxides of (co) polymers by oxygen or oxone; maleic acid-modified products of olefin (co)polymers [e.g. products modified with maleic acid and its derivatives (e.g. maleic anhydride, monomethyl maleate, monobutyl maleate, and dimethyl maleate)]; copolymers of olefin with unsaturated carboxylic acids [e.g. (meth)acrylic acid, itaconic acid, and maleic anhydride] and/or unsaturated carboxylic acid alkyl esters [e.g. (meth)acrylic acid alkyl (alkyl having 1 to 18 carbon atoms) esters and maleic acid alkyl (alkyl having 1 to 18 carbon atoms) esters]; and sasol waxes.

In terms of the filming to a carrier and releasing property, Mn of the polyolefin waxes is preferably in a range from 400 to 40000, more preferably from 1000 to 30000, and even more preferably 1500 to 2000.

Examples of the natural waxes are carnauba wax, montan wax, paraffin wax, and rice wax. Aliphatic alcohols having 30 to 50 carbon atoms may include triacontanol. Fatty acids having 30 to 50 carbon atoms may include triacontanecarboxylic acid.

Preferable examples among them are polyolefin waxes, natural waxes, and their mixtures, furthermore preferable examples are thermal degradation polyolefins, and even more preferable examples are thermal degradation polyethylene and thermal degradation polypropylene.

The softening point of the wax (w) is preferably in a range from 50 to 170° C. The lower limit is more preferably 80° C., furthermore preferably 90° C., and even more preferably 100° C. and the upper limit is more preferably 160° C. and even more preferably 155° C. If the softening point is 50° C. or higher, the fluidity of the toner is good and if it is 170° C. or lower, a sufficient releasing effect can be obtained.

The softening point is measured by a method standardized in JIS K 2207-1996.

In terms of the fixing property of the toner, the melt viscosity of the wax (w) is generally in a range from 2 to 10000 mPa·s, preferably from 3 to 7000 mPa·s, and more preferably from 5 to 4500 mPa·s at 160° C.

In terms of the developing property of the toner, the pin penetration degree of the wax (w) is generally 5.0 or lower, preferably 3.5 or lower, and more preferably 1.0 or lower.

The pin penetration degree is measured by a method standardized in JIS K 2207-1996.

Examples usable as the vinyl monomer (m) are following monomers (a) to (f) and combinations of them:
(a) carboxyl-containing vinyl monomers:
(a-1) unsaturated monocarboxylic acids having 3 to 20 carbon atoms: e.g. (meth) acrylic acid, crotonic acid, and cinnamic acid;
(a-2) unsaturated dicarboxylic acids having 4 to 30 carbon atoms and their ester-forming derivatives [acid anhydrides and mono- or di-alkyl (alkyl having 1 to 18 carbon atoms) esters]: e.g. maleic acid, fumaric acid, itaconic acid, citraconic acid, and their anhydrides and mono- or di-alkyl (alkyl having 1 to 18 carbon atoms) esters (e.g. methyl esters and ethyl esters);
(a-3) alkyl (alkyl having 1 to 24 carbon atoms) esters of unsaturated carboxylic acids having 3 to 30 carbon atoms: e.g. methyl (meth)acrylate, ethyl (meth)acrylate, propyl (meth)acrylate, butyl (meth)acrylate, 2-ethylhexyl (meth)acrylate, dodecyl(meth)acrylate, stearyl(meth)acrylate, hexadecyl (meth)acrylate, heptadecyl (meth)acrylate, eicoxyl (meth)acrylate, cyclohexyl(meth)acrylate, benzyl (meth)acrylate, phenyl(meth)acrylate, and ethyl-α-ethoxy-(meth)acrylate;
(a-4) polyhydric (di- and tri-) alcohol esters of unsaturated carboxylic acids having 3 to 30 carbon atoms: e.g. ethylene glycol di(meth)acrylate, propylene glycol di(meth)acrylate, neopentyl glycol di(meth)acrylate, trimethylolpropanetri (meth)acrylate, 1,6-hexanediol diacrylate, and polyethylene glycol di(meth)acrylate; and
(a-5) esters of unsaturated alcohols (e.g. vinyl and isopenyl) and polycarboxylic acids having 1 to 12 carbon atoms: e.g. vinyl acetate, vinyl butylate, vinyl propionate, vinyl butyrate diallyl phthalate, diallyl adipate, isopropenyl acetate, methyl 4-vinylbenzoate, vinyl methoxyacetate, and vinyl benzoate:
(b) hydroxyl-containing vinyl monomers:
(b-1) hydroxyalkyl (meth)acrylate having 5 to 16 carbon atoms, e.g. hydroxyethyl (meth)acrylate and hydroxypropyl (meth)acrylate;
(b-2) alkenols having 2 to 12 carbon atoms, e.g. (meth)allylalcohol, 1-buten-3-ol and 2-buten-1-ol;
(b-3) alkenediols having 4 to 12 carbon atoms, e.g. 2-butene-1,4-diol; and (b-4) alkenyl ethers having 3 to 30 carbon atoms, e.g. 2-hydroxyethylpropenyl ether and sucrose allyl ether:
(c) vinyl hydrocarbons:
(c-1) aromatic vinyl hydrocarbons (8 to 20 carbon atoms) such as styrene; e.g. hydrocarbonyl (e.g. alkyl, cycloalkyl, aralkyl, and/or alkenyl)-substituted styrene such as α-methylstyrene, vinyltoluene, 2,4-dimethylstyrene, ethylstyrene, isopropylstyrene, butylstyrene, phenylstyrene, cyclohexylstyrene, benzylstyrene, crotylbenzene, divinylbenzene, divinyltoluene, divinylxylene, and trivinylbenzene; and vinylnaphthalene;
(c-2) aliphatic vinyl hydrocarbons; e.g. alkenes having 2 to 20 carbon atoms such as ethylene, propylene, butene, isobutene, pentene, heptene, diisobutylene, octene, dodecene, octadecene, and α-olefins other than exemplified above; alkadienes having 4 to 20 carbon atoms such as butadiene, isoprene, 1,4-pentadiene, 1,5-hexadiene, and 1,7-octadiene;
(c-3) alicyclic vinyl hydrocarbons; e.g. mono-di-cycloalkenes and alkadienes such as cyclohexene, (di)cyclopentadiene, vinylcyclohexene, and ethylidenebicycloheptene; terpenes such as pinene, limonene, and indene:
(d) epoxy-containing vinyl monomers: e.g. glycidyl (meth) acrylate:
(e) nitrile group-containing vinyl monomers: e.g. (meth) acrylonitrile: and
(f) amino group-containing vinyl monomers: e.g. aminoethyl (meth)acrylate, diemethylaminoethyl (meth)acrylate, diethylaminoethyl (meth)acrylate, tert-butylaminoethyl (meth) acrylate, N-aminoethyl (meth) acrylamide, (meth)acrylamine, morpholinoethyl (meth)acrylate, 4-vinylpyridine, 2-vinylpyridine, crotylamine, methyl α-acetaminoacrylate, vinylimidazole, N-vinylpyrrole, and N-vinylthiopyrrolidone.

Preferable examples among them are styrene and styrene in combination with other monomers [preferably (a) and (b), particularly preferably (a-3) and (b-1)].

The modified wax (w1) is obtained by modifying the wax (w) with a vinyl monomer (m) and the additive (B) for a toner to be used in the invention may contain a wax (w) which is not reacted and/or a copolymer of the monomer (m) in addition to the modified wax (w1) grafted with the monomer (m).

The weight ratio of the wax (w) and the monomer (m) at the time of producing the modified wax (w1) is preferably (1 to 30):(70 to 99) and more preferably (2 to 27):(83 to 98) in terms of the fluidity of the toner to be obtained.

Tg of the modified wax (w1) is preferably in a range from 40 to 90° C., more preferably in a range from 50 to 80° C., and even more preferably in a range from 55 to 75° C. If Tg is in a range from 40° C. to 90° C., the thermal storage stability and low temperature fixing property are excellent.

Mn of the modified wax (w1) is preferably in a range from 2000 to 10000 and more preferably in a range from 2500 to 9000. If Mn is within a range from 2000 to 10000, the durability and grindability of the toner to be obtained are excellent.

The additive (B) for a toner containing the modified wax (w1) is obtained, for example, by dissolving or dispersing a wax (w) in a solvent (e.g. toluene or xylene), heating to 100-200° C., successively carrying out polymerization by dropwise adding the monomer (m) and a peroxide type initiator (e.g. benzoyl peroxide, di-tert-butyl peroxide, or tert-butyl peroxide benzoate), and then removing the solvent.

The amount of the peroxide type initiator is generally 0.2 to 10% and preferably 0.5 to 5% in the total weight of the wax (w) and monomer (m).

The resin composition for a toner of the fourth invention comprises the polyester resin (A) and the additive (B) for a toner. The weigh ratio of the resin (A) and the additive (B) is preferably (25 to 99.9):(0.1 to 75), more preferably (50 to 99):(1 to 50), and even more preferably (75 to 98):(2 to 25) in order to control the wax particle diameter in the toner.

In addition, the polyester resin composition for a toner of the invention may contain, based on the necessity, other resins and a release agent, which will be described later, besides the polyester resin (A) and additive (B). In the invention, the additive (B) for a toner has a function as a compatibility-improving agent for improving the compatibility of the polyester resin with the release agent.

To obtain the polyester resin composition for a toner of the fourth invention, the additive (B) for a toner and the polyester resin (A) may be mixed in the form of powders or in the form of melts by a biaxial extruder or a mixing pot capable of heating and stirring and the additive (B) for a toner may be produced in the presence of polyester resin (A).

The toner composition of the fifth invention contains the polyester resin (A) for a toner to be a binder resin, a colorant, and if necessary, one or more kinds of additives such as a release agent, a charge control agent, and a fluidizing agent.

All kinds of dyes and pigments used as a coloring agent for a toner may be used as the colorant. Practically, examples are carbon black, iron black, Sudan black SM, First Yellow G, Benzidine Yellow, Pigment Yellow, Indian First Orange, Irgasin Red, p-Nitoaniline Red, Toluidine Red, Carmine FB, Pigment Orange R, Lake Red 2G, Rhodamine FB, Rhodamine B Lake, Methyl Violet B Lake, Phthalocyanine Blue, Pigment Blue, Brilliant Green, Phthalocyanine Green, Oil Yellow GG, Kayaset YG, Orazol Brawn B, and Oil Pink OP and these dyes may be used alone or two or more of them may be used in form of a mixture. Further, if necessary, a magnetic powder (a powder of a ferromagnetic metal such as iron, cobalt, and nickel or a compound such as magnetite, hematite, and ferrite) may be added for a function as a colorant. The content of the colorant is preferably in a range from 1 to 40 part and more preferably in a range from 3 to 10 part to 100 part of the polyester resin of the invention. In the case of using the magnetic powder, it is preferably in a range from 20 to 150 part and more preferably in a range from 40 to 120 part. "Part" in the specification means part by weight.

As the release agent, those having a softening point from 50 to 170° C. are preferable and examples are polyolefin waxes, natural waxes, aliphatic alcohols having 30 to 50 carbon atoms, fatty acids having 30 to 50 carbon atoms, and their mixtures.

Practical examples are those same as exemplified for the above-mentioned wax (w).

Examples of the natural waxes are carnauba wax, montan wax, paraffin wax, and rice wax. The aliphatic alcohols having 30 to 50 carbon atoms may include triacontanol. Fatty acids having 30 to 50 carbon atoms may include triacontanecarboxylic acid.

Examples of the charge control agent are Nigrosine dyes, triphenylmethane type dies having tertiary amines in side chains, quaternary ammonium salts, polyamine resins, imidazole derivatives, quaternary ammonium salt-containing polymers, metal-containing azo dyes, copper-phthalocyanine dyes, metal salicylate, boron benzylic acid complexes, sulfonic acid group-containing polymers, fluorine-containing polymers, and halogen-substituted aromatic ring-containing polymers.

Examples of the fluidizing agent are colloidal silica, alumina powder, titanium oxide powder, and calcium carbonate powder.

With respect to the component ratio of the toner composition of the fifth invention, based on the toner weight, the ratio of the polyester resin of the invention is preferably in a range from 30 to 97%, more preferably from 40 to 95%, and even more preferably from 45 to 92%; the ratio of the colorant is preferably in a range from 0.05 to 60%, more preferably from 0.1 to 55%, and even more preferably from 0.5 to 50%; and with respect to the additives, the ratio of the release agent is preferably in a range from 0 to 30%, more preferably from 0.5 to 20%, and even more preferably from 1 to 10%; the ratio of the charge control agent is preferably in a range from 0 to 20%, more preferably from 0.1 to 10%, and even more preferably from 0.5 to 7.5%; the ratio of the fluidizing agent is preferably in a range from 0 to 10%, more preferably from 0 to 5%, and more preferably from 0.1 to 4%. The total content of these additives is preferably in a range from 3 to 70%, more preferably from 4 to 58%, and even more preferably from 5 to 50%. If the component ratios of the toner are within the above-mentioned ranges, it becomes easy to obtain a toner with excellent electrostatic property.

The toner composition of the invention may be obtained by any conventionally known method such as a kneading and grinding method, an emulsifying phase-inversion method, and a polymerization. For example, in the case of obtaining a toner by the kneading and grinding method, components composing the toner except a fluidizing agent are dry-blended and successively melted and kneaded and then the melted mixture is roughly grinded and finally finely granulated by jet mill pulverizer and further the granulated powder is classified to obtain fine particles having a particle diameter (D50) preferably in a range from 5 to 20 μm and then the fluidizing agent is added to the particles to obtain a toner. The particle diameter (D50) is measured by a Coulter Counter (trade name: Multisizer III, manufactured by Coulter Co.).

In the case of obtaining a toner by the emulsifying phase-inversion method, components composing the toner except a fluidizing agent are dissolved or dispersed in an organic solvent, emulsifying the solution or dispersion by such a way as adding water, and separating and classifying the obtained particles. The volume average particle diameter of the toner is preferably in a range from 3 to 15 μm.

The toner composition of the invention may be mixed with carrier particles of iron powder, glass beads, nickel powder, ferrite, magnetite or ferrite surface-coated with a resin (e.g. acrylic resin and silicone resin) if necessary, to be used as a developer for an electric latent image. The weight ratio of the toner and carrier particles is generally 1/99 to 100/0. An electric latent image can also be formed by bringing into friction with a charging blade in place of the carrier particles.

The toner composition of the invention is fixed on a support (e.g. paper and a polyester film) by a copying machine or a printer to be a recording material. A method for fixing on the support may be conventionally known heat roll fixing method and flash fixing method.

Use of the toner composition of the invention makes it easy to carry out fixing in a temperature difference range as wide as 95° C. or higher (particularly 100° C. or higher) between a hot offset occurrence temperature and the minimum fixing temperature at the time of fixing an un-fixed image by a fixing apparatus.

The non-magnetic single component toner of the sixth invention contains at least the polyester resin (A) [the polyester resin (A1), (A2), or (A3) of the first to third inventions] and a colorant.

With respect to the polyester resin (A) of the sixth invention, those having a softening point (sp) and a glass transition temperature (Tg), the point (Tg, sp) being within an area surrounded by straight lines defined by the following equations (1) to (4) [the inside of the parallelogram of FIG. 1], preferably within an area defined by the following (1), (2), (3'), and (4'), and more preferably within an area defined by the following (1'), (2'), (3"), and (4') can be used:

$$sp=4Tg-110, \quad \text{equation (1):}$$

$$sp=4Tg-170, \quad \text{equation (2):}$$

$$sp=90, \quad \text{equation (3):}$$

$$sp=130, \quad \text{equation (4):}$$

$$sp=4Tg-114, \quad \text{equation (1'):}$$

$$sp=4Tg-166, \quad \text{equation (2'):}$$

$$sp=93, \quad \text{equation (3'):}$$

$$sp=95, \quad \text{equation (3''): and}$$

$$sp=127. \quad \text{equation (4'):}$$

That is, the sp of the polyester resin (A) is within a range from 90 to 130° C. The lower limit is preferably 93° C. and more preferably 95° C. and the upper limit is preferably 127° C. The Tg is preferably in a range from 50 to 65° C. and more preferably in a range from 51 to 64° C. if sp is 90° C. and preferably in a range from 60 to 75° C. and more preferably in a range from 61 to 74° C. if sp is 130° C.

In this case, if the sp is lower than the above-mentioned range, an offset phenomenon may possibly occurs at the time of fixing and if it is higher than the above-mentioned range, the fixing energy is increased and the luster and transparency tend to be deteriorated in the case of a color toner. If the Tg is lower than the above-mentioned range, agglomerates and cohesion of the toner may possibly be caused and if the Tg is higher than the above-mentioned range, the fixing strength at the time of heat fixing tends to be lowered, so that the sp and Tg are preferably to be within the above-mentioned ranges. The sp may be adjusted mainly by the molecular weight of the resin and it is preferable to adjust Mn preferably within a range from 2000 to 20000 and more preferably within a range from 3000 to 12000. The Tg may be adjusted by selecting the monomer components composing the resin and practically the Tg is increased by using an aromatic polycarboxylic acid as a main component for the polycarboxylic acid component.

The sp of the polyester resin (A) is measured by a flow tester described in JIS K7210 and K6719, as opposed to the softening point in the above-mentioned second invention. Practically, measurement is carried out using a flow tester (CFT-500 manufactured by Shimadzu Corp.) by applying a load of 30 kg/cm$^2$ by a plunger with a surface area of 1 cm$^2$ while heating about 1 g of a sample at a heating speed of 3° C./min.; extruding the sample out of a die with a hole diameter of 1 mm and a length of 10 mm. Accordingly, a plunger stroke-temperature curve is drawn and in the case the height of the S-shape curve is denoted by h, the temperature corresponding to h/2 is defined as the softening point.

Two kinds of resins may be used in combination for the polyester resin (A) and to satisfy all of the low temperature fixing property, hot offset resistance, and grindability, it is preferable that the resin (A) comprises the above-mentioned linear polyester resin (Aa) and non-linear polyester resin s (Ab). The resins (Aa) and (Ab) may comprise two or more resins, respectively.

The weight ratio of (Aa) and (Ab) is preferably 10/90 to 80/20, more preferably 20/80 to 75/25, and even more preferably 25/75 to 70/30.

The polyester resin to be used in the sixth invention preferably comprises the resin (A) alone, however another polyester resin may be added to an extent that the properties of the polyester resin are not deteriorated. Another resin may be polyester resins other than the resin (A) and having Mn in a range from 1000 to 1,000,000. The content of another resin is preferably 10% or less and more preferably 5% or less.

In the case the resin (A) is used in combination with another resin, it is preferable that the entire body of the polyester resin for a toner of the invention keeps the physical properties (molecular weight, Tg, and THF-insoluble fraction) within the above-mentioned ranges.

Examples of a colorant to be used for the non-magnetic toner of the invention may be same as described above-mentioned.

The non-magnetic toner of the invention comprises fine particles of at least one kind of finely granular additive (a fluidizing agent) on the surface of the toner particles. They are added mainly for improving the agglomeration, cohesion, and fluidity of the toner particles and also improving the friction electrostatic property and durability as a toner. Practically, organic and inorganic fine particles having an average primary particle diameter in a range from 0.001 to 5 μm, preferably 0.002 to 3 μm, and which may optionally be surface-treated are usable and examples are particles of fluoro resins such as poly(vinylidene fluoride) and polytetrafluoroethylene; fatty acid metal salts such as zinc stearate and calcium stearate; resin beads containing mainly poly(methyl methacrylate) and silicone resin; minerals such as talc and hydrotalcite; and metal oxides such as silicon oxide (colloidal silica or the like), aluminum oxide, titanium oxide, zinc oxide, and tin oxide.

The non-magnetic toner of the invention may contain, if necessary, one or more kinds of the above-mentioned commonly used additives such as a release agent and a charge control agent.

With respect to the component ratios of the non-magnetic toner of the invention, based on the toner weight, the ratio of the polyester resin (A) of the invention is preferably in a range from 30 to 97%, more preferably from 40 to 95%, and even more preferably from 45 to 92%; the ratio of the colorant is preferably in a range from 0.05 to 60%, more preferably from 0.1 to 55%, and even more preferably from 0.5 to 50%; and with respect to the additives, the ratio of the finely granular additive is preferably in a range from 0.01 to 10%, more preferably from 0.05 to 5%, and even more preferably from 0.1 to 4%; the ratio of the release agent is preferably in a range from 0 to 30%, more preferably from 0.5 to 20%, and even more preferably from 1 to 10%; the ratio of the charge control agent is preferably in a range from 0 to 20%, more preferably from 0.1 to 10%, and even more preferably from 0.5 to 7.5%; and the total content of these additives (including the finely granular additive) is preferably in a range from 3 to 70%, more preferably from 4 to 58%, and even more preferably from 5 to 50%. If the component ratios of the toner are within the above-mentioned ranges, it becomes easy to obtain a toner with excellent electrostatic property.

The toner composition of the invention may be obtained by any conventionally known method such as a kneading and grinding method, an emulsifying phase-inversion method, and a polymerizing method.

The non-magnetic toner of the invention is fixed on a support (e.g. paper and a polyester film) by a copying machine or a printer to be a recording material. A method for fixing on the support may be conventionally known heat roll fixing method and flash fixing method.

Next, the resin (K) for resin particles of the seventh invention comprises a polyester resin (K1) obtained by polycondensing one or more kinds of polyol components and one or more kinds of polycarboxylic acid components. The resin (K1) contains an aliphatic diol having 2 to 6 carbon atoms as an indispensable component.

The aliphatic diol having 2 to 6 carbon atoms may include those exemplified above and two or more kinds may be used in combination. Preferable examples are ethylene glycol, 1,2-propylene glycol, and neopentyl glycol preferable; more preferably ethylene glycol and 1,2-propylene glycol; and even more preferable 1,2-propylene glycol.

The content of the aliphatic diol having 2 to 6 carbon atoms in the polyol component in the resin (K1) is generally in a range from 85 to 100% by mole, preferably in a range from 90 to 100% by mole, more preferably in a range from 95 to 100% by mole, and even more preferably 100%. If the content of the aliphatic diol having 2 to 6 carbon atoms is 85% by mole or higher, the strength of the resin itself is increased and the low temperature fixing property is improved. However, in the case 1,2-propylene glycol is used for the aliphatic diol having 2 to 6 carbon atoms, the content is generally in a range from 70 to 100% by mole, preferably from 75 to 100% by mole, more preferably from 90 to 100% by mole, furthermore preferably from 95 to 100% by mole, and even more preferably 100%. If the content of 1,2-propylene glycol is 70% by mole or higher, the strength of the resin itself is increased and the low temperature fixing property is improved.

The polyol component may contain 15% by mole or less of polyhydric alcohols (30% by mole or less in the case of using 1,2-propylene glycol) other than the aliphatic diol having 2 to 6 carbon atoms.

Examples of a dihydric alcohol (diol) among the polyhydric alcohols may include, as described above, aliphatic diol having 7 to 36 carbon atoms; polyalkylene ether glycol having 4 to 36 carbon atoms; adducts of AO having 2 to 4 carbon atoms to aliphatic dials having 2 to 6 and 7 to 36 carbon atoms; alicyclic dials having 6 to 36 carbon atoms; adducts of AO having 2 to 4 carbon atoms to alicyclic dials; and adducts of AO having 2 to 4 carbon atoms to bisphenols.

Examples of tri- to octa-hydric or higher hydric alcohols among the polyhydric alcohol are those exemplified above.

Among these polyhydric alcohols are preferably polyalkylene ether glycol having 4 to 36 carbon atoms; alicyclic dials; adducts of AO having 2 to 4 carbon atoms to alicyclic dials having 4 to 36 carbon atoms; adducts of AO having 2 to 4 carbon atoms to bisphenols; and adducts of AO having 2 to 4 carbon atoms to novolak resins; and more preferably adducts of AO (EO and PO) having 2 to 4 carbon atoms to bisphenols and adducts of AO (EO and PO) having 2 to 4 carbon atoms to novolak resins.

Examples of the polycarboxylic acid components are those same as exemplified above.

Preferable examples among the polycarboxylic acid components are alkanedicarboxylic acids having 2 to 50 carbon atoms; alkenedicarboxylic acids having 4 to 50 carbon atoms; aromatic dicarboxylic acids having 8 to 20 carbon atoms; and aromatic polycarboxylic acids having 9 to 20 carbon atoms: more preferable examples are adipic acid, alkenylsuccinic acid having 16 to 50 carbon atoms, terephthalic acid, isophthalic acid, maleic acid, fumaric acid, trimellitic acid, pyromellitic acid, and combinations of these acids: and even more preferable examples are adipic acid, terephthalic acid, trimellitic acid, and combinations of these acids. Anhydrides and lower alkyl esters of these acids are also preferable.

Further, the polycarboxylic acid components are also preferable to comprise an aromatic polycarboxylic acid (di- to hexa- or higher) and an aliphatic polycarboxylic acid (di- to hexa- or higher) and contain 60% by mole or more of the aromatic polycarboxylic acid. The lower limit of the content of the aromatic polycarboxylic acid is more preferably 70% by mole and furthermore preferably 80% by mole and the upper limit is more preferably 99% by mole and furthermore preferably 98% by mole.

If the content of the aromatic polycarboxylic acid is 60% by mole, the resin strength is increased and the low temperature fixing property is further improved.

The polyester resin (K1) in the invention can be produced by the same manner as a common polyester production method. Examples of the method are those exemplified above.

Mn of the THF-soluble fraction of the resin (K1) is 1000 to 9500. The lower limit is preferably 1200 and more preferably 1400 and the upper limit is preferably 9300 and more preferably 9100. If Mn is 1000 or higher, the resin strength is good and if it is 9500 or lower, the low temperature fixing property is good.

Mp of the THF-soluble fraction of the resin (K1) is preferably 1200 to 250000 in terms of the balance between the resin strength and low temperature fixing property. The lower limit is more preferably 1500 and the upper limit is more preferably 23000.

The content of the components with 500 or less molecular weight in a chromatogram by gel permeation chromatography of the THF-soluble components of the resin (K1) is preferably 3% or lower and more preferably 2.5% or lower. If the content of the components with 500 or less molecular weight is 3% or lower, in the case of using the resin for a toner, the fluidity is improved and the image stability is improved at the time of continuous printing. In the case two or more kinds of resins are used as the resin (K1), even if a resin having a high content of components with 500 or less molecular weight is contained, it is allowed if the content in the entire resin (K1) is within the above-mentioned range.

Tg of the resin (K1) is preferably in a range from 40 to 90° C., more preferably from 45 to 85° C., and even more preferably from 50 to 80° C. in terms of the thermal storage property and low temperature fixing property.

The THF-insoluble fraction in the resin (K1) is preferably in a content of 70% or less in terms of low temperature fixing property. The lower limit is more preferably 1% and even more preferably 3% and the upper limit is more preferably 40% and even more preferably 30%.

Hydroxy value (mgKOH/g) of the resin (K1) is preferably 70 or lower, more preferably in a range from 5 to 40, and even more preferably in a range from 10 to 30. If the hydroxyl value is 70 or lower, the environment stability and the amount of electrostatic charge are improved. Acid value (mgKOH/g) of the resin (K1) is preferably 40 or lower, more preferably in a range from 1 to 30, and even more preferably in a range from 2 to 25, most preferably in a range from 5 to 20. If the acid value is 40 or lower, the environment stability is improved. If the resin has a proper acid value, the rising up of charging is improved and thus it is preferable.

Two or more kinds of resins may be used in combination for the polyester resin (K1) and in terms of attainment of both satisfactory low temperature fixing property and hot offset resistance, the resin (K1) is preferable to comprise a linear polyester resin (K1a) and a non-linear polyester resin (K1b). Two or more kinds of the resins for each (K1a) and (K1b) may be used.

The weight ratio of the resins (K1a) and (K1b) is preferably in a range from 10/90 to 80/20, more preferably from 20/80 to 75/25, and even more preferably from 25/75 to 70/30.

Also, because of the same reason, Mn of the THF-soluble fraction of the resin (K1b) is preferable to be higher than Mn of the resin (K1a) by at least 200 and more preferable by at least 300.

The linear polyester resin (K1a) is generally obtained by polycondensing the above-mentioned diol and dicarboxylic acid. It may be modified in the molecule terminals with an anhydride of the above-mentioned polycarboxylic acids (including tri- or higher valent polycarboxylic acids).

A non-linear polyester resin (K1b) is generally obtained by reaction of the above-mentioned diol and dicarboxylic acid as well as the above-mentioned tri- or higher valent polycarboxylic acids and/or tri- or higher hydric polyalcohols. Examples of the tri- or higher valent polycarboxylic acids and/or tri- or higher hydric polyalcohols are preferably adducts (average addition molar number 2 to 30) of AO having 2 to 4 carbon atoms to novolak resins and tri- to hexa- or higher aromatic polycarboxylic acids having 9 to 20 carbon atoms (e.g. trimellitic acid and pyromellitic acid) and more preferably tri- to hexa- or higher aromatic polycarboxylic acids.

With respect to the ratio of the tri- or higher valent polycarboxylic acids and tri- or higher hydric polyalcohols in the case of obtaining the resin (K1b), the total of the moles of them in the total moles of the polyol components and the polycarboxylic acid components is preferably in a range from 0.1 to 40% by mole, more preferably in a range from 1 to 25% by mole, and even more preferably in a range from 3 to 20% by mole.

The polyester resin (K1) is preferably the polyester resin (A1) of the first invention and/or the polyester resin (A2) of the second invention.

The THF-insoluble fraction of the resin (K1a) is preferably 3% or less, more preferably 1% or less, and even more preferably 0%. As the THF-insoluble fraction of the resin (K1a) is less, it is more preferable in terms of the low temperature fixing property.

The THF-insoluble fraction of the resin (K1b) is preferably 1 to 70%. The lower limit is more preferably 2% and even more preferably 5% and an upper limit is more preferably 60% and even more preferably 50%. Including the THF-insoluble fraction within the above-mentioned range is preferable in terms of the improvement of the hot offset resistance.

The resin (K) in the resin particles of the invention may contain one or more kinds of other resins (K2) to an extent that the properties of the polyester resin (K1) are not deteriorated. Examples of other resins are polyester resin other then the resin (K1), vinyl resin, polyurethane resin, epoxy resin, polyester resin, polyamide resin, polyimide resin, silicon type resin, phenol resin, melamine resin, urea resin, aniline resin, ionomer resin, and polycarbonate resin and preferable examples among them are vinyl resin, polyurethane resin, epoxy resin, polyester resin, and combinations of these resins. Practical examples of vinyl resin, polyurethane resin, epoxy resin, and polyester resin are those described in International publication WO 03/106541.

Mn of the resin (K2) is preferably in a range from 500 to 2,000,000 and more preferably from 1000 to 1,000,000. The content of the resin (K2) in the resin (K) is preferably 10% or less and more preferably 0.1 to 8%.

In the case another resin (K2) is added to the resin (K), it is preferable for the resin (K) as a whole have the above-mentioned preferable physical properties of the resin (K1) (molecular weight, Tg, and THF-soluble fraction) within the above-mentioned ranges.

The resin particles of the invention may contain, together with the resin (K), one or more kinds of additives such as a colorant, a release agent, a charge control agent, and a fluidizing agent. In the case the resin particles are used for a powder coating, an electrophotographic toner, an electrostatic recording toner, or an electrostatic printing toner, the colorant is added indispensably.

As the colorant are any dye and pigment used as the colorant for a toner usable. Practical examples are those exemplified above and they may be used alone or two or more kinds of them may be used in form of a mixture. Further, if necessary, a magnetic powder (a powder of a ferromagnetic metal such as iron, cobalt, and nickel or a compound such as magnetite, hematite, and ferrite) may be added for a function as a colorant. The content of the colorant is preferably in a range from 1 to 40 part and more preferably in a range from 3 to 10 part to 100 part of the resin (K) of the resin particles of the invention. In the case of using the magnetic powder, it is preferably in a range from 20 to 150 part and more preferably in a range from 40 to 120 part.

Examples of the release agent, charge control agent, and fluidizing agent are those exemplified above.

With respect to the component ratios of the resin particles of the invention, based on the weight of the composition, the ratio of the resin (K) of is preferably in a range from 30 to 97%, more preferably from 40 to 95%, and more preferably from 45 to 92%; with respect to the additives, the ratio of the colorant is preferably in a range from 0.05 to 60%, more preferably from 0.1 to 55%, and even more preferably from 0.5 to 50%; the ratio of the release agent is preferably in a range from 0 to 30%, more preferably from 0.5 to 20%, and even more preferably from 1 to 10%; the ratio of the charge control agent is preferably in a range from 0 to 20%, more preferably from 0.1 to 10%, and even more preferably from 0.5 to 7.5%; and the ratio of the fluidizing agent is preferably in a range from 0 to 10%, more preferably from 0 to 5%, and even more preferably from 0.1 to 4%. Also, the total content of these additives is preferably in a range from 3 to 70%, more preferably from 5 to 60%, even more preferably from 8 to 55%. If the component ratios are within the above-mentioned ranges, it becomes easy to obtain a toner with excellent electrostatic property.

The resin particles of the invention are obtained by dissolving or dispersing components including the resin (K) in an organic solvent for producing an oil-based mixed solution (I), converting it to a water-based dispersion with a water-based medium (II), and removing the solvents such as the organic solvent and water from the water-based dispersion.

The volume average particle diameter of the resin particles is preferably 2 to 20 μm. The lower limit is more preferably 3 μm and even more preferably 4 μm and the upper limit is more preferably 15 μm and even more preferably 12 μm.

The volume average particle diameter (D50) is measured by laser type particle diameter distribution measurement apparatus [e.g. trade name: LA-920 (manufactured by Horiba Seisakusho) and trade name: Multisizer III (manufactured by Coulter Co.)].

The water-based medium (II) may contain an emulsifier and a dispersant for making formation of oil droplets of the oil-based mixed solution (I) easy in a water-based dispersion and keeping the formed oil droplets stably. Examples of the emulsifier and dispersant to be used may be conventionally known surfactant (S), fine particles (M), water-soluble polymer (T). A solvent (U) and a plasticizer (V) may be used as assisting agents for the emulsifier and dispersant in combination.

As the surfactant (S) are a wide range of conventionally known ones usable and examples are an anionic surfactant (S-1), a cationic surfactant (S-2), an amphoteric surfactant (S-3), and a nonionic surfactant (S-4). Tow or more kinds of surfactants may be used as the surfactant (S).

Examples of the anionic surfactant (S-1) include carboxylic acid and its salts; sulfuric acid ester salts, salts of carboxymethyl compounds, sulfonic acid salts, and phosphoric acid ester salts.

Examples of the cationic surfactant (S-2) include quaternary ammonium salt type surfactants and amine salts type surfactants.

Examples of the amphoteric surfactant (S-3) include carboxylic acid salt type amphoteric surfactants; sulfuric acid ester salt type amphoteric surfactant, sulfonic acid salt type amphoteric surfactants, and phosphoric acid ester salt type amphoteric surfactant.

Examples of the nonionic surfactant (S-4) include AO-adduct type nonionic surfactants and polyhydric alcohol type nonionic surfactants.

Practical examples of these surfactants are those described in International publication WO 03/106541.

The content of the surfactant (S) in the water-based medium (II) is preferably in a range from 0.01 to 30% and more preferably from 0.1 to 20%.

The fine particles (M) are not particularly limited if they are resin particles suitable for forming a water-based dispersion and may be fine particles of thermoplastic resins and fine particles of thermosetting resins and examples are fine particles of vinyl resin, polyurethane resin, epoxy resin, polyester resin, polyamide resin, polyimide resin, silicon type resin, phenol resin, melamine resin, urea resin, aniline resin, ionomer resin, and polycarbonate resin and two or more kinds of the resins may be used in combination. Preferable examples among them are resin particles of vinyl resin, polyurethane resin, epoxy resin, polyester resin, and combinations of these resins, from a viewpoint of the easiness of obtaining the water-based dispersion of finely spherical resin particles.

Practical examples of these resins are those described in International publication WO 03/106541.

The volume average particle diameter of the particles (M) is preferably in a range from 20 to 500 nm and more preferably in a range from 25 to 300 nm.

The content of the fine particles (M) in the water-based medium (II) is preferably in a range from 0.01 to 30% and more preferably in a range from 0.1 to 20%.

Examples of the water-soluble polymer (T) are cellulose type compounds (e.g. methyl cellulose, ethyl cellulose, hydroxyethyl cellulose, ethylhydroxyethyl cellulose, carboxymethyl cellulose, hydroxypropyl cellulose, and their saponified compounds); gelatin, starch, dextrin, gum arabi, chitin, chitosan, polyvinyl alcohol, polyvinylpyrrolidone, polyethylene glycol, polyethylene imine, polyacrylamide, polymer containing acrylic acid (salts) (e.g. poly(sodium acrylate), poly(potassium acrylate), poly(ammonium acrylate), poly(acrylic acid) partially neutralized with sodium hydroxide, and sodium acrylate-acrylic acid ester copolymer), styrene-maleic anhydride copolymer (partially) neutralized with sodium hydroxide, and water-soluble polyurethane (e.g. reaction products of polyisocyanate with polyethylene glycol or polycaprolactone diol).

The weight average molecular weight of these water-soluble polymers (T) is preferably in a range from 1,000 to 10,000,000.

The content of the water-soluble polymer (T) in water-based medium (II) is preferably in a range from 0.01 to 20% and more preferably from 0.1 to 10%.

Examples of the solvent (U) to be used in the invention may include aromatic hydrocarbon type solvents such as toluene, xylene, ethylbenzene, and tetralin; aliphatic or alicyclic hydrocarbon type solvents such as n-hexane, n-heptane, mineral spirit, and cyclohexane; halogen type solvents such as methyl chloride, methyl bromide, methyl iodide, methylene dichloride, carbon tetrachloride, trichloroethylene, and perchloroethylene; ester or ester ether type solvents such as ethyl acetate, butyl acetate, methoxybutyl acetate, methylcellosolve, and ethylcellosolve; ether type solvents such as diethyl ether, tetrahydrofuran, dioxane, ethylcellosolve, butylcellosolve, and propylene glycol monomethyl ether; ketone type solvents such as acetone, methyl ethyl ketone, methyl isobutyl ketone, di-n-butyl ketone, and cyclohexanone; alcohol type solvents such as methanol, ethanol, n-propanol, isopropanol, n-butanol, isobutanol, tert-butanol, 2-ethylhexyl alcohol, and benzyl alcohol; amide type solvents such as dimethylformamide and dimethylacetamide; sulfoxide type solvents such as dimethyl sulfoxide; heterocyclic compound type solvents such as N-methylpyrrolidone; and mixed solvents of two or more kinds of these solvents.

The content of the solvent (U) in the water-based medium (II) is preferably in a range from 0.01 to 50% and more preferably from 0.1 to 30%.

The plasticizer (V) is not particularly limited and the following can be exemplified:

(V1) phthalic acid esters having 8 to 60 carbon atoms [e.g. dibutyl phthalate, dioctyl phthalate, butyl benzyl phthalate, and diisodecyl phthalate];

(V2) aliphatic dibasic acid esters having 6 to 60 carbon atoms [e.g. 2-ethylhexyl adipate and 2-ethylhexyl sebacate];

(V3) trimellitic acid esters having 10 to 70 carbon atoms [e.g. 2-ethylhexyl trimellitate and trioctyl trimellitate];

(V4) phosphoric acid esters having 8 to 60 carbon atoms [e.g. triethyl phosphate, tri-2-ethylhexyl phosphate, and tricresyl phosphate];

(V5) fatty acid esters having 8 to 50 carbon atoms [e.g. butyl oleate]; and (V6) mixtures of two or more kinds of these compounds.

The content of the plasticizer (V) in the water-based medium (II) is preferably in a range from 0.01 to 10% and more preferably from 0.1 to 8%.

In the invention, at the time of obtaining the water-based dispersion from the oil-based mixed solution (I) and the water-based medium (II), the mixing ratio is preferably 50 to 500 part and more preferably 80 to 300 part of the water-based medium (II) to 100 part of the oil-based mixed solution (I). The mixing order is not particularly limited and (II) may be added to (I), contrarily, (I) may be added to (II), or they may be added simultaneously. The mixing may be carried out under stirring or dispersing condition or stirring and dispersing treatment may be carried out after mixing them.

To obtain the water-based dispersion from the oil-based mixed solution (I) and the water-based medium (II), a dispersion apparatus may be used. The dispersion apparatus to be used is not particularly limited if it is commonly commercialized emulsifiers and dispersion apparatuses, and examples of the apparatus include batch emulsifiers such as a homogenizer (manufactured by IKA Japan K.K.), Polytron (manufactured by Kinematica), and TK Auto Homomixer (manufactured by Tokushu Kika Kogyo Co., Ltd.), continuous emulsifiers such as Ebara Milder (manufactured by Ebara Corporation), TK Fillmix and TK Pipe Line Homomixer (manufactured by Tokushu Kika Kogyo Co., Ltd.), Colloid Mill (manufactured by Shinko Pantech Co., Ltd.), a slasher and Trigonal wet pulverizer (manufactured by Mitsui Miike Machinery Co., Ltd.), Cabitron (manufactured by Eurotech, Ltd.), and Fine Flow Mill (manufactured by Pacific Machinery & Engineering Co., Ltd.), high-pressure emulsifiers such as Microfluidizer (manufactured by Mizuho Kogyo Co., Ltd.), Nanomizer (manufactured by Nanomizer), and APV Gaulin (manufactured by Gaulin) membrane emulsifiers such as a membrane emulsifier (manufactured by REICA), vibration emulsifiers such as Vibro Mixer (manufactured by REICA), and ultrasonic emulsifiers such as an ultrasonic homogenizer (manufactured by BRANSON). Preferable apparatus among them in terms of evenness of the particle diameter are APV Gaulin, homogenizer, TK Auto-homomixer, Ebara Milder, TK Filmix, and TK Pipeline Homomixer.

After the water-based dispersion containing resin particles is obtained from the water-based dispersion containing the resin (K) obtained by the above-mentioned production method, if necessary by removing the organic solvent, the obtained water-based dispersion is subjected to solid-liquid separation (if necessary, solid-liquid separation is repeated by adding water or the like) and the separated solid is dried for removing the solvents such as organic solvent and water to obtain the resin particles of the invention.

The method for removing the solvents may be the following methods [1] to [3] and combinations of them:
[1] a method for drying out the water-based dispersion under reduced pressure or normal pressure;
[2] a method for solid-liquid separation by a centrifugal separator, Supakura Filter, and/or filter press and drying of the obtained solid; and
[3] a method of freezing the water-based dispersion and drying the frozen dispersion (so-called freeze-drying method).

In the invention of the above-mentioned [1] and [2], commonly known facilities such as a fluidized bed type drying apparatus, a vacuum drying apparatus, and an air circulation drying apparatus may be used as a drying apparatus.

If necessary, an air blowing classification apparatus or sieve may be used for classification to obtain desired particle size distribution.

The remaining solvent amount in the resin particles of the invention after the solvent removal is preferably 200 ppm or less for the organic solvent and 0.5% or lower for water.

In the case of using the resin particles of the seventh invention for a toner, based on the necessity, being mixed with iron powder, glass beads, nickel powder, ferrite, magnetite or ferrite surface-coated with a resin (e.g. acrylic resin and silicone resin), the resin particles are used as a developer for an electric latent image. The weight ratio of the toner and carrier particles is generally 1/99 to 100/0. An electric latent image can also be formed by bringing into friction with a member such as a charging blade in place of the carrier particles.

In the case of using the resin particles of the seventh invention for a toner, the toner is fixed on a support (e.g. paper and a polyester film) by a copying machine or a printer to be a recording material. A method for fixing on the support may be conventionally known heat roll fixing method and flash fixing method.

The composite resin particles of the eighth invention comprises resin particles (P) to be a core and resin fine particles (Q) adhering to the surfaces of the particles (P) and the resin particles (P) contain a resin (p).

The resin (p) comprises a specified polyester resin (p1) obtained by polycondensing at least one kind polyol component and at least one kind polycarboxylic acid component and/or a resin (p2) containing the resin (p1) as a component unit. The resins (p1) and (p2) may include two or more kinds of resins, respectively.

Examples of the resin (p1) may be those same as exemplified for the polyester resin (K1).

In terms of the thermal storage property, low temperature melting property and low temperature fixing property, Tg of the resin (p1) is preferably in a range from 30 to 120° C., more preferably from 35 to 100° C., and even more preferably from 40 to 90° C.

Hydroxy value (mgKOH/g) of the resin (p1) is preferably 70 or lower, more preferably in a range from 5 to 50, and even more preferably in a range from 10 to 40. If the hydroxyl value is 70 or lower, the environment stability and the amount of electrostatic charge in the case of using it for a toner are improved. Acid value (mgKOH/g) of the resin (p1) is preferably 45 or lower, more preferably in a range from 1 to 40, furthermore more preferably in a range from 2 to 35, and even more preferably in a range from 5 to 30. If the acid value is 45 or lower, the environment stability is improved. If the resin has a proper acid value, the rising up of charging is improved and thus it is preferable.

The polyester resin (p1) is preferable to be the polyester resin (A1) of the first invention and/or the polyester resin (A2) of the second invention.

The resin (p) contained in the resin particles (P) of the invention may be a resin (p2) comprising the above-mentioned polyester resin (p1) as a component unit of a polymer skeleton and the resins (p1) and (p2) may be used in combination.

The resin (p2) may be polyurethane resin comprising the resin (p1) and polyisocyanate (15) described below; epoxy resin comprising the resin (p1) and polyepoxide (18) described below; and polyamide resin comprising the resin (p1) and polyamine (16) described below.

Among them are the polyurethane resin and epoxy resin preferable and the polyurethane resin more preferable.

Between the resins (p1) and (p2) is the resin (p2) preferable since the low temperature melting property and low temperature fixing property become more preferable.

The resin (p2) may be obtained by reaction of a precursor (p0) containing the polyester resin (p1) as a component unit in a molecule and a curing agent or by reaction of a combination of a reactive group-containing prepolymer (α) containing the polyester resin (p1) as a component unit and a curing agent (β).

The combination of a reactive group contained in a reactive group-containing prepolymer (α) and a curing agent (β) may be the following combinations [1] and [2]:

combination [1]: combination of a reactive group-containing prepolymer (α1) containing a functional group capable of reacting on an active hydrogen-containing group and an active hydrogen-containing compound (β1); and combination [2]: combination of a reactive group-containing prepolymer (α2) containing an active hydrogen-containing group and a curing agent (β2) having a functional group capable of reacting on an active hydrogen-containing group.

Examples of a functional group capable of reacting with an active hydrogen-containing group include an isocyanate group, a blocked isosyanate group, an epoxy group, an acid anhydride group, and an acid halide (e.g., acid chlorides and acid bromides) group.

Among them, an isocyanate group, a blocked isocyanate group, and an epoxy group are preferably used, more preferably an isocyanate group and a blocked isocyanate group.

In this regard, it is to be noted that the blocked isocyanate group means an isocyanate group that is blocked with a blocking agent.

Examples of the blocking agent include well-known blocking agents such as oximes (e.g., acetoxime, methyl isobutyl ketoxime, diethyl ketoxime, cyclopentanone oxime, cyclohexanone oxime and methyl ethyl ketoxime), lactams (e.g., γ-butyrolactam, ε-caprolactam, and γ-valerolactam), aliphatic alcohols having 1 to 20 carbon atoms (e.g., ethanol, methanol, and octanol), phenols (e.g., phenol, m-cresol, xylenol, and nonylphenol), active methylene compounds (e.g., acetylacetone, ethyl malonate, and ethyl acetoacetate), basic nitrogen-containing compounds (e.g., N,N-diethylhydroxylamine, 2-hydroxypiridine, pyridine N-oxide, and 2-mercaptopyridine), and mixtures of two or more of them.

Among these blocking agents, oximes are preferably used, more preferably methyl ethyl ketoxime.

A method for introducing the reactive group into the polyester resin (p1) is not particularly limited and for example, a method of reacting a compound containing a functional group (reactive group) capable of reacting on the functional group remaining in the polyester resin (p1) can be employed.

According to this method, reaction of polyisocyanate on the polyester resin (p1) is caused to obtain an isocyanate group-containing prepolymer: reaction of block polyisocyanate is caused to obtain block isocyanate group-containing prepolymer: reaction of polyepoxide is caused to obtain epoxy group-containing prepolymer: and reaction of a compound having two or more of acid anhydride groups is caused to obtain acid anhydride group-containing prepolymer.

On the basis of mole ratio [NCO]/[OH] of the isocyanate group [NCO] and hydroxyl group [OH], the ratio of the polyester resin (p1) and the polyisocyanate is preferably in a range from 5/1 to 1/1, more preferably from 4/1 to 1.2/1; and even more preferably from 2.5/1 to 1.5/1. That is, the upper limit of the mole ratio [NCO]/[OH] in this case is preferably 5/1, more preferably 4/1, and even more preferably 2.5/1 and similarly the lower limit is preferably 1/1, more preferably 1.2/1, and even more preferably 1.5/1.

The preferable ratio is same also in the case of other prepolymers with simple change of the components.

The average number of the reactive groups contained in the reactive group-containing prepolymer (α) per one molecule is preferable 1 to 3, more preferably 1.5 to 3, and even more preferably 1.8 to 2.5. If it is within the range, the resin (q) to be obtained by reaction with the curing agent (β) tends to have a high mechanical strength.

Mn of the reactive group-containing prepolymer (α) is preferably in a range from 1,000 to 30,000, more preferably from 1,500 to 20,000, and even more preferably 2,000 to 10,000.

Mw of the reactive group-containing prepolymer (α) is preferably in a range from 1,500 to 50,000, more preferably from 2,000 to 40,000, and even more preferably 4,000 to 20,000.

The viscosity of the reactive group-containing prepolymer (α) is preferably in a range from 50 to 50,000 MPa·S, more preferably from 100 to 5,000 MPa·S, and even more preferably 150 to 3,000 MPa·S at 100° C.

If it is within the range, it tends to be easy to obtain spindle-shaped composite resin particles in a sharp particle size distribution even if the amount of the solvent is small.

Examples of the active hydrogen-containing compound (β1) may include, as described below, water, diols (11), tri- to hexa- or higher hydric polyols (12), dicarboxylic acids (13), tri- and tetra- or higher valent polycarboxylic acids (14), polyamines (16), polythiols (17) and further polyamines optionally blocked with removable compounds and polyols optionally blocked with removable compounds.

Examples of a polyamine blocked with a removable compound include ketimine compounds obtained by dehydration between the polyamines (16) and ketones having 3 to 8 carbon atoms (e.g., acetone, methyl ethyl ketone, and methyl isobutyl ketone), aldimine compounds obtained by dehydration between the polyamines and aldehyde compounds having 2 to 8 carbon atoms (e.g., formaldehyde and acetaldehyde), enamine compounds obtainable from the polyamines and ketones having 3 to 8 carbon atoms or aldehydes having 2 to 8 carbon atoms, and oxazolidine compounds.

Among these active hydrogen group-containing compounds (a021), polyamines which may be blocked, polyols which may be blocked, and water are preferably used, more preferably polyamines which may be blocked and water, even more preferably polyamines, ketimine compounds and water, most preferably 4,4'-diaminodiphenylmethane, xylylenediamine, isophoronediamine, ethylenediamine, diethylenetriamine, triethylenetetramine, ketimine compounds obtainable from these polyamines and ketones, and water.

At the time of producing the resin particles (P) (at the time of producing composite resin particles), if necessary, a reaction terminator (βs) may be used in combination with the active hydrogen-containing compound (β1). Combination use of the compound (β1) with the reaction terminator (βs) at a specified ratio makes it easy to adjust the molecular weight of the resin (q) composing the resin particles (Q).

Examples of such a reaction terminator (βs) include monoamines having 1 to 40 carbon atoms (e.g., diethylamine, dibutylamine, butylamine, laurylamine, monoethanolamine, and diethanolamine); blocked monoamines having 3 to 40 carbon atoms (e.g., ketimine compounds); monools having 1 to 40 carbon atoms (e.g., methanol, ethanol, isopropanol, butanol, and phenol); monomercaptans having 2 to 40 carbon atoms (e.g., butylmercaptan and laurylmercaptan); monoisocyanates having 5 to 40 carbon atoms (e.g., butyl isocyanate, lauryl isocyanate, and phenyl isocyanate); and monoepoxides having 2 to 40 carbon atoms (e.g., butyl glycidyl ether).

In the combination (2) described above (that is, in the combination of the reactive group-containing prepolymer (α2) having an active hydrogen-containing group and the curing agent (β2) having a functional group capable of reacting with an active hydrogen-containing group), examples of the active hydrogen-containing group contained in the reactive group-containing prepolymer (α) include an amino group, hydroxyl groups (an alcoholic hydroxyl group and a phenolic hydroxyl group), a mercapto group, a carboxyl group, and organic groups obtained by blocking these groups with removable compounds (e.g., ketones and aldehydes) (e.g., a ketimine-containing group, an aldimine-containing group, an oxazolidine-contaning group, an enamine-containng group, an acetal-containing group, a ketal-containing group, a thioacetal-containing group, and a thioketal-containing group).

Among these active hydrogen-containing groups, an amino group, hydroxyl groups, and organic groups obtained by blocking these groups with removable compounds are preferably used, more preferably hydroxyl groups.

Examples of the curing agent (β2) having a functional group capable of reacting with an active hydrogen-containing group include the polyisocyanates (15), the polyepoxides (18), the dicarboxylic acids (13), the polycarboxylic acids (14), compounds having two or more acid anhydride groups, and compounds having two or more acid halide groups.

Among these curing agents (β2), the polyisocyanates and the polyepoxides are preferably used, more preferably the polyisocyanates.

Examples of the compounds having two or more acid anhydride groups are copolymers of pyromellitic anhydride and maleic acid anhydride.

Examples of the compounds having two or more acid halide groups are acid halides (acid chlorides, acid bromides, and acid iodides) of dicarboxylic acids (13) or polycarboxylic acids (14).

At the time of producing the resin particles (P) (at the time of producing composite resin particles), if necessary, a reaction terminator (βs) may be used in combination with the curing agent (β2) containing a functional group reactive on the active hydrogen-containing group. Combination use of the curing agent (β2) with the reaction terminator (βs) at a specified ratio makes it easy to adjust the molecular weight of the resin (q) composing the resin particles (Q).

With respect to the use amount of the curing agent (β), the equivalent ratio [α]/[β] of the equivalent [α] of the reactive group of the reactive group-containing prepolymer (α) and the equivalent [β] of the active hydrogen-containing group of the curing agent (β) is preferably in a range from 1/2 to 2/1, more preferably from 1.5/1 to 1/1.5; and even more preferably 1.2/1 to 1/1.2. That is, the upper limit of the ratio [α]/[β] is preferably 2/1, more preferably 1.5/1, and even more preferably 1.2/1 and similarly the lower limit is preferably 1/2, more preferably 1/1.5, and even more preferably 1/1.2.

In this connection, in the case the curing agent (β) is water, water is considered to be a compound having divalent active hydrogen-containing group.

Mw of the resin (p) obtained by the reactive group-containing prepolymer (α) and the curing agent (β) is preferably 3,000 or higher, more preferably 3,000 to 10,000,000, and even more preferably 5,000 to 1,000,000. That is, the upper limit of Mw of the resin (p) is preferably 10,000,000 and more preferably 1,000,000 and similarly the lower limit is preferably 3,000 and more preferably 5,000.

The length of time of reaction between the reactive group-containing prepolymer (α) and the curing agent (β) is selected according to reactivity that depends on the combination of the kind of reactive group contained in the prepolymer (a01) and the curing agent (β), but is preferably in the range of 10 minutes to 40 hours, more preferably in the range of 30 minutes to 24 hours, even more preferably in the range of 30 minutes to 8 hours.

Further, the temperature of the reaction is preferably in the range of 0 to 150° C., more preferably in the range of 50 to 120° C.

As necessary, a well-known catalyst can be used. Specifically, in the case of the reaction between isocyanate and an active hydrogen-containing compound by way of example, dibutyltin laurate, dioctyltin laurate or the like can be used.

The resin (p) of the resin particles of the invention may contain one or more kinds of other resins (p3) besides the resins (p1) and/or (p2) to an extent that the properties of the resins (p1) and (p2) are not deteriorated.

Examples of the resins (p3) are, besides the resins (p1) and (p2), polyester resin, vinyl resin, polyurethane resin, epoxy resin, polyester resin, polyamide resin, polyimide resin, silicon type resin, phenol resin, melamine resin, urea resin, aniline resin, ionomer resin, and polycarbonate resin. Preferable examples among them are vinyl resin, polyurethane resin, epoxy resin, polyester resin, and combinations of these resins. Practical examples of vinyl resin, polyurethane resin, epoxy resin, and polyester resin are those described in International publication WO 03/106541.

Mn of the resin (p3) is preferably in a range from 500 to 2,000,000 and more preferably from 1000 to 1,000,000. The content of the resin (p3) in the resin (p) is preferably 80% or less, more preferably 60% or less, and even more preferably 5 to 40%.

The Mn, melting point, Ts, and SP value of the resin (p) may be adjusted property in the preferable ranges depending on the uses.

For example, in the case the composite resin particles of the invention are used for a resin for slush molding and a powder coating, Mn of the resin (p) is generally from 1,000 to 500,000, preferably from 1,500 to 200,000, more preferably from 2000 to 100,000, and even more preferably from 2,500 to 10,000. The melting point (measured by DSC, hereinafter the melting point is value measured by DSC) of the resin (p) is generally in a range from 0 to 200° C., preferably from 35 to 150° C., more preferably from 40 to 120° C., and even more preferably from 45 to 100° C. Tg of the resin (p) is generally in a range from −60 to 100° C., preferably from −50 to 90° C., more preferably from −40 to 80° C., and even more preferably from −30 to 60° C. The SP value of the resin (p) is generally in a range from 7 to 18, preferably from 8 to 16, and more preferably from 9 to 14.

In the case of using them for a toner for electrophotography, electrostatic recording, and electrostatic printing, Mn of the resin (p) is generally 1,000 to 5,000,000, preferably from 1,500 to 500,000, more preferably from 2,000 to 100,000, and even more from preferably 2,500 to 50,000. The melting point of the resin (p) is generally in a range from 20 to 300° C., preferably from 40 to 250° C., more preferably from 60 to 220° C., and even more preferably from 80 to 200° C. Tg of the resin (p) is generally in a range from 20 to 200° C., preferably from 30 to 180° C., more preferably from 35 to 160° C., and even more preferably from 40 to 100° C. The SP value of the resin (p) is generally in a range from 7 to 16, preferably from 8 to 15, and more preferably from 9 to 14.

Based on the necessity, besides of the resin (p), the resin particles (P) may contain one or more kinds of additives (T) (e.g. various kinds of additives such as a filler, a colorant, a plasticizer, a release agent, a charge control agent, an ultraviolet absorbent, an antioxidant, an antistatic agent, a flame retardant, an antibacterial agent, and a preserver).

Examples of the filler is silica, alumina, titanium oxide, barium titanate, magnesium titanate, calcium titanate, strontium titanate, zinc oxide, tin oxide, silicic sand, clay, mica, wollastonite, diatomaceous earth, chromium oxide, cerium oxide, chromium oxide, cerium oxide, Bengals, antimony trioxide, magnesium oxide, zirconium oxide, barium sulfate, barium carbonate, calcium carbonate, silicon carbide, and silicon nitride.

Conventionally known dyes and pigments are all usable as the colorant and for example, the above-mentioned exemplified ones and those described in International publication WO 03/106541 are also usable.

The above-mentioned plasticizer (V) is used as the plasticizer.

Waxes and silicone oils with a dynamic viscosity of 30 to 100,000 cSt at 25° C. can be used as the release agent.

Conventionally known waxes are usable as the waxes and examples of the waxes are polyolefin waxes (e.g. polyethylene wax and polypropylene wax); long chain hydrocarbons (e.g. paraffin wax and sasol wax); and carbonyl-containing waxes. Preferable examples among them are carbonyl-containing waxes. Examples of the carbonyl-containing waxes are polyalkanoic acid esters (e.g. carnauba wax, montan wax, trimethylol propane tribehenate, pentaerythritol tetrabehenate, pentaerythritol diacetate dibehenate, glycerin tribehenate, and 1,18-octadecanediol distearate); polyalkanol esters (e.g. tristearyl trimellitate and distearyl maleate); polyalkanoic acid amides (e.g. ethylenediamine dibehenylamide); polyalkylamide (e.g. trimellitic acid tris(stearylamide)); and dialkyl ketones (distearyl ketone). Preferable examples among the carbonyl-containing waxes are polyalkanoic acid esters.

Conventionally known charge control agents are all usable and examples of those exemplified above and those described in International publication WO 03/106541.

With respect to the component ratios of the resin particles (P) of the invention, based on the weight of the composition, the ratio of the resin (p) is preferably in a range from 30 to 97%, more preferably from 40 to 95%, and even more preferably from 45 to 92%; and with respect to the additives, the ratio of the colorant is preferably in a range from 0.05 to 60%, more preferably from 0.1 to 55%, and even more preferably from 0.5 to 50%; the ratio of the release agent is preferably in a range from 0 to 30%, more preferably from 0.5 to 20%, and even more preferably from 1 to 10%; the ratio of the charge control agent is preferably in a range from 0 to 20%, more preferably from 0.1 to 10%, and even more preferably from 0.5 to 7.5%; the ratio of the fluidizing agent is preferably in a range from 0 to 10%, more preferably from 0 to 5%, and even more preferably from 0.1 to 4%. The total content of these additives is preferably in a range from 3 to 70%, more preferably from 5 to 60%, and even more preferably from 8 to 55%. If the component ratios are within the above-mentioned ranges, it becomes easy to obtain a toner with excellent electrostatic property.

The volume average particle diameter of the resin particles (P) of the invention can be properly planed depending on the uses of the composite resin particles of the invention.

In the case of using them for a powder coating, a resin for slush molding and a hot-melt adhesive, it is generally in a range from 10 to 300 μm, preferably from 50 to 300 μm, more preferably from 50 to 200 μm, and even more preferably from 80 to 180 μm, and in the case of using them for an electrophotographic toner, an electrostatic recording toner, and an electrostatic printing toner, it is generally in a range from 0.1 to 100 μm, preferably from 0.5 to 50 μm, more preferably from 1 to 10 μm, and even more preferably from 2 to 8 μm.

The volume average particle diameter can be measured by laser type particle diameter distribution measurement apparatus LA-920 (manufactured by Horiba Seisakusho), electrophoresis particle diameter distribution measurement apparatus ELS-8000 (manufactured by Otsuka Denshi), or Multisizer III (manufactured by Coulter Co.).

The resin (q) is contained in the resin particles (Q) of the invention.

The resin (q) may be thermoplastic resin and thermosetting resin and for example, vinyl resin, polyurethane resin, epoxy resin, polyester, polyamide, polyimide, silicone type resin, phenol resin, melamine resin, urea resin, aniline resin, ionomer resin, polycarbonate resin, and mixtures of them may be used. From a viewpoint that evenly fine and spherical resin fine particles can be obtained easily, vinyl resin, polyurethane resin, epoxy resin, polyester, and mixtures of them are preferable and vinyl resin, epoxy resin, polyester, and mixtures of them are more preferable.

Preferable resins for the resin (q), that is, vinyl resin, polyurethane resin, epoxy resin, and polyester will be described and with respect to other resins, they may be used similarly. Practical examples of the resin (q) are those described below as well as those described in International publication WO 03/106541.

The vinyl resin may include polymers obtained by homopolymerizing or copolymerizing vinyl monomers. Conventionally known polymerization catalysts may be used for the polymerization.

As vinyl monomers, the following compounds (1) to (10) can be used.

(1) Vinyl Hydrocarbons:
(1-1) Aliphatic Vinyl Hydrocarbons:
alkenes having 2 to 12 carbon atoms (e.g., ethylene, propylene, butene, isobutylene, pentene, heptene, diisobutylene, octene, dodecene, octadecene, and α-olefins having 3 to 24 carbon atoms); and alkadienes having 4 to 12 carbon atoms (e.g., butadiene, isoprene, 1,4-pentadiene, and 1,6-hexadiene).

(1-2) Alicyclic Vinyl Hydrocarbons:
mono- or di-cycloalkenes having 6 to 15 carbon atoms (e.g., cyclohexene, vinylcyclohexene, and ethylidenebicycloheptene); mono- or di-cycloalkadienes having 5 to 12 carbon atoms (e.g., (di)cyclopentadiene); terpenes (e.g., pinene, limonene, and indene); and the like.

(1-3) Aromatic Vinyl Hydrocarbons:
styrene; hydrocarbyl(alkyl, cycloalkyl, aralkyl, and/or alkenyl each having 1 to 24 carbon atoms)-substituted styrene (e.g., α-methylstyrene, vinyltoluene, 2,4-dimethylstyrene, ethylstyrene, butylstyrene, phenylstyrene, cyclohexylstyrene, benzylstyrene, crotylbenzene, and divinylbenzene); vinylnaphthalene; and the like.

(2) Carboxyl Group-Containing Vinyl Monomers and Salts Thereof:
unsaturated monocarboxylic acids having 3 to 30 carbon atoms (e.g., (meth)acrylic acid, crotonic acid, isocrotonic acid and cinnamic acid); unsaturated dicarboxylic acids having 3 to 30 carbon atoms or anhydrides thereof (e.g., maleic acid (anhydride), fumaric acid, itaconic acid, citraconic acid (anhydride), and mesaconic acid); monoalkyl (having 1 to 24 carbon atoms) esters of unsaturated dicarboxylic acids having 3 to 30 carbon atoms (e.g., monomethyl ester of maleic acid, monooctadecyl ester of maleic acid, monoethyl ester of fumaric acid, monobutyl ester of itaconic acid, glycol monoether of itaconic acid); and the like.

Examples of salts of the carboxyl group-containing vinyl monomers include alkali metal salts (e.g., sodium salts and potassium salts), alkaline-earth metal salts (e.g., calcium salts and magnesium salts), ammonium salts, amine salts, and quaternary ammonium salts. The amine salts are not limited to any specific ones as long as they are amine compounds, but primary amine salts (e.g., ethylamine salts, butylamine salts, and octylamine salts), secondary amine salts (e.g., diethylamine salts and dibutylamine salts), and tertiary amine salts (e.g., triethylamine salts and tributylamine salts) can be mentioned, for example. As the quaternary ammonium salts, tetraethylammonium salts, lauryltriethylammonium salts, and the like can be mentioned.

Specific examples of salts of the carboxyl group-containing vinyl monomers include sodium acrylate, sodium methacrylate, monosodium maleate, disodium maleate, potassium acrylate, potassium methacrylate, monopotassium maleate, lithium acrylate, cesium acrylate, ammonium acrylate, calcium acrylate, aluminum acrylate, and the like.

(3) Sulfo Group-Containing Vinyl Monomers and Salts Thereof:

alkenesulfonic acids having 2 to 14 carbon atoms (e.g., vinylsulfonic acid, (meth)allylsulfonic acid, and methylvinylsulfonic acid); styrenesulfonic acid and alkyl (having 2 to 24 carbon atoms) derivatives thereof (e.g., α-methylstyrenesulfonic acid); sulfa (hydroxy) alkyl-(meth)acrylates having 5 to 18 carbon atoms (e.g., sulfopropyl(meth)acrylate, 2-hydroxy-3-(meth)acryloxypropylsulfonic acid); sulfo(hydroxy)alkyl(meth)acrylamides having 5 to 18 carbon atoms (e.g., 2-(meth)acryloylamino-2,2-dimethylethanesulfonic acid, 2-(meth)acrylamide-2-methylpropanesulfonic acid); alkyl (having 3 to 18 carbon atoms) allylsulfosuccinic acids (e.g., propylallylsulfosuccinic acid, butylallylsulfosuccinic acid); poly(n=2 to 30)oxyalkylene(oxyethylene, oxypropylene, oxybutylene: homo, random, or block)mono(meth) acrylate sulfates (e.g., poly(n=5 to 15)oxyethylene monomethacrylate sulfate); polyoxyethylene polycyclic phenyl ether sulfates (e.g., sulfates represented by the general formula (1-1) or (1-2); sulfonic acids represented by the general formula (1-3); salts thereof).

It is to be noted that counter ions mentioned with reference to "(2) carboxyl group-containing vinyl monomers and salts thereof" or the like are used for the salts.

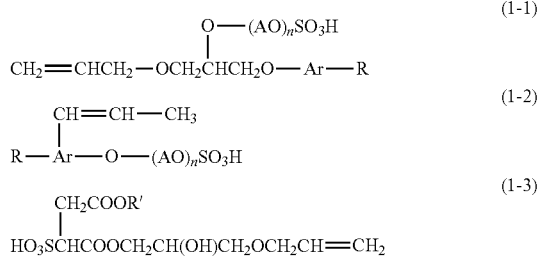

wherein R represents an alkyl group having 1 to 15 carbon atoms, AO represents an oxyalkylene group having 2 to 4 carbon atoms, and wherein when n is plural, oxyalkylene groups may be the same or different, and when different, they may be random, block and/or combination of random and block, Ar represents a benzen ring, n is an integer of 1 to 50, and R' represents an alkyl group having 1 to 15 carbon atoms which may be substituted by a fluorine atom.

(4) Phosphono Group-Containing Vinyl Monomers and Salts Thereof:

(meth)acryloyloxyalkyl (having 1 to 24 carbon atoms) monophosphates (e.g., 2-hydroxyethyl(meth)acryloyl phosphate and phenyl-2-acryloyloxyethyl phosphate), and (meth) acryloyloxyalkyl(having 1 to 24 carbon atoms)phosphonic acids (e.g., 2-acryloyloxyethylphosphonic acid).

(5) Hydroxyl Group-Containing Vinyl Monomers:

hydroxystyrene, N-methylol(meth)acrylamide, hydroxyethyl(meth)acrylate, hydroxypropyl(meth)acrylate, polyethylene glycol mono(meth)acrylate, (meth)allyl alcohol, crotyl alcohol, isocrotyl alcohol, 1-butene-3-ol, propargyl alcohol, 2-hydroxyethyl propenyl ether, and allyl ether of sucrose, and the like.

(6) Nitrogen-Containing Vinyl Monomers:

(6-1) Amino Group-Containing Vinyl Monomers:

aminoethyl (meth)acrylate, dimethylaminoethyl (meth) acrylate, diethylaminoethyl (meth)acrylate, t-butylaminoethylmethacrylate, N-aminoethyl (meth)acrylamide, (meth) allylamine, morpholinoethyl (meth)acrylate, 4-vinylpyridine, 2-vinylpyridine, crotylamine, N,N-dimethylaminostyrene, methyl α-acetaminoacrylate, vinylimidazole, N-vinylpyrrole, N-vinylthiopyrrolidone, N-arylphenylenediamine, aminocarbazole, salts thereof, and the like.

(6-2) Amide Group-Containing Vinyl Monomers:

(meth) acrylamide, N-methyl(meth)acrylamide, N-butylacrylamide, diacetoneacrylamide, N-methylol(meth)acrylamide, N,N'-methylene-bis(meth)acrylamide, cinnamamide, N,N-dimethylacrylamide, and the like.

(6-3) Nitrile Group-Containing Vinyl Monomers Having 3 to 10 Carbon Atoms:

(meth)acrylonitrile, cyanostyrene, cyanoacrylate, and the like.

(6-4) Quaternary Ammonium Cation Group-Containing Vinyl Monomers:

quaternization products (obtained using a quaternizing agent such as methyl chloride, dimethyl sulfate, benzyl chloride, dimethyl carbonate or the like) of tertiary amine group-containing vinyl monomers such as dimethylaminoethyl (meth)acrylate, diethylaminoethyl (meth)acrylate, dimethylaminoethyl (meth) acrylamide, diethylaminoethyl(meth) acrylamide, diallylamine, and the like (e.g., dimethyldiallylammonium chloride and trimethylalkylammonium chloride).

(6-5) Nitro Group-Containing Vinyl Monomers Having 8 to 12 Carbon Atoms:

nitrostyrene and the like.

(7) Epoxy Group-Containing Vinyl Monomers Having 6 to 18 Carbon Atoms:

glycidyl (meth)acrylate, tetrahydrofurfuryl (meth)acrylate, p-vinylphenyl oxide, and the like.

(8) Halogen-Containing Vinyl Monomers Having 2 to 16 Carbon Atoms:

vinyl chloride, vinyl bromide, vinylidene chloride, allyl chloride, chlorostyrene, bromostyrene, dichlorostyrene, chloromethylstyrene, tetrafluorostyrene, chloroprene, and the like.

(9) Vinyl Esters, Vinyl (Thio)Ethers, Vinyl Ketones, and Vinyl Sulfones:

(9-1) Vinyl Esters Having 4 to 16 Carbon Atoms:

vinyl acetate, vinyl butyrate, vinyl propionate, vinyl butyrate, diallyl phthalate, diallyl adipate, isopropenyl acetate, vinyl methacrylate, cyclohexyl methacrylate, benzyl methacrylate, phenyl (meth)acrylate, vinyl methoxyacetate, vinyl benzoate, alkyl(meth)acrylates having an alkyl group containing 1 to 50 carbon atoms (e.g., methyl (meth)acrylate, ethyl (meth)acrylate, butyl (meth)acrylate, dodecyl (meth) acrylate, heptadecyl (meth)acrylate), dialkylfumarates (whose two alkyl groups are straight, branched or alicyclic groups having 2 to 8 carbon atoms), dialkyl maleates (whose two alkyl groups are straight, branched or alicyclic groups having 2 to 8 carbon atoms), poly(meth)allyloxyalkanes (e.g., diallyloxyethane, triallyloxyethane, tetraallyloxypropane), vinyl-based monomers having a polyalkylene glycol chain (e.g., polyethylene glycol (molecular weight: 300) mono (meth)acrylate, polypropylene glycol (molecular weight: 500) monoacrylate, methyl alcohol-ethylene oxide (10 mol) adduct (meth)acrylate, and lauryl alcohol-ethylene oxide (30 mol) adduct (meth)acrylate], and poly(meth)acrylates (e.g., poly(meth)acrylates of polyhydric alcohols: ethylene glycol di(meth)acrylate, propylene glycol di(meth)acrylate, polyethylene glycol di(meth)acrylate), and the like.

(9-2) Vinyl (Thio)Ethers Having 3 to 16 Carbon Atoms:

vinyl methyl ether, vinyl ethyl ether, vinyl butyl ether, vinyl 2-ethylhexyl ether, vinyl phenyl ether, vinyl 2-methoxyethyl ether, methoxybutadiene, and phenoxystyrene, and the like.

(9-3) Vinyl Ketones Having 4 to 12 Carbon Atoms (e.g., Vinyl Methyl Ketone, Vinyl Ethyl Ketone, and Vinyl Phenyl Ketone):

vinyl sulfones having 2 to 16 carbon atoms (e.g., divinyl sulfide, p-vinyl diphenyl sulfide, vinyl ethyl sulfide, vinyl ethyl sulfone, divinyl sulfone, and divinyl sulfoxide), and the like.

(10) Other Vinyl Monomers:

isocyanatoethyl (meth) acrylate, m-isopropenyl-α, α-dimethylbenzyl isocyanate, and the like.

Among these vinyl monomers, vinyl hydrocarbons, carboxyl group-containing vinyl monomers and salts thereof, sulfonic acid group-containing vinyl monomers and salts thereof, hydroxyl group-containing vinyl monomers, and nitrogen-containing vinyl monomers are preferably used, more preferably, vinyl hydrocarbons, carboxyl group-containing vinyl monomers and salts thereof, and sulfonic acid group-containing vinyl monomers and salts thereof, even more preferably aromatic vinyl-based hydrocarbons, carboxyl group-containing vinyl monomers and salts thereof, and sulfonic acid group-containing vinyl monomers and salts thereof.

Among vinyl resins, as polymers obtained by copolymerizing vinyl monomers (copolymers of vinyl monomers), polymers obtained by copolymerizing two or more of the monomers mentioned in (1) to (10) in any ratio are used. Examples of such copolymers include styrene-(meth)acrylate copolymer, styrene-butadiene copolymer, (meth)acrylic acid-(meth)acrylate copolymer, styrene-acrylonitrile copolymer, styrene-maleic acid (anhydride) copolymer, styrene-(meth)acrylic acid copolymer, styrene-(meth)acrylic acid-divinylbenzene copolymer, and styrene-styrenesulfonic acid-(meth)acrylate copolymer, and the like.

Since the composite resin particles are preferable to be produced by a production method described below, that is a production method involving a step of dispersing the resin (p), a precursor (p0) of the resin (p), or a their solution in a water-based dispersion containing the resin fine particles (Q), the resin fine particles (Q) are preferable to be dispersed in a water-based dispersion. Accordingly, the resin (Q) is preferable not to be dissolved completely in water at least under the condition for forming the water-based dispersion. Therefore, in the case the vinyl resin is a copolymer, although it depends on the types of monomers to be selected, the ratio of a hydrophobic monomer and a hydrophilic monomer composing the vinyl resin is preferably 10% or higher of the hydrophobic monomer in the total weight of the monomers and more preferably 30% or higher. If the ratio of the hydrophobic monomer is 10% or lower, the vinyl resin tends to be water-soluble and the particle diameter evenness of the composite resin particles tends to be lowered.

Herein, the hydrophilic monomer means a monomer soluble in water at an optional ratio and the hydrophobic monomer means a monomer other than the former (a monomer which may be dissolved in an amount of less than 100 g in 100 g of water at 25° C.) (hereinafter, it may be same for resins below).

As the polyester are usable polycondensation products of polyols with polycarboxylic acids, their anhydrides or esters of lower alkyl (alkyl having 1 to 4 carbon atoms).

A conventionally known polycondensation catalyst may be used for the polycondensation reaction.

Examples usable as the polyols are diols (11) and tri- to octa- or higher hydric polyols (12).

Examples usable as polycarboxylic acids, their anhydrides and esters of lower alkyl are dicarboxylic acids (13), tri- to hexa- or higher valent polycarboxylic acids (14), their anhydrides and lower alkyl esters.

Examples of the diols (11) and tri- to octa- or higher hydric polyols (12) are those exemplified for the polyhydric alcohols composing the above-mentioned polyol component.

Among them are aliphatic polyhydric alcohols and AO adducts of novolak resins preferable and AO adducts of novolak resins more preferable.

Examples usable as the dicarboxylic acids (13) are the above-mentioned aliphatic (including alicyclic) dicarboxylic acids and aromatic dicarboxylic acids.

Among them are alkenedicarboxylic acids and aromatic dicarboxylic acids preferable and aromatic dicarboxylic acids more preferable.

Examples usable as the tri- to hexa- or higher valent polycarboxylic acids (14) are the above-mentioned aliphatic (including alicyclic) polycarboxylic acids and aromatic polycarboxylic acids.

Examples usable as the acid anhydrides of the dicarboxylic acids (13) and the tri- to hexa- or higher valent polycarboxylic acids (14) are trimellitic anhydride and pyromellitic anhydride. Examples of their lower alkyl esters are methyl ester, ethyl ester, and isopropyl ester.

For the polyester, diols, tri- to octa- or higher hydric polyols, dicarboxylic acids, tri- to hexa- or higher valent polycarboxylic acids, and their mixtures may be used in form of a mixture at any optional ratio. The equivalent ratio [OH]/[COOH] of the hydroxyl group [OH] and carboxyl group [COOH] is preferably (2/1) to (1/2), more preferably (1.5/1) to (1/1), and even more preferably (1.3/1) to (1.02/1).

Also, the ester group equivalent in the polyester (the molecular weight per an equivalent of ester group) is preferably in a range from 50 to 2,000, more preferably from 60 to 1,000, and even more preferably from 70 to 500.

As the polyurethane are polyaddition products of polyisocyanates (15) and active hydrogen-containing compound (β1) [e.g. water, diols (11), tri- to octa- or higher hydric polyols (12), dicarboxylic acids (13), tri- to hexa- or higher valent polycarboxylic acids (14), polyamines (16), and polythiols (17)] usable.

Conventionally known polyaddition catalysts may be used for the polyaddition reaction.

Examples of the polyisocyanates (15) include aromatic polyisocyanates having 6 to 20 carbon atoms (exclusive of the carbon in an NCO group; the same applies to the following description), aliphatic polyisocyanates having 2 to 18 carbon atoms, alicyclic polyisocyanates having 4 to 15 carbon atoms, araliphatic polyisocynates having 8 to 15 carbon atoms, and modification products of these polyisocyanates (e.g., modified polyisocyanates having urethane, carbodiimide, allophanate, urea, biuret, urethodione, urethoimine, isocyanurate, or oxazolidone groups), mixtures of two or more of them, and the like.

Examples of the aromatic polyisocyanates include 1,3- or 1,4-phenylene diisocyanate, 2,4- or 2,6-tolylene diisocyanate (TDI), crude TDI, 2,4'- or 4,4'-diphenylmethane diisocyanate (MDI), crude MDI [phosgenide of crude diaminophenylmethane [a condensation product of formaldehyde with aromatic amine (aniline) or a mixture containing such aromatic amine; a mixture of diaminodiphenylmethane and a small amount (e.g., 5 to 20%) of polyamine having 3 or more amino groups]: polyallyl polyisocyanate (PAPI)], 1,5-naphthylene diisocyante, 4,4',4"-triphenylmethane triisocyanate, m- or p-isocyanatophenylsulfonyl isocyanate, mixtures of two or more of them, and the like.

Examples of the aliphatic polyisocyanates include ethylene diisocyanate, tetramethylene diisocyanate, hexamethylenediisocyanate (HDI), dodecamethylenediisocyanate, 1,6,11-undecane triisocyanate, 2,2,4-trimethylhexamethylene diisocyanate, lysine diisocyanate, 2,6-diisocyanatomethyl caproate, bis(2-isocyanatoethyl) fumarate, bis(2-isocyanatoethyl) carbonate, 2-isocyanatoethyl-2,6-diisocyanatohexanoate, mixtures of two or more of them, and the like.

Examples of the alicyclic polyisocyanates include isophorone diisocyanate (IPDI), dicyclohexylmethane-4,4'-diisocyanate (hydrogenated MDI), cyclohexylene diisocyanate, methylcyclohexylene diisocyanate (hydrogenated TDI), bis(2-isocyanatoethyl)-4-cyclohexene-1,2-dicarboxylate, 2,5- or 2,6-norbornane diisocyanate, mixtures of two or more of them, and the like.

Examples of the araliphatic polyisocyanates include m- or p-xylylene diisocyanate (XDI), α,α,α',α'-tetramethylxylylene diisocyanate (TMXDI), mixtures of two or more of them, and the like.

Examples of the modification products of polyisocyanates include modified polyisocyanates having urethane, carbodiimide, allophanate, urea, biuret, urethodione, urethoimine, isocyanurate and/or oxazolidone groups, such as modified MDI (e.g., urethane-modified MDI, carbodiimide-modified MDI, and trihydrocarbyl phosphate-modified MDI), urethane-modified TDI, mixtures of two or more of them [e.g., a mixture of the modified MDI and the urethane-modified TDI (isocyanate-containing prepolymer)], and the like.

Among these polyisocyanates, aromatic polyisocyanates, aliphatic polyisocyanates, and alicyclic polyisocyanates are preferably used, more preferably TDI, MDI, HDI, hydrogenated MDI, and IPDI.

As polyamines (16), aliphatic polyamines having 2 to 18 carbon atoms, aromatic polyamines having 6 to 20 carbon atoms, and the like can be used.

As aliphatic polyamines having 2 to 18 carbon atoms, (1) aliphatic polyamines, (2) alkyl (having 1 to 4 carbon atoms)—or hydroxyalkyl (having 2 to 4 carbon atoms)—substituted aliphatic polyamines mentioned above, (3) alicyclic or heterocycle-containing aliphatic polyamines, (4) aromatic ring-containing aliphatic amines having 8 to 15 carbon atoms, and the like can be used.

(1) Examples of the aliphatic polyamines include alkylenediamines having 2 to 12 carbon atoms (e.g., ethylenediamine, propylenediamine, trimethylenediamine, tetramethylenediamine, and hexamethylenediamine), polyalkylene (having 2 to 6 carbon atoms) polyamines [e.g., diethylenetriamine, iminobispropylamine, bis(hexamethylene)triamine, triethylenetetramine, and pentaethylenehexamine], and the like.

(2) Examples of the alkyl (having 1 to 4 carbon atoms)—or hydroxyalkyl (having 2 to 4 carbon atoms)—substituted aliphatic polyamines mentioned above include dialkyl (having 1 to 3 carbon atoms) aminopropylamine, trimethylhexamethylenediamine, aminoethylethanolamine, 2,5-dimethyl-2,5-hexamethylenediamine, and methyliminobispropylamine, and the like.

(3) Examples of the alicyclic or heterocycle-containing aliphatic polyamines include alicyclic polyamines having 4 to 15 carbon atoms {e.g., 1,3-diaminocyclohexane, isophoronediamine, menthenediamine, 4,4'-methylenedicyclohexanediamine (hydrogenated methylenedianiline), and 3,9-bis (3-aminopropyl)-2,4,8,10-tetraoxaspiro[5,5]undecane}, and heterocyclic polyamines having 4 to 15 carbon atoms [e.g., piperazine, N-aminoethylpiperazine, 1,4-diaminoethylpiperazine, and 1,4-bis(2-amino-2-methylpropyl)piperazine], and the like.

(4) Examples of the aromatic ring-containing aliphatic amines (having 8 to 15 carbon atoms) include xylylenediamine, tetrachloro-p-xylylenediamine, and the like.

As the above-mentioned aromatic polyamines having 6 to 20 carbon atoms, (1) unsubstituted aromatic polyamines, (2) aromatic polyamines nuclearly substituted by one or more alkyl groups (having 1 to 4 carbon atoms, such as methyl, ethyl, n- or i-propyl and butyl), (3) aromatic polyamines having one or more electron-attracting groups such as halogen (e.g., Cl, Br, I, and F), alkoxy groups (e.g., methoxy and ethoxy), and a nitro group, and (4) secondary amino group-containing aromatic polyamines, and the like can be used.

(1) Examples of the unsubstituted aromatic polyamines include 1,2-, 1,3- or 1,4-phenylenediamine, 2,4'- or 4,4'-diphenylmethanediamine, crude diphenylmethanediamine (polyphenylpolymethylenepolyamine), diaminodiphenyl sulfone, benzidine, thiodianiline, bis(3,4-diaminophenyl) sulfone, 2,6-diaminopyridine, m-aminobenzylamine, triphenylmethane-4,4',4"-triamine, naphthylenediamine, mixtures of two or more of them, and the like.

[2] Examples of aromatic polyamines having a nuclear-substituting alkyl group (e.g. alkyl having 1 to 4 carbon atoms such as methyl, ethyl, n- or iso-propyl and butyl) are 2,4- or 2,6-tolyelendiamine, crude tolylenediamine, diethyltolylenediamine, 4,4'-diamino-3,3'-dimethyldiphenylmethane, 4,4'-bis(o-toluidine), dianisidine, 1,3-dimethyl-2,4-diaminobenzene, and their mixtures.

[3] Examples of aromatic polyamines having a nuclear-substituting electron attractive group (e.g. halogen such as Cl, Br, I, and F; alkoxy group such as methoxy and ethoxy; and nitro group) are methylene bis(o-chloroaniline), 4-chloro-o-phenylenediamine, 2-chloro-1,4-phenylenediamine, 3-amino-4-chloroaniline, and 4-bromo-1,3-phenylenediamine, (4) Examples of the secondary amino group-containing aromatic polyamines include aromatic polyamines obtained by replacing some or all of —NH$_2$ groups in the aromatic polyamines (1) to (3) with —NH—R' groups (wherein R' represents an alkyl group such as a lower alkyl group having 1 to 4 carbon atoms e.g., methyl, ethyl, or the like), such as 4,4'-di(methylamino)diphenylmethane, and 1-methyl-2-methylamino-4-aminobenzene, and the like; polyamide polyamines such as low molecular-weight polyamide polyamines obtained by condensation of dicarboxylic acids (e.g., dimer acid) with excess (that is, 2 or more mols per mol of the acid) polyamines (e.g., the alkylenediamines and the polyalkylenepolyamines mentioned above); polyether polyamines such as hydrides of cyanoethylation products of polyether polyols (e.g., polyalkylene glycol); and the like.

As polythiols (17), dithiols having 2 to 24 carbon atoms, tri- to hexa- or higher valent polythiols having 5 to 30 carbon atoms, and the like can be used.

Examples of dithiols include ethylenedithiol, 1,4-butanedithiol, 1,6-hexanedithiol, and the like.

Examples of polythiols include Capcure-3800 (manufactured by Japan Epoxy Resins Co., Ltd.), polyvinylthiol, and the like.

Among these active hydrogen-containing compounds (β1), water, the diols (11), the polyols (12), the dicarboxylic acids (13), and the polyamines (16) are preferably used, more preferably water, the diols (11), the polyols (12), and the polyamines (16), even more preferably the dials (11), the polyols (12), and the polyamines (16).

As epoxy resins, ring-opening polymerization products of polyepoxides (18), polyaddition products of the polyepoxides (18) and the active hydrogen-containing compounds (β1), and curing reaction products of the polyepoxides (18) and acid anhydrides of the dicarboxylic acids (13) or the polycarboxylic acids (14) having 3 to 4 or more carboxyl groups, and the like can be used.

In ring-opening polymerization reaction, polyaddition reaction, and curing reaction, a well-known catalyst or the like can be used.

The polyepoxides (18) are not particularly limited if they have two or more epoxy groups in a molecule and in terms of mechanical properties of cured products, those having 2 to 6 epoxy groups in a molecule are preferable.

The epoxy equivalent (molecular weight per one epoxy group) of the polyepoxides (18) is preferably in a range from 65 to 1000, more preferably from 70 to 500, and even more preferably from 90 to 300. That is, the upper limit of the epoxy equivalent is preferably 1000, more preferably 500, and even more preferably 300, and similarly the lower limit is preferably 65, more preferably 70, and even more preferably 90. If the epoxy equivalent exceeds 1000, the crosslinking structure tends to be loosened and thus the physical properties such as water-proofness, chemical resistance, and mechanical strength of the cured products tend to be deteriorated and on the other hand, those having an epoxy equivalent lower than 65 are difficult to be made available (difficult to be synthesized).

As polyepoxides (18), aromatic polyepoxides, heterocycle-containing polyepoxides, alicyclic polyepoxides, aliphatic polyepoxides, and the like can be used.

As aromatic polyepoxides, glycidyl ethers of polyhydric phenols, glycidyl esters of polyhydric phenols, glycidyl aromatic polyamines, and glycidylation products of aminophenols, and the like can be used.

Examples of polyhydric phenol glycidyl ethers are bisphenol F diglycidyl ether, bisphenol A diglycidyl ether, bisphenol B diglycidyl ether, bisphenol AD diglycidyl ether, bisphenol S diglycidyl ether, and glycidyl ethers of phenol or cresol-novolak resin.

Examples of the glycidyl esters of polyhydric phenols include diglycidyl phthalate, diglycidyl isophthalate, diglycidyl terephthalate, and the like.

Examples of the glycidyl aromatic polyamines include N,N-diglycidylaniline, N,N,N',N'-tetraglycidylxylylenediamine, and N,N,N',N'-tetraglycidyldiphenylmethanediamine, and the like.

Further, the epoxides include triglycidyl ether of p-aminophenol, diglycidyl urethane compounds obtained by the addition reaction of tolylene diisocyanate or diphenylmethane diisocyanate and glycidol, and diglycidyl ethers of alkylene oxide (ethylene oxide or propylene oxide) (2 to 20 mol) adducts of bisphenol A (e.g., diglycidyl ether of EO (4 mol) adduct of bisphenol A).

As heterocyclic polyepoxides, trisglycidylmelamine can be used.

As alicyclic polyepoxides, vinylcyclohexene dioxide, limonene dioxide, dicyclopentadiene dioxide, bis(2,3-epoxy-cyclopentyl)ether, ethylene glycol bisepoxydicyclopentyl ether, dimer acid diglycidyl ester, and nuclear hydrogenation products of aromatic polyepoxides (e.g., hydrogenated bisphenol F diglycidyl ether and hydrogenated bisphenol A diglycidyl ether) can be used, for example.

As aliphatic polyepoxides, polyglycidyl ethers of polyhydric aliphatic alcohols, polyglycidyl esters of polyvalent fatty acids, glycidyl aliphatic amines, and the like can be used.

Examples of the polyglycidyl ethers of polyhydric aliphatic alcohols include ethylene glycol diglycidyl ether, propylene glycol diglycidyl ether, tetramethylene glycol diglycidyl ether, 1,6-hexanediol diglycidyl ether, polyethylene glycol diglycidyl ether, polypropylene glycol diglycidyl ether, polytetramethylene glycol diglycidyl ether, neopentyl glycol diglycidyl ether, trimethylolpropane polyglycidyl ether, glycerol polyglycidyl ether, pentaerythritol polyglycidyl ether, sorbitol polyglycidyl ether, polyglycerol polyglycidyl ether, and the like.

Examples of the polyglycidyl esters of polyvalent fatty acids include diglycidyl oxalate, diglycidyl maleate, diglycidyl succinate, diglycidyl adipate, and the like.

Examples of the glycidyl aliphatic amines include N,N,N',N'-tetraglycidyl hexamethylenediamine, and N,N,N',N'-tetraglycidyl ethylenediamine, and the like.

The aliphatic polyepoxides include (co)polymers of diglycidyl ethers and glycidyl(meth)acrylates.

Among these polyepoxides, aliphatic polyepoxy compounds and aromatic polyepoxy compounds are preferably used. In the present invention, the polyepoxides may be used in combination of two or more of them.

Mn of the resin (q) is preferably in a range from 200 to 5,000,000, more preferably from 2,000 to 1,000,000, and even more preferably from 3,000 to 500,000.

Mn and the weight average molecular weight in the eighth invention can be measured by gel permeation chromatography (GPC) (THF solution, standardized substance: polystyrenes). Hereinafter, weight average molecular weight is abbreviated as Mw.

The SP value of the resin (q) is preferably in a range from 7 to 18, more preferably from 8 to 16, and even more preferably from 8.5 to 14.

The SP value is calculated by the method described in Polymer Engineering and Science, February, 1974, Vol. 14, No. 2, p. 147-154.

In the case the resin (q) is a crystalline polymer, the melting point of the resin (q) is preferably 35° C. or higher, more preferably from 40 to 250° C., and even more preferably from 50 to 200° C.

The melting point is measured by DSC (heating speed: 20° C./min.).

Further, to improve the heat resistance, water-proofness, chemical resistance, and evenness of particle diameter of the composite resin particles, crosslinking structure may be introduced into the resin (q). The crosslinking structure may be any crosslinking state such as covalent bonding, coordination bonding, ion bonding, hydrogen bonding and the like.

A common method may be employed for the method for introducing the crosslinking structure.

The acid value of the resin (q) is preferably 0 to 400, more preferably from 1 to 300, furthermore preferably 1 to 200, and even more preferably from 5 to 50.

In the case the composite resin particles are used for a coating material, an additive for a coating, a powder coating, a resin for slush molding, or a hot-melt adhesive, in terms of the adhesion to a substrate and leveling property, the acid value of the resin (q) is preferably from 0 to 400, more preferably from 1 to 300, further more preferably from 1 to 200, and even more preferably from 1 to 100.

In the case of using them for a toner to be used for electrophotography, electrostatic recording, and electrostatic printing, in terms of the electrostatic property and fixing property on paper, the acid value of the resin (q) is preferably from 0 to 400, more preferably from 1 to 300, and even more preferably from 1 to 200.

The resin fine particles (Q) are required to have strength sufficient not to be broken by shearing at the time of dispersing the resin (p), the precursor (p0) of the resin (p), and/or their solutions; to be hardly dissolved or swollen in water; and also to be hardly dissolved or swollen in the resin (p), the precursor (p0) of the resin (p), and/or their solutions.

From a viewpoint of prevention of the resin fine particles (Q) from dissolving or swelling in water or a solvent to be used at the time of dispersion, the molecular weight (Mn, Mw), SP value, crystallinity, and crosslinking structure of the resin (p) are preferable to be adjusted properly.

Tg of the resin (Q) is preferably in a range from 0 to 300° C., more preferably from 20 to 250° C., furthermore preferably from 45 to 200° C., and even more preferably from 50 to 200° C. in terms of the shape, particle size evenness, powder fluidity, heat resistance (at the time of storage) and stress resistance of the composite resin particles.

Tg in the eighth invention is calculated by DSC (differential scanning calorimetry, heating speed 20° C./min.).

The resin fine particles (Q) may contain the above-mentioned additive (T) (e.g. various kinds of additives such as a filler, a colorant, a plasticizer, a release agent, a charge control agent, an ultraviolet absorbent, an antioxidant, an antistatic agent, a flame retardant, an antibacterial agent, and a preserver) other than the resin (q).

The content of the additive (T) may be adjusted properly depending on the various uses and on the basis of the weight of the resin fine particles (Q), it is preferably in a range from 0.01 to 150%, more preferably from 0.2 to 100%, and even more preferably from 0.5 to 80%.

The production method of the resin fine particles (Q) is not particularly limited and for example, the following methods [1] to [8] can be exemplified. The methods [1] to [8] are methods of obtaining a water-based dispersion of the resin fine particles (Q) and the water-based dispersion of the resin fine particles (Q) may be used as it is for producing composite resin particles of the invention or the resin fine particles (Q) alone may be separated from the water-based dispersion or the resin fine particles (Q) may be separated during the production of the water-based dispersion. A filtration method, a decantation method, and a centrifugal separation method may be used as the separation method.

[1] in the case of a vinyl resin: a method of directly producing a water-based dispersion of the resin fine particles (Q) by polymerizing monomers as starting materials in the presence of a polymerization catalyst using such method as a suspension polymerization method, an emulsion polymerization method, a seed polymerization method, or a dispersion polymerization method;

[2] in the case of a polyaddition resin or polycondensation resin such as polyester, polyurethane, and epoxy resin; a method of producing a water-based dispersion of the resin fine particles (Q) by dispersing a precursor (p0) of the resin (p) [e.g. a monomer of the above-mentioned diol (11), polyol (13), dicarboxylic acid (14), polyisocyanate (15), polyamine (16), polythiol (17), or polyepoxide (18), or oligomer having Mn of 1000 or lower which is dimer or higher reaction products of the monomer (including reaction products of the same kind monomer or of two or more kinds of monomers)] or a solution of the precursor (p0) in a water-based medium in the presence of a dispersant and successively heating the obtained mixture or adding a curing agent (e.g. a compound having at least two functional groups reactive on the precursor in one molecule) to the obtained mixture for curing;

[3] in the case of a polyaddition resin or polycondensation resin such as polyester, polyurethane, and epoxy resin; a method involving phase inversion emulsification by dissolving a proper emulsifier in a precursor (p0) (e.g. a monomer or an oligomer) or a solution of the precursor (p0) (a liquid is preferable, or liquefied by heating) and further adding water;

[4] a method involving previously producing a resin (q) by polymerization reaction (e.g. any polymerization reaction manners such as addition polymerization, ring opening polymerization, polyaddition, addition condensation, and polycondensation), grinding the previously produced resin (q) by a mechanically rotating or jetting type finely grinding pulverizer, successively carrying out classification for obtaining the resin fine particles (Q), and then dissolving the particles in water in the presence of a proper dispersant;

[5] a method involving previously producing a solution of a resin (q) by polymerization reaction (e.g. any polymerization reaction manners such as addition polymerization, ring opening polymerization, polyaddition, addition condensation, and polycondensation), spraying the solution of the resin (q) for removing the solvent from the solution of the resin (q) and obtaining the resin fine particles (Q), and then dissolving the particles in water in the presence of a proper dispersant;

[6] a method involving previously producing a solution of a resin (q) by polymerization reaction (e.g. any polymerization reaction manners such as addition polymerization, ring opening polymerization, polyaddition, addition condensation, and polycondensation), precipitating resin fine particles either by adding a poor solvent [a solvent in which not more than 1% of the resin (q) is dissolved at 25° C.] to the previously produced solution of the resin (q) or by cooling the solution of the resin (q) which is previously dissolved and heated in a solvent, successively removing the solvent for obtaining the resin fine particles (Q), and then dissolving the obtained resin fine particles (Q) in water in the presence of a proper dispersant;

[7] a method involving previously producing a solution of a resin (q) by polymerization reaction (e.g. any polymerization reaction manners such as addition polymerization, ring opening polymerization, polyaddition, addition condensation, and polycondensation), dispersing the solution of the resin (q) in a water-based medium in the presence of a proper dispersant, and removing the solvent by heating or reducing the pressure; and

[8] a method involving previously producing a solution of a resin (q) by polymerization reaction (e.g. any polymerization reaction manners such as addition polymerization, ring opening polymerization, polyaddition, addition condensation, and polycondensation), adding a proper emulsifier to the solution of the resin (q), carrying out phase inversion emulsification by adding water, and removing the solvent by heating or reducing the pressure.

Methods [1] to [3], [7], and [8] are preferable, methods [1] to [3] and [7] are more preferable, and methods [2], [3], and [7] are even more preferable among the above-mentioned methods [1] to [8].

In the above-mentioned methods [1] to [8], a conventionally known surfactant (S) and water-soluble polymer (T) may be used as the emulsifier and dispersant.

In the case the surfactant (S) is used, the use amount is preferably in a range from 0.1 to 20%, more preferably from 1 to 15%, and even more preferably from 2 to 10% on the basis of the weight of the resin (p) and precursor (p0).

In the case the water-soluble polymer (T) is used, the use amount is preferably in a range from 0.01 to 20%, more preferably from 0.1 to 15%, and even more preferably from 0.2 to 10% on the basis of the weight of the resin (p) and precursor (p0).

Further, a solvent (U) and/or a plasticizer (V) may be used in combination as assisting agents for emulsification or dispersion.

In the case the solvent (U) is used, the use amount is preferably in a range from 0.1 to 20%, more preferably from 0.5 to 15%, and even more preferably from 1 to 10% on the basis of the weight of the resin (p) and precursor (p0).

In the case the plasticizer (V) is used, the use amount is preferably in a range from 0.01 to 10%, more preferably from 0.1 to 8%, and even more preferably from 1.0 to 5% on the basis of the weight of the resin (p) and precursor (p0).

The solvent (U) and/or plasticizer (V) may be added to water or to the resin (p) during emulsification and dispersion based on the necessity.

Examples of the surfactant (S), water-soluble polymer (T), solvent (U) and plasticizer (V) are those described above.

Preferable examples of the water-soluble polymer (T) are cellulose, starch, polyvinyl alcohol, polyvinylpyrrolidone, polyethylene glycol, and polymer containing acrylic acid (salts).

In terms of the easiness for removing the solvent, preferable examples of the solvent (U) are aromatic hydrocarbon solvents, halogen solvents, ester or ester ether solvents, ketone solvents, and alcohol solvents, and more preferable examples are ester or ester ether solvents, ketone solvents, and alcohol solvents.

The particle diameter of the resin fine particles (Q) is generally smaller than that of resin particles (P) and in terms of the particle size evenness, the particle diameter ratio [(volume average particle diameter of (Q))/(volume average particle diameter of (P))] is preferably in a range from 0.001 to 0.3. The lower limit of the particle diameter ratio is more preferably 0.003 and the upper limit is more preferably 0.25. If the particle diameter ratio is larger than 0.3, since the resin particles (Q) are not efficiently adsorbed on the resin particles (P), the particle diameter distribution of the obtained composite resin particles tends to be wide.

The volume average particle diameter of the resin fine particles (Q) may properly be adjusted within the above-mentioned particle diameter ratio so as to obtain a desired particle diameter of the composite resin particles.

The volume average particle diameter of the resin fine particles (Q) is, in general, preferably in a range from 0.0005 to 30 µm. The upper limit is more preferably 20 µm and even more preferably 10 µm and the lower limit is more preferably 0.01 µm, furthermore preferably 0.02 µm, and even more preferably 0.04 µm. However, in the case of obtaining composite resin particles with a volume average particle diameter of 1 µm, it is preferably in a range from 0.0005 to 0.3 µm and more preferably from 0.001 to 0.2 µm: in the case of obtaining 10 µm of (C), it is preferably in a range from 0.005 to 3 µm and more preferably from 0.05 to 2 µm: and in the case of obtaining 100 µm of composite resin particles, it is preferably in a range from 0.05 to 30 µm and more preferably from 0.1 to 20 µm. The volume average particle diameter can be measured by laser type particle diameter distribution measurement apparatus LA-920 (manufactured by Horiba Seisakusho), electrophoresis particle diameter distribution measurement apparatus ELS-8000 (manufactured by Otsuka Denshi), or Coulter counter [e.g. trade name: Multisizer III (manufactured by Coulter Co.)].

A production method of the composite resin particles of the invention is not particularly limited, however the method may be carried out by dispersing an additive, if necessary, and the resin (p) or its organic solvent solution in a water-based dispersion (W) of the resin fine particles (Q) containing an additive, if necessary, and the resin (q) for forming the resin particles (P) of the resin (p) in the water-based dispersion of the resin fine particles (Q) and thus obtaining a water-based resin dispersion of the composite resin particles comprising the resin particles (P) and the resin fine particles (Q) adhering to the surface of the particles (P).

Or, the method may be carried out by dispersing a precursor (p0) of the resin (p) or its organic solvent solution in the water-based dispersion of the resin fine particles (Q) of the resin (q), causing reaction of the precursor (p0), and thereby forming the resin particles (P) of the resin (p) and obtaining a water-based resin dispersion containing resin particles comprising the resin particles (P) and the resin fine particles (Q) adhering to the surface of the particles (P).

The water-based dispersion of the composite resin particles obtained by the above-mentioned methods is subjected to solid-liquid separation (if necessary, solid-liquid separation is repeated by adding water or the like) and the separated solid is dried for removing the water-based medium to obtain the composite resin particles of the invention.

A dispersing apparatus and/or an apparatus for applying shearing force to be used in the above-mentioned production methods is not particularly limited and commonly commercialized emulsifying apparatuses and/or dispersing apparatuses may be used and examples of commercialized apparatuses are as exemplified above.

Among the exemplified ones, in terms of the evenness of the particle diameter, APV Gaulin, homogenizer, TK Auto-homomixer, Ebara Milder, TK Filmix, and TK Pipeline Homomixer are preferable and TK Auto-homomixer, Ebara Milder, TK Filmix, and TK Pipeline Homomixer are more preferable, and TK Auto-homomixer, TK Filmix, and TK Pipeline Homomixer are even more preferable.

In the above-mentioned production methods, in terms of the high evenness of the particle diameter and storage stability of the composite resin particles, the weight ratio (Q/P) of the resin fine particles (Q) and resin particles (P) is preferably (0.01 to 60)/(40 to 99.99), more preferably (0.05 to 55)/(45 to 99.95), and even more preferably (0.1 to 50)/(50 to 99.9). That is, the upper limit of the weight ratio (P/B) is preferably 60/40, more preferably 55/45, and even more preferably 50/50 and similarly the lower limit of the weight ratio (P/B) is preferably 0.01/99.99, more preferably 0.05/99.95, and even more preferably 0.1/99.9.

Accordingly, the resin (q), resin (p), and precursor (p0) are preferable to be used so as to adjust the weight ratio within the above-mentioned range.

The use amount of the water-based medium to 100 part of the resin (p) and/or precursor (p0) is preferably in a range from 50 to 2,000 part, more preferably from 100 to 1,000 part, and even more preferably from 100 to 500 part. That is, the upper limit of the use amount of the water-based medium is preferably 2,000 part, more preferably 1,000 part, and even more preferably 500 part and similarly, the lower limit is preferably 50 part and more preferably 100 part. If it is less than 50 part, the dispersion state of the resin (q) tends to be worsened and if it exceeds 2,000 part, it is not preferable in terms of the economy.

The use amount of the water-based medium to 100 part of the resin (p) is preferably in a range from 50 to 2,000 part, more preferably from 100 to 1,000 part, and even more preferably from 100 to 500 part. If it is less than 50 part, the dispersion state of the resin (q) tends to be worsened and if it exceeds 2,000 part, it is not preferable in terms of the economy.

The water-based medium may be used without any limit if it is a liquid containing water as an indispensable component and water, an aqueous solution of a solvent, an aqueous solution of the surfactant (S), an aqueous solution of the water-soluble polymer (T), and a mixture of them may be used.

Examples of the solvent to be used may be ester or ester ether solvents, ether solvents, ketone solvents, alcohol solvents, amide solvents, sulfoxide solvents, heterocyclic compound solvents, and mixed solvents of two or more kinds of them among the above-mentioned solvents (U).

In the case a solvent is contained, the content of the solvent is preferably from 1 to 80%, more preferably from 2 to 70%, and even more preferably 5 to 30% on the basis of the weight of the water-based medium.

In the case the surfactant (S) is used, the content of the surfactant is preferably from 0.1 to 20%, more preferably from 0.5 to 10%, and even more preferably 1.0 to 8% on the basis of the weight of the water-based medium.

In the case the water-soluble polymer (T) is used, the content of the water-soluble polymer is preferably from 0.01 to 10%, more preferably from 0.05 to 7%, and even more preferably 0.1 to 5% on the basis of the weight of the water-based medium.

The volume average particle diameter (DV) of the composite resin particles can be adjusted by properly adjusting the volume average particle diameter (DVQ) of the resin fine particles (Q). For example, in the case of obtaining composite resin particles with 1 μm (DV), (DVQ) is preferably from 0.0005 to 0.4 μm and more preferably from 0.001 to 0.3 μm, and in the case of obtaining composite resin particles with 10 μm (DV) or larger, (DVQ) is preferably from 0.005 to 4 μm and more preferably from 0.05 to 0.3 μm.

At the time of dispersing the resin (q) and/or the precursor (p0) in the water-based medium of the resin fine particles (Q), the resin (q) and the precursor (p0) are preferably liquids. In the case the resin (q) and the precursor (p0) are solid in a normal temperature, they may be dispersed in a liquid state at a high temperature equal to or higher than the melting point or solutions of the resin (q) and the precursor (p0) may be used.

In terms of the evenness of the particle diameter, the viscosity of the resins (p), (q) and the precursor (p0) and their solutions is preferably from 10 to 50,000 mPa·S, more preferably from 100 to 30,000 mPa·S, and even preferably from 200 to 20,000 mPa·S. That is, the upper limit of the viscosity is preferably 50,000 mPa·S, more preferably 30,000 mPa·S, and even preferably 20,000 mPa·S, and similarly the lower limit is preferably 10 mPa·S, more preferably 100 mPa·S, and even preferably from 200 mPa·S.

The viscosity is measured by a rotor type viscometer (e.g. BL type viscometer, BM type viscometer, BH type viscometer, manufactured by Tokyo Keiki Co.) at 25° C. and 30 rpm.

The temperature at the time of dispersion is preferably in a range from 0 to 150° C., more preferably from 5 to 98° C., and even preferably from 10 to 60° C. In the case it exceeds 100° C., the temperature shows under pressurized condition. In the case the viscosity of the dispersion is high, it is preferable that the temperature is increased to lower the viscosity in a preferably range and then the emulsification and dispersion are carried out.

The solvent to be used for the solution of the resin (p) and the solution of the precursor (p0) is not particularly limited if it can dissolve the resin and precursor at a normal temperature or under heating temperature and for example, those same as exemplified for the solvent (U) may be used. Among them, although depending on the types of the resin (p) and the precursor (p0), those having difference of SP value from that of the resin (p) and the precursor (p0) within 3 or less are preferable and more preferably solvents which can dissolve the resin (p) but hardly dissolve or swell the resin particles (Q) of the resin (Q) in terms of the evenness of the particle diameter of the composite resin particles.

In the above-mentioned method, an emulsifier and a dispersant can be used and the above-mentioned surfactant (S) and water-soluble polymer (T) may be used as the emulsifier and dispersant. Further, the above-mentioned solvent (U) and plasticizer (V) are also usable in combination as assisting agents for the emulsifier and dispersant.

In the case the adhesive power of the resin fine particles (Q) and the resin particles (P) in the composite resin particles is increased, it is preferable to make the resin fine particles (Q) and the resin particles (P) have mutually opposed positive and negative electric charges at the time of dispersing them in a water-based medium; to use those having opposed electric charge to that of the resin fine particles (Q) and resin particles (P) among the surfactant (S) or the water-soluble polymer (T) if the resin fine particles (Q) and resin particles (P) have the same electric charge; and to adjust the different of the SP value of the resin (p) and the resin (q) to be 2 or lower. If the adhesive force is high, it is generally preferable since the (TQ/TR) value becomes high. Herein, (TQ/TR) means the ratio of the projected surface area (TR) of the composite resin particles and the projected surface area (TQ) of the resin fine particles (Q) and the projected surface area is measured by photographing sample surface 10 times by an electron microscope (magnification 30,000 times) and introducing image information of the respective surface images into an image analyzer though an interface.

The method for removing the water-based medium may be the following methods [1] to [3] or combinations of these methods:

[1] a method of drying the water-based medium in reduced pressure or a normal pressure;

[2] a method of carrying out solid-liquid separation by a centrifuge, a Supakura Filter, and/or a filter press and drying the solid; and

[3] a method of freezing the water-based dispersion and drying the frozen dispersion (so-called freeze-drying method).

In the invention of the above-mentioned [1] and [2], commonly known facilities such as a fluidized bed type drying apparatus, a vacuum drying apparatus, and an air circulation drying apparatus may be used as a drying apparatus.

If necessary, an air blowing classification apparatus or sieve may be used for classification to obtain desired particle size distribution.

The resin particles of the invention may be made to have smooth particle surface or desired rough surface of the particles by changing the particle diameter ratio (DVQ/DVP) of the resin fine particles (Q) and the resin particles (P) and changing the depth of the resin particles (P) in which the resin fine particles (Q) are buried.

The depth of the resin particles (P) in which the resin fine particles (Q) are buried may be controlled by as follows.

[1] If the resin fine particles (Q) and the resin particles (P) are made to have mutually opposed positive and negative electric charges, the depth of the resin particles (P) in which the resin fine particles (Q) are buried becomes deep. In this case the respective electric charges of the resin fine particles (Q) and the resin particles (P) are higher, the depth tends to be deeper.

[2] If the resin fine particles (Q) and the resin particles (P) are made to have electric charge with same polarity (both are positive or both are negative), the (TQ/TR) of the resin fine particles (Q) becomes lower and the depth tends to be shallow. In this case, generally if the surfactant (S) and/or the water-soluble polymer (T) [particularly having opposed electric charge to that of the resin fine particles (Q) and the resin particles (P)] is used, (TQ/TR) becomes high. In the case of the water-soluble polymer (T) is used, the depth becomes shallower as the molecular weight of the water-soluble polymer (T) is higher.

[3] In the case the resin (p) is a resin having an acidic functional group such as carboxyl, phosphono group, or sulfo group (generally the molecular weight per one acidic functional group is preferable to be 1,000 or lower), the (TQ/TR) and the depth become high as the pH of the water-based medium is lower. On the contrary, the (TQ/TR) and the depth become small as the pH of the water-based medium is higher.

[4] In the case the resin (p) is a resin having a basic functional group such as primary amino group, secondary amino group, tertiary amino group, and quaternary ammonium group (generally the molecular weight per one basic functional group is preferable to be 1,000 or lower), the (TQ/TR) and the depth become high as the pH of the water-based medium is higher. On the contrary, the (TQ/TR) and the depth become small as the pH of the water-based medium is lower.

[5] The (TQ/TR) and the depth become high as the difference of the SP values of the resin (p) and the resin (q) is made small.

In the case the powder fluidity of the resin particles is improved, it is preferable that the BET specific surface area of the resin particles is within a range from 0.5 to 5.0 m$^2$/g.

The BET specific surface area may be measured by using a specific surface meter (e.g. trade name: QUANTASORB, manufactured by Yuasa Ionics Co., Ltd.) (measurement gas: He/Kr=99.9/0.1 vol. %, calibration gas: nitrogen).

Similarly from a viewpoint of the powder fluidity, the center line average surface roughness (Ra) of the resin particles (P) is preferably in a range from 0.01 to 0.8 μm.

The (Ra) means the value calculated by mathematically averaging the absolute values of the difference of the roughness curve and the center line and can be measured by, for example, a scanning type probe microscopic system (e.g. manufactured by Toyo Technica Inc.).

EXAMPLES

Hereinafter the invention will be described more in detail, however it is not intended that the invention be limited to the described Examples.

The methods of measuring the properties of the polyester resins obtained by Examples within the scope of the respective inventions and Comparative Examples will be described below.

1. Hydroxy Value

A method standardized in JIS K 1557 (1970).

In the case there were solvent-insoluble fractions in samples due to crosslinking, the samples were melted and kneaded by the following method and used for measurement.

Kneader: LaboPlast Mill MODEL 30R150, manufactured by Toyo Seiki Seisaku-Sho Ltd.

Kneading conditions: at 130° C. and 70 rpm for 30 minutes

2. Acid Value

A method standardized in JIS K 0070 (1992).

In the case there were solvent-insoluble fractions in samples due to crosslinking, the samples were melted and kneaded by the same method as that in the case of the hydroxy value and used for measurement.

3. Softening Point (Hereinafter, Referred Also to as Tm)

By the softening point measurement method as described in the second invention.

Examples Relevant to the First to the Third Inventions

Examples 1 to 4, Comparative Examples 1 to 4

Example 1

Synthesis of Linear Polyester

To a reaction tank equipped with a cooling tube, a stirrer, and a nitrogen introduction tube, 1,2-propylene glycol (hereinafter, simply referred to as propylene glycol) 639 part (24.5 mole), bisphenol A-2 mole EO adduct 180 part (1.6 mole), terephthalic acid dimethyl ester 653 part (9.8 mole), adipic acid 10 part (0.2 mole), and as a condensation catalyst, tetrabutoxy titanate 3 part were loaded and under nitrogen gas stream, reaction was carried out at 180° C. for 8 hours while the produced methanol was removed. Successively, while the reaction system was gradually heated to 230° C. and the produced propylene glycol and water were removed under nitrogen gas stream, reaction was carried out for 4 hours and further continued at a pressure reduced to 5 to 20 mmHg and the product was discharged when the softening point reached 90° C. The recovered propylene glycol was 263 part (10.1 mole). After cooled to a room temperature, the discharged resin was pulverized for granulation. The obtained product was linear polyester (Aa-1).

The linear polyester (Aa-1) had 1500 of Mn, 2500 of Mp, 3.0% of the content of components with 500 or lower molecular weight, 0% of the THF-insoluble fractions, 82 kJ of the molar average cohesive energy of the polyol component (hereinafter abbreviated as En), 300 of a storage modulus at 150° C. (hereinafter abbreviated as G'), 90° C. of Tm, 5 to 11 of a loss tangent at 130 to 200° C. (hereinafter abbreviated as tan δ) (in the temperature range exceeding 150° C., since the measurement was impossible because of too low elasticity, the value at a temperature in a range from 130 to 150° C. was employed. It is same for the following respective linear polyesters unless otherwise specified).

The number of the mole in each parenthesis is written for showing the relative mole ratio of the respective starting materials (same as the following examples).

[Synthesis of Non-Linear Polyester]

To the reaction tank same as described above, propylene glycol 614 part (23.8 mole), bisphenol A-2 mole EO adduct 156 part (1.4 mole), terephthalic acid dimethyl ester 627 part (9.5 mole), adipic acid 25 part (0.5 mole), and tetrabutoxy titanate 3 part were loaded and under nitrogen gas stream, reaction was carried out at 180° C. for 8 hours while the produced methanol was removed. Successively, while the reaction system was gradually heated to 230° C. and the produced propylene glycol and water were removed under nitrogen gas stream, reaction was carried out for 4 hours and further continued for 1 hour at a pressure reduced to 5 to 20 mmHg. The recovered propylene glycol was 288 part (11.2 mole). After cooled to 180° C., trimellitic anhydride 98 part (1.5 mole) was added and the reaction was carried out for 2 hours in closed condition at a normal pressure and continued at 220° C. and a normal pressure and when the softening point reached 180° C., the product was discharged and cooled to a room temperature and pulverized for granulation. The obtained product was non-linear polyester (Ab-1).

The non-linear polyester (Ab-1) had 4000 of Mn, 8000 of Mp, 1.3% of the content of components with 500 or lower molecular weight, 30% of the THF-insoluble fractions, 82 kJ of En, 3.6×10$^5$ of G', 180° C. of Tm, and 1.2 to 2.0 of tan δ.

[Production of Polyester Resin for Toner]

The linear polyester (Aa-1) 600 part and the non-linear polyester (Ab-1) 400 part were melted and kneaded at 150° C. jacket temperature for stagnation duration 3 minutes by a continuous kneader. The resulting melted resin was cooled to a room temperature and successively pulverized by a pulverizer for granulation to obtain a polyester resin (1) for a toner of the invention.

The polyester resin (1) for a toner had Tg of 64° C., 2200 of Mn, 3200 of Mp, 2.3% of the components with 500 or lower molecular weight, and 13% of the THF-insoluble fractions.

Example 2

Synthesis of Linear Polyester

To the reaction tank same as that of Example 1, propylene glycol 720 part (23.8 mole), terephthalic acid dimethyl ester 735 part (9.8 mole), adipic acid 29 part (0.5 mole), and tetrabutoxy titanate 3 part were loaded and reaction was carried out in the same manner as that for the linear polyester (Aa-1) of Example 1 and the product was discharged when the softening point reached 94° C. The recovered propylene glycol was 235 part (7.8 mole). After cooled to a room temperature, the discharged resin was pulverized for granulation. The obtained product was linear polyester (Aa-2).

The linear polyester (Aa-2) had 2700 of Mn, 5800 of Mp, 2.0% of the content of components with 500 or lower molecular weight, 0% of the THF-insoluble fractions, 73 kJ of En, 300 of G', Tm of 90° C., 5 to 11 of tan δ.

[Synthesis of Non-Linear Polyester]

To the reaction tank same as described above, propylene glycol 663 part (22.5 mole), terephthalic acid dimethyl ester 677 part (9.0 mole), adipic acid 57 part (1.0 mole), and tetrabutoxy titanate 3 part were loaded and reaction was carried out in the same manner as that for the non-linear polyester (Ab-1) of Example 1. The recovered propylene glycol was 251 part (8.5 mole). After cooled to 180° C., trimellitic anhydride 112 part (1.5 mole) was added and reaction was carried out in the same manner as that for the linear polyester (Ab-1) and when the softening point reached 180° C., the product was discharged and cooled to a room temperature and pulverized for granulation. The obtained product was non-linear polyester (Ab-2).

The non-linear polyester (Ab-2) had 3900 of Mn, 8000 of Mp, 1.3% of the content of components with 500 or lower molecular weight, 29% of the THF-insoluble fractions, 73 kJ of En, 3.6×10⁵ of G', Tm of 180° C., and 1.2 to 2.1 of tan δ.

[Production of Polyester Resin For Toner]

The linear polyester (Aa-2) 600 part and the non-linear polyester (Ab-2) 400 part were melted and kneaded at 150° C. jacket temperature for stagnation duration 3 minutes by a continuous kneader. The resulting melted resin was cooled to a room temperature and successively pulverized by a pulverizer for granulation to obtain a polyester resin (2) for a toner of the invention.

The polyester resin (2) for a toner had Tg of 64° C., 3200 of Mn, 6700 of Mp, 1.6% of the components with 500 or lower molecular weight, and 13% of the THF-insoluble fractions.

Example 3

Synthesis of Linear Polyester

To the reaction tank same as that of Example 1, propylene glycol 701 part (18.8 mole), terephthalic acid dimethyl ester 716 part (7.5 mole), adipic acid 180 part (2.5 mole), and tetrabutoxy titanate 3 part were loaded and reaction was carried out in the same manner as that for the linear polyester (Aa-1) of Example 1 and the product was discharged when the softening point reached 150° C. The recovered propylene glycol was 316 part (8.5 mole). After cooled to a room temperature, the discharged resin was pulverized for granulation. The obtained product was linear polyester (Aa-3).

The linear polyester (Aa-3) had 8000 of Mn, 20000 of Mp, 1.6% of the content of components with 500 or lower molecular weight, 0% of the THF-insoluble fractions, 73 kJ of En, 1.6×10⁶ of G', Tm of 150° C., 5 to 11 of tan δ.

[Synthesis of Non-Linear Polyester]

To the reaction tank same as described above, propylene glycol 557 part (17.5 mole), terephthalic acid dimethyl ester 569 part (7.0 mole), adipic acid 184 part (3.0 mole), and tetrabutoxy titanate 3 part were loaded and reaction was carried out in the same manner as that for the non-linear polyester (Ab-1) of Example 1. The recovered propylene glycol was 175 part (5.5 mole). After cooled to 180° C., trimellitic anhydride 121 part (1.5 mole) was added and reaction was carried out in the same manner as that for the linear polyester (Ab-1) and when the softening point reached 180° C., the product was discharged and cooled to a room temperature and pulverized for granulation. The obtained product was non-linear polyester (Ab-3).

The non-linear polyester (Ab-3) had 8500 of Mn, 23000 of Mp, 0.9% of the content of components with 500 or lower molecular weight, 30% of the THF-insoluble fractions, 73 kJ of En, 3.6×10⁵ of G', Tm of 180° C., and 1.2 to 1.9 of tan δ.

[Production of Polyester Resin for Toner]

The linear polyester (Aa-3) 600 part and the non-linear polyester (Ab-3) 400 part were melted and kneaded at 150° C. jacket temperature for stagnation duration 3 minutes by a continuous kneader. The resulting melted resin was cooled to a room temperature and successively pulverized by a pulverizer for granulation to obtain a polyester resin (3) for a toner of the invention.

The polyester resin (3) for a toner had Tg of 62° C., 8100 of Mn, 22000 of Mp, 1.3% of the components with 500 or lower molecular weight, and 13% of the THF-insoluble fractions.

Example 4

Synthesis of Linear Polyester

To the reaction tank same as that of Example 1, propylene glycol 540 part (25.0 mole), bisphenol A-2 mole EO adduct 372 part (4.0 mole), terephthalic acid dimethyl ester 551 part (10.0 mole), and tetrabutoxy titanate 3 part were loaded and under nitrogen gas stream, reaction was carried out at 180° C. for 8 hours while the produced methanol was removed. Successively, while the reaction system was gradually heated to 230° C. and the produced propylene glycol and water were removed under nitrogen gas stream, reaction was carried out for 4 hours and further continued at a pressure reduced to 5 to 20 mmHg and the product was discharged when the softening point reached 94° C. The recovered propylene glycol was 281 part (13.0 mole). After cooled to a room temperature, the discharged resin was pulverized for granulation. The obtained product was linear polyester (Aa-4).

The linear polyester (Aa-4) had 2700 of Mn, 5800 of Mp, 2.5% of the content of components with 500 or lower molecular weight, 0% of the THF-insoluble fractions, 96 kJ of En, 300 of G', Tm of 94° C., 5 to 11 of tan δ.

[Synthesis of Non-Linear Polyester]

To the reaction tank same as described above, propylene glycol 531 part (24.3 mole), bisphenol A-2 mole EO adduct 330 part (3.5 mole), terephthalic acid dimethyl ester 542 part (9.7 mole), adipic acid 13 part (0.3 mole), and tetrabutoxy titanate 3 part were loaded and under nitrogen gas stream, reaction was carried out at 180° C. for 8 hours while the produced methanol was removed. Successively, while the reaction system was gradually heated to 230° C. and the produced propylene glycol and water were removed under nitrogen gas stream, reaction was carried out for 4 hours and further continued for 1 hour at a pressure reduced to 5 to 20 mmHg. The recovered propylene glycol was 301 part (13.8 mole). After cooled to 180° C., trimellitic anhydride 83 part (1.5 mole) was added and the reaction was carried out for 2 hours in closed condition at a normal pressure and continued at 220° C. at a normal pressure and when the softening point reached 180° C., the product was discharged and cooled to a room temperature and pulverized for granulation. The obtained product was non-linear polyester (Ab-4).

The non-linear polyester (Ab-4) had 4000 of Mn, 8000 of Mp, 1.3% of the content of components with 500 or lower molecular weight, 31% of the THF-insoluble fractions, 96 kJ of En, $3.6 \times 10^5$ of G', 180° C. of Tm, and 1.1 to 1.4 of tan δ.

[Production of Polyester Resin for Toner]

The linear polyester (Aa-4) 600 part and the non-linear polyester (Ab-4) 400 part were melted and kneaded at 150° C. jacket temperature for stagnation duration 3 minutes by a continuous kneader. The resulting melted resin was cooled to a room temperature and successively pulverized by a pulverizer for granulation to obtain a polyester resin (4) for a toner of the invention.

The polyester resin (4) for a toner had Tg of 63° C., 3200 of Mn, 6700 of Mp, 1.9% of the components with 500 or lower molecular weight, and 14% of the THF-insoluble fractions.

Comparative Example 1

Synthesis of Linear Polyester

To the reaction tank same as that of Example 1, bisphenol A-2 mole PO adduct 466 part (9.0 mole), bisphenol A-2 mole EO adduct 341 part (7.0 mole), terephthalic acid 247 part (10.0 mole), and tetrabutoxy titanate 3 part were loaded and under nitrogen gas stream, reaction was carried out at 230° C. for 5 hours while the produced water was removed. Successively, reaction was carried out under a pressure reduced to 5 to 20 mmHg and when the acid value reached 2, the reaction system was cooled to 180° C. and trimellitic anhydride 74 part (2.6 mole) was added and the product was discharged after reaction for 2 hours in closed condition at a normal temperature. After cooled to a room temperature, the discharged resin was pulverized for granulation. The obtained product was linear polyester (Aa'-5).

The linear polyester (Aa'-5) had 1500 of Mn, 2500 of Mp, 4.2% of the content of components with 500 or lower molecular weight, 0% of the THF-insoluble fractions, 166 kJ of En, 300 of G', Tm of 90° C., 5 to 11 of tan δ.

[Synthesis of Non-Linear Polyester]

To the reaction tank same as described above, bisphenol A-3 mole PO adduct 679 part (10.8 mole), phenol novolak EO adduct 47 part (0.37 mole), terephthalic acid 260 part (10.0 mole), and tetrabutoxy titanate 3 part were loaded and under nitrogen gas stream, reaction was carried out at 230° C. for 7 hours while the produced water was removed. Successively, reaction was carried out under a pressure reduced to 5 to 20 mmHg and when the acid value reached 2 or lower, the reaction system was cooled to 180° C. and trimellitic anhydride 87 part (2.9 mole) was added and the product was discharged after reaction for 2 hours in closed condition at a normal temperature. After cooled to a room temperature, the discharged resin was pulverized for granulation. The obtained product was non-linear polyester (Ab'-5).

The non-linear polyester (Ab'-5) had 4200 of Mn, 7400 of Mp, 3.2% of the content of components with 500 or lower molecular weight, 42% of the THF-insoluble fractions, 184 kJ of En, $5.0 \times 10^5$ of G', 94° C. of Tm, and 0.3 to 0.7 of tan δ.

[Production of Polyester Resin for Toner]

The linear polyester (Aa'-5) 600 part and the non-linear polyester (Ab'-5) 400 part were melted and kneaded at 150° C. jacket temperature for stagnation duration 3 minutes by a continuous kneader. The resulting melted resin was cooled to a room temperature and successively pulverized by a pulverizer for granulation to obtain a polyester resin (1) for a toner for comparison.

The polyester resin (1) for a toner for comparison had Tg of 64° C., 2600 of Mn, 4500 of Mp, 3.8% of the components with 500 or lower molecular weight, and 16% of the THF-insoluble fractions.

Comparative Example 2

Synthesis of Linear Polyester

To the reaction tank same as that of Example 1, bisphenol A-2 mole PO adduct 404 part (7.0 mole), bisphenol A-2 mole EO adduct 380 part (7.0 mole), terephthalic acid 276 part (10.0 mole), and tetrabutoxy titanate 3 part were loaded and under nitrogen gas stream, reaction was carried out at 230° C. for 5 hours while the produced water was removed. Successively, reaction was carried out under a pressure reduced to 5 to 20 mmHg and when the acid value reached 2 or lower, the reaction system was cooled to 180° C. and trimellitic anhydride 74 part (2.3 mole) was added and the product was discharged after reaction for 2 hours in closed condition at a normal temperature and after cooled to a room temperature, the discharged resin was pulverized for granulation. The obtained product was linear polyester (Aa'-6).

The linear polyester (Aa'-6) had 1900 of Mn, 4200 of Mp, 4.0% of the content of components with 500 or lower molecular weight, 0% of the THF-insoluble fractions, 90 kJ of En, 300 of G', Tm of 90° C., 5 to 11 of tan δ.

[Production of Polyester Resin for Toner]

The linear polyester (Aa'-6) 600 part and the non-linear polyester (Ab'-5) 400 part were melted and kneaded at 150° C. jacket temperature for stagnation duration 3 minutes by a continuous kneader. The resulting melted resin was cooled to a room temperature and successively pulverized by a pulverizer for granulation to obtain a polyester resin (2) for a toner for comparison.

The polyester resin (2) for a toner for comparison had Tg of 64° C., 2800 of Mn, 5500 of Mp, 3.7% of the components with 500 or lower molecular weight, and 17% of the THF-insoluble fractions.

Comparative Example 3

Synthesis of Linear Polyester

To the reaction tank same as that of Example 1, propylene glycol 692 part (25.0 mole), terephthalic acid dimethyl ester 707 part (10.0 mole), and as a condensation catalyst, tetrabutoxy titanate 3 part were loaded and under nitrogen gas stream, reaction was carried out at 180° C. for 8 hours while the produced methanol was removed. Successively, while the temperature was increased gradually to 230° C. and produced propylene glycol and water were removed under nitrogen gas stream, reaction was carried for 4 hours and further continues for 1 hour under a pressure reduced to 5 to 20 mmHg and the product was discharged. The recovered propylene glycol was 166 part (6.0 mole). There after, the product was cooled to a room temperature however the product was not turned to be a resin but like a paste. The obtained product was named as a linear polyester (Aa'-7).

The linear polyester (Aa'-7) had 800 of Mn, 1200 of Mp, 0% of the THF-insoluble fractions. Since the polyester (Aa'-7) was not turned to be a resin, it was not used for toner production.

Comparative Example 4

Synthesis of Linear Polyester

To the reaction tank same as that of Example 1, bisphenol A-2 mole EO adduct 722 part (10.3 mole), terephthalic acid 356 part (10.0 mole), and as a condensation catalyst, tetrabutoxy titanate 3 part were loaded and under nitrogen gas stream, reaction was carried out at 230° C. for 5 hours while the produced water was removed. Successively, reaction was carried under a pressure reduced to 5 to 20 mmHg and when the acid value reached 2 or lower, the reaction system was cooled to 180° C. and trimellitic anhydride 25 part (0.6 mole) was added and after 2 hour reaction in closed state at a normal pressure, the product was discharged, cooled to a room temperature, and pulverized for granulation. The obtained product was named as a linear polyester (Aa'-8).

The linear polyester (Aa'-8) had 7000 of Mn, 19000 of Mp, 3.3% of the components with 500 or lower molecular weight, 0% of the THF-insoluble fractions, 164 kJ of En, $1.0 \times 10^5$ of G', 140° C. of Tm, 0.8 to 4 of tan δ at 130 to 200° C.
[Synthesis of Non-Linear Polyester]

To the reaction tank same as that of Example 1, bisphenol A-3 mole PO adduct 693 part (10.8 mole), phenol novolak EO adduct 48 part (0.37 mole), terephthalic acid 239 part (9.0 mole), and as a condensation catalyst, tetrabutoxy titanate 3 part were loaded and under nitrogen gas stream, reaction was carried out at 230° C. for 7 hours while the produced water was removed. Successively, reaction was carried out under a pressure reduced to 5 to 20 mmHg and when the acid value reached 2 or lower, the reaction system was cooled to 180° C. and trimellitic anhydride 89 part (2.9 mole) was added and after reaction for 2 hours in closed condition at a normal temperature, and continued at 220° C. at normal pressure and when the softening point reached 180° C., the product was discharged, cooled to a room temperature, and pulverized for granulation. The obtained product was named as non-linear polyester (Ab'-8).

The non-linear polyester (Ab'-8) had 8800 of Mn, 22000 of Mp, 3.3% of the content of components with 500 or lower molecular weight, 42% of the THF-insoluble fractions, 184 kJ of En, $5.0 \times 10^5$ of G', Tm of 180° C., and 0.3 to 0.7 of tan δ.
[Production of Polyester Resin for Toner]

The linear polyester (Aa'-8) 600 part and the non-linear polyester (Ab'-8) 400 part were melted and kneaded at 150° C. jacket temperature for stagnation duration 3 minutes by a continuous kneader. The resulting melted resin was cooled to a room temperature and successively pulverized by a pulverizer for granulation to obtain a polyester resin (4) for a toner for comparison.

The polyester resin (4) for a toner for comparison had 63° C. of Tg, 8000 of Mn, 21000 of Mp, 3.3% of the components with 500 or lower molecular weight, and 16% of the THF-insoluble fractions.

Examples (1) to (4) and Comparative Example (1), (2), and (4)

Carbon black MA-100 (manufactured by Mitsubishi Chemical Corp.) 8 part, carnauba wax 5 part, a charge control agent T-77 (manufactured by Hodogaya Chemical Co., Ltd.) 1 part were added to respective polyester resins for a toner (1) to (4) within the scope of the invention and polyester resins for a toner for comparison (1)-(2), (4) and toners produced by the following method.

At first, each mixture was preliminarily mixed by a Henshel mixer (FM10B, manufactured by Mitsui Miike Chemical Plant Service Inc.) and then kneaded by a twin-screw extruder (PCM-30, manufactured by Ikegai Co., Ltd.). Successively, each mixture was finely pulverized by ultrasonic jet pulverizer Labo-Jet (manufactured by Nippon Pneumatic Industry Co., Ltd.) and classified by an air current classifier (MDS-I, manufactured by Nippon Pneumatic Industry Co., Ltd.) to obtain toner particles with 8 μm of particle diameter D50. Next, colloidal silica (Aerosil R972: manufactured by Nippon Aerosil Co., Ltd.) 0.5 part was added to each obtained toner particles 100 part and mixed by a sample mill to obtain toners (1) to (4) within a scope of the invention and toners (1), (2), and (4) for comparison.

The toners were evaluated by the following evaluation methods and the evaluation results are shown in Table 1.

TABLE 1

| Toner No. | MFT (° C.) | Gross (° C.) | HOT (° C.) | Fluidity | Grindability average particle diameter (μm) |
|---|---|---|---|---|---|
| Toner (1) | 125 | 145 | 230 | ◯ | 11 |
| Toner (2) | 120 | 140 | 230 | ◯ | 11 |
| Toner (3) | 125 | 145 | 230 | ◯ | 12 |
| Toner (4) | 130 | 145 | 230 | ◯ | 11 |
| Toner for comparison (1) | 135 | 165 | 215 | ΔX | 12 |
| Toner for comparison (2) | 130 | 165 | 230 | ΔX | 12 |
| Toner for comparison (4) | 130 | 175 | 230 | Δ | 16 |

[Evaluation Methods]
[1] Minimum Fixing Temperature (MFT)

Un-fixed images developed by a commercialized copying machine (AR 5030: manufactured by SHARP CORP.) were subjected to evaluation by using a fixing apparatus of a commercialized copying machine (AR 5030: manufactured by SHARP CORP.). The fixing roll temperature at which the remaining ratio of the image density became 70% or higher after fixed images were scratched with a pat was defined as the minimum fixing temperature.
[2] Hot Offset Occurrence Temperature (HOT)

The fixing was evaluated in the same manner as described above for MFT and occurrence of the hot offset in the fixed images was observed by eye observation. The fixing roll temperature at which the offset took place was defined as the hot offset occurrence temperature.
[3] Gross Development Temperature In the same manner as described above for MFT, the developed un-fixed images were subjected to fixing evaluation by using a fixing apparatus of a commercialized copying machine (LBP 2160: manufactured by CANON INC.). The fixing roll temperature at which the 60° gross of the fixed images became 10% or higher was defined as the gross development temperature.

[4] Toner Fluidity

The static bulk density of each toner was measured by a powder tester (manufactured by Hosokawa Micron Co., Ltd.) and the toner fluidity was determined according to the following criteria. Toners marked with Δ or higher were regarded as practically usable.
Static bulk density (g/100 ml): toner fluidity
36 or higher: ◯
33 to less than 36: ◯Δ
30 to less than 33: Δ
27 to less than 30: Δx
less than 27: x

[5] Grindability

Respective coarsely pulverized toners (passing 8.6 mesh and on 30 mesh) which were kneaded by a biaxial kneader and cooled were finely pulverized by ultrasonic jet pulverizer Labo-Jet (manufactured by Nippon Pneumatic Industry Co., Ltd.) under the following conditions:
Grinding pressure: 0.5 MPa
Adjuster ring: 15 mm
Size of louvers: intermediate
Pulverizing time: 10 minutes Without being classified, the pulverized products were subjected to measurement of volume average particle diameter by Coulter Counter AT II (manufactured by US Coulter Electronics Corp.) to measure the grindability. In this measurement method, if the volume average particle diameter is 12 μm or smaller, the grindability can be said to be good.

Examples 11 and 12 and Comparative Examples 11 to 13

Example 11

Synthesis of Non-Linear Polyester

To the reaction tank same as that of Example 1, propylene glycol 817 part (22.6 mole), terephthalic acid dimethyl ester 831 part (9.0 mole), adipic acid 70 part (1.0 mole), and as a condensation catalyst tetrabutoxy titanate 3 part were loaded and under nitrogen gas stream, reaction was carried out at 180° C. for 8 hours while the produced methanol was removed. Successively, while the reaction system was gradually heated to 230° C. and the produced propylene glycol and water were removed under nitrogen gas stream, reaction was carried out for 4 hours and further continued for 1 hour at a pressure reduced to 5 to 20 mmHg. When the softening point reached 85° C., the product was cooled to 180° C. and trimellitic anhydride 37 part (0.4 mole) was added and the reaction was carried out for 2 hours in closed condition at a normal pressure and continued at 220° C. and a normal pressure and when the softening point reached 160° C., the product was discharged. The recovered propylene glycol accordingly was 450 part (12 mole). After cooled to a room temperature, the resulting discharged resin was pulverized for granulation. The obtained product was non-linear polyester (Ab-11).

The non-linear polyester (Ab-11) had Tg of 60° C., 5800 of Mn, 10000 of peak top molecular weight, 3% of the THF-insoluble fractions, 73 kJ of En, $1.6 \times 10^5$ of G', 160° C. of Tm, and 1.2 to 2.5 of tan δ.

[Synthesis of Linear Polyester]

To the reaction tank same as that of Example 1, 1,2-propylene glycol 782 part (22.7 mole), terephthalic acid dimethyl ester 834 part (9.5 mole), adipic acid 33 part (0.5 mole), and as a condensation catalyst, tetrabutoxy titanate 3 part were loaded and under nitrogen gas stream, reaction was carried out at 180° C. for 8 hours while the produced methanol was removed. Successively, while the reaction system was gradually heated to 230° C. and the produced propylene glycol and water were removed under nitrogen gas stream, reaction was carried out for 4 hours and further continued at a pressure reduced to 5 to 20 mmHg and the reaction system was cooled when the softening point reacted at 95° C. The recovered propylene glycol accordingly was 380 part (11 mole). When the temperature became 180° C., trimellitic anhydride 17 part was added and the reaction system was kept at 180° C. for 1.5 hours and then the obtained product was discharged. After cooled to a room temperature, the resulting discharged resin was pulverized for granulation. The obtained product was linear polyester (Aa-11).

The linear polyester (Aa-11) had Tg of 60° C., 2800 of Mn, 5800 of peak top molecular weight, 73 kJ of En, 140 of G', 100° C. of Tm, and 4 to 20 of tan δ.

[Production of Polyester Resin for Toner]

The non-linear polyester (Ab-11) 400 part and the linear polyester (Aa-11) 600 part were melted and kneaded at 150° C. jacket temperature for stagnation duration 3 minutes by a continuous kneader. The resulting melted resin was cooled to a room temperature and successively pulverized by a pulverizer for granulation to obtain a polyester resin (11) for a toner of the invention.

Example 12

Synthesis of Non-Linear Polyester

To the reaction tank same as that of Example 1, propylene glycol 391 part (22.3 mole), terephthalic acid dimethyl ester 358 part (8.0 mole), adipic acid 67 part (2.0 mole), and as a condensation catalyst, tetrabutoxy titanate 3 part were loaded and under nitrogen gas stream, reaction was carried out at 180° C. for 8 hours while the produced methanol was removed. Successively, while the reaction system was gradually heated to 230° C. and the produced propylene glycol and water were removed under nitrogen gas stream, reaction was carried out for 4 hours. Next, bisphenol A-2 mole propylene oxide adduct 561 part (7 mole), phenol novolak resin (5.6 nuclear bodies)-ethylene oxide adduct 56 part (0.3 mole) were further loaded and reaction was carried out at 230° C. and a normal pressure for 4 hours and then continued at a pressure reduced to 5 to 20 mmHg. When the softening point reached 90° C., the reaction system was cooled. When it was cooled to 180° C. and trimellitic anhydride 20 part (0.45 mole) was added and the reaction system was kept at 180° C. for 1.5 hours and heated to 220° C. The pressure was reduced properly by 5 to 20 mmHg and when the softening point reached 135° C., the product was discharged. The recovered propylene glycol accordingly was 314 part (17.5 mole). After cooled to a room temperature, the resulting discharged resin was pulverized for granulation. The obtained product was non-linear polyester (Ab-12).

The non-linear polyester (Ab-12) had TG of 60° C., 4200 of Mn, 7800 of peak top molecular weight, 3% of the THF-insoluble fractions, 97 kJ of En, $1.36 \times 10^4$ of G', 135° C. of Tm, and 1.2 to 1.9 of tan δ.

[Polyester Resin for a Toner]

The non-linear polyester (Ab-12) synthesized in the above-mentioned manner was used as a polyester resin for a toner (12).

Comparative Example 11

Synthesis of Non-Linear Polyester

To a reaction tank equipped with a cooling tube, a stirrer, and a nitrogen introduction tube, bisphenol A-2 mole propylene oxide adduct 552 part (2.5 mole), bisphenol A-2 mole ethylene oxide adduct 184 part (8 mole), terephthalic acid 287 part (8.2 mole), and dibutyltin oxide 3 part were loaded and under nitrogen gas stream, dehydration esterification was carried out at 230° C. At the time when no water was discharged, the pressure was reduced and esterification was promoted until the acid value reached 1.0. After that, the temperature was adjusted to be 220° C. and trimellitic anhydride 49 part (1.2 mole) was added and the temperature was kept as it was for 1 hour. After that, reaction was carried out at a proper pressure reduced by 5 to 20 mmHg and when the softening temperature reached 115° C., the product was discharged out of the reaction tank to obtain non-linear polyester (Ab'-13). The non-linear polyester (Ab'-13) had Tg of 60° C., 3200 of Mn, 5800 of peak top molecular weight, 0% of the THF-insoluble fractions, 165 kJ of En, $5.8 \times 10^3$ of G', Tm of 115° C., and 1.1 to 5.2 of tan δ.

[Polyester Resin for a Toner]

The non-linear polyester (Ab'-13) synthesized in the above-mentioned manner was used as a polyester resin for a toner (11) for comparison.

Comparative Example 12

Synthesis of Non-Linear Polyester

To the reaction tank same as that of Example 1, bisphenol A-2 mole propylene oxide adduct 138 part (2.2 mole), bisphenol A-2 mole ethylene oxide adduct 616 part (8.5 mole), terephthalic acid 224 part (7.5 mole), and as a condensation catalyst, dibutyltin oxide 3 part were loaded and under nitrogen gas stream, reaction was carried out at 230° C. for 7 hours while produced water was removed. Next, the reaction was carried out under a reduced pressure of 5 to 20 mmHg and when the acid value became 1, the reaction system was cooled to 180° C. and trimellitic acid 87 part (2.5 mole) was added and after 2 hour reaction in closed state at a normal pressure, the reaction was carried out at 220° C. at a normal pressure and then at a reduced pressure of 5 to 20 mmHg and when the softening temperature reached 185° C., the product was discharged, cooled to a room temperature, and pulverized for granulation. The obtained product was a non-linear polyester (Ab'-14).

The non-linear polyester (Ab'-14) had 6000 of Mn, 10000 of Mp, 183 kJ of En, $5.0 \times 10^5$ of G', Tm of 185° C., and 0.1 to 0.4 of tan δ.

[Synthesis of Linear Polyester]

To the reaction tank same as that of Example 1, bisphenol A-2 mole propylene oxide adduct 552 part (10.0 mole), bisphenol A-2 mole ethylene oxide adduct 208 part (4.0 mole), terephthalic acid 263 part (10.0 mole), and as a condensation catalyst, dibutyltin oxide 3 part were loaded and under nitrogen gas stream, reaction was carried out at 230° C. for 5 hours while the produced water was removed. Next, when the acid value became 1.5, the reaction system was cooled to 180° C. and trimellitic acid 34 part was added and after 2 hour reaction in closed state at a normal pressure, the product was discharged, cooled to a room temperature, and pulverized for granulation. The obtained product was a linear polyester (Aa'-14).

The linear polyester (Aa'-14) had 2800 of Mn, 5200 of Mp, 166 kJ of En, $1.4 \times 10^2$ of G', Tm of 100° C., and 3 to 15 of tan δ.

[Production of Polyester Resin for Toner]

The non-linear polyester (Ab'-14) 400 part and the linear polyester (Aa'-14) 600 part were melted and kneaded at 150° C. jacket temperature for stagnation duration 3 minutes by a continuous kneader. The resulting melted resin was cooled to a room temperature and successively pulverized by a pulverizer for granulation to obtain a polyester resin (12) for a toner for comparison.

Comparative Example 13

Synthesis of Non-Linear Polyester

To the reaction tank same as that of Example 1, bisphenol A-2 mole propylene oxide adduct 137 part (2.2 mole), bisphenol A-2 mole ethylene oxide adduct 612 part (8.5 mole), terephthalic acid 267 part (9.0 mole), and as a condensation catalyst, dibutyltin oxide 3 part were loaded and under nitrogen gas stream, reaction was carried out at 230° C. for 7 hours while produced water was removed. Next, the reaction was carried out under a reduced pressure of 5 to 20 mmHg and when the acid value became 1, the reaction system was cooled to 180° C. and trimellitic acid 52 part (1.5 mole) was added and after 2 hour reaction in closed state at a normal pressure, the reaction was carried out at 220° C. and a normal pressure and properly at a reduced pressure of 5 to 20 mmHg and when the softening temperature reached 160° C., the product was discharged, cooled to a room temperature, and pulverized for granulation. The obtained product was a non-linear polyester (Ab'-15).

The non-linear polyester (Ab'-15) had 11000 of Mn, 240000 of Mp, 183 kJ of En, $2.4 \times 10^5$ of G', Tm of 160° C., and 0.5 to 0.9 of tan δ.

[Production of Polyester Resin for Toner]

The non-linear polyester (Ab'-15) 400 part and the linear polyester (Aa'-15) 600 part were melted and kneaded at 150° C. jacket temperature for stagnation duration 3 minutes by a continuous kneader. The resulting melted resin was cooled to a room temperature and successively pulverized by a pulverizer for granulation to obtain a polyester resin (13) for a toner for comparison.

Examples (11) and (12) and Comparative Example (11) to (13)

Cyanine Blue KRO (manufactured by Sanyo Color Works Ltd.) 8 part and carnauba wax 5 part were added to 100 part of respective polyester resins for a toner (11) and (12) within the scope of the invention and polyester resins for a toner for comparison (11) to (13) and toners were produced by the following method.

At first, each mixture was preliminarily mixed by a Henshel mixer (FM10B, manufactured by Mitsui Miike Chemical Plant Service Inc.) and then kneaded by a biaxial kneader (PCM-30, manufactured by Ikegai Co., Ltd.). Successively, each mixture was finely pulverized by ultrasonic jet pulverizer Labo-Jet (manufactured by Nippon Pneumatic Industry Co., Ltd.) and classified by an air current classifier (MDS-I, manufactured by Nippon Pneumatic Industry Co., Ltd.) to obtain toner particles with 8 μm of particle diameter D50. Next, colloidal silica (Aerosil R972: manufactured by Nippon Aerosil Co., Ltd.) 0.5 part was added to each obtained toner particles 100 part and mixed by a sample mill to obtain toners (11) and (12) within a scope of the invention and toners (11) to (13) for comparison.

The toners were evaluated by the above-mentioned evaluation methods and the evaluation results are shown in Table 2.

TABLE 2

| Toner No. | MFT (° C.) | Gross (° C.) | HOT (° C.) | Fluidity | Grindability average particle diameter (μm) |
|---|---|---|---|---|---|
| Toner (11) | 125 | 145 | 230 or higher | ◯ | 11 |
| Toner (12) | 125 | 145 | 220 | ◯ | 11 |
| Toner for comparison (11) | 130 | 145 | 170 | ΔX | 11 |
| Toner for comparison (12) | 145 | 180 | 230 or higher | ΔX | 15 |
| Toner for comparison (13) | 125 | 180 | 230 or higher | Δ | 13 |

Examples 21 to 24 and Comparative Examples 21 and 22

Example 21

To the reaction tank same as that of Example 1, propylene glycol 127 part, terephthalic acid dimethyl ester 454 part, adipic acid 38, bisphenol A-2 mole propylene oxide adduct 452 part, phenol novolak resin (average polymerization degree 5.6)-EO adduct 2.3 part, and as a condensation catalyst, tetrabutoxy titanate 3 part were loaded and under nitrogen gas stream, reaction was carried out at 180° C. for 12 hours while the produced methanol was removed. Successively, while the reaction system was gradually heated to 230° C. and the produced water was removed under nitrogen gas stream, reaction was carried out for 4 hours and further continued at a pressure reduced to 5 to 20 mmHg and when the softening point reached 98° C., the product was cooled. When the temperature reached 180° C., trimellitic anhydride 17 part was added and the reaction was carried out for 1 hour under stirring condition and the product was discharged. The discharged polyester resin [21] had 3600 of Mn, 8000 of Mp, Tg of 60° C., 114 kJ of En, 140 of G', Tm of 102° C., and 6 to 11 of tan δ.

Example 22

To the reaction tank same as that of Example 1, propylene glycol 347 part, terephthalic acid dimethyl ester 317 part, adipic acid 60, and as a condensation catalyst, tetrabutoxy titanate 3 part were loaded and under nitrogen gas stream, reaction was carried out at 180° C. for 8 hours while the produced methanol was removed. Successively, bisphenol A-2 mole propylene oxide adduct 596 part, phenol novolak resin (average polymerization degree 5.6)-EO adduct 2.3 part were added and while the reaction system was gradually heated to 230° C. and the produced propylene glycol and water were removed under nitrogen gas stream, reaction was carried out for 4 hours and further continued at a pressure reduced to 5 to 20 mmHg and when the softening point reached 98° C., the product was cooled. The recovered propylene glycol was 295 part. When the temperature reached 180° C., trimellitic anhydride 17 part was added and the reaction was carried out for 1 hour under stirring condition and the product was discharged. The discharged polyester resin [22] had 3700 of Mn, 7900 of Mp, Tg of 60° C., 140 kJ of En, 150 of G', 102° C. of Tm, and 5 to 11 of tan δ.

Example 23

To the reaction tank same as that of Example 1, propylene glycol 380 part, phenol novolak resin (average polymerization degree 5.6)-EO adduct 46 part, terephthalic acid dimethyl ester 351 part, adipic acid 28, and as a condensation catalyst, tetrabutoxy titanate 3 part were loaded and under nitrogen gas stream, reaction was carried out at 180° C. for 8 hours while the produced methanol was removed. Successively, while the reaction system was gradually heated to 230° C. and the produced propylene glycol and water were removed under nitrogen gas stream, reaction was carried out for 4 hours and further continued at a pressure reduced to 5 to 20 mmHg and when the softening point reached 141° C., the product was discharged. The recovered propylene glycol was 190 part. The discharged polyester resin [23] had 3700 of Mn, 11000 of Mp, Tg of 65° C., 73 kJ of En, $8.7 \times 10^3$ of G', Tm of 142° C., and 1.6 to 1.8 of tan δ.

Comparative Example 21

To the reaction tank same as that of Example 1, terephthalic acid ethylene glycol diester 453 part, adipic acid 36, and as a condensation catalyst, dibutyltin oxide 3 part were loaded and bisphenol A-2 mole propylene oxide adduct 596 part and trimellitic anhydride 0.9 part were added and while the reaction system was gradually heated to 230° C. and the produced ethylene glycol and water were removed under nitrogen gas stream, reaction was carried out for 7 hours and further continued at a pressure reduced to 1 to 20 mmHg and when the softening point reached 98° C., the product was cooled. The recovered ethylene glycol was 239 part. When the temperature reached 180° C., trimellitic anhydride 17 part was added and the reaction was carried out for 1 hour under stirring condition and the product was discharged. The discharged polyester resin [21'] for comparison had 4200 of Mn, 8100 of Mp, Tg of 58° C., 167 kJ of En, 140 of G', Tm of 101° C., and 4 to 11 of tan δ.

Example 24 and Comparative Example 22

Cyanine Blue KRO (manufactured by Sanyo Color Works Ltd.) 8 part and carnauba wax 5 part were added to 100 part of respective polyester resins [21] to [23] within the scope of the invention and polyester resin [21'] for comparison and toners were produced by the following method.

At first, each mixture was preliminarily mixed by a Henshel mixer (FM10B, manufactured by Mitsui Miike Chemical Plant Service Inc.) and then kneaded by a biaxial kneader (PCM-30, manufactured by Ikegai Co., Ltd.). Successively, each mixture was finely pulverized by ultrasonic jet pulverizer Labo-Jet (manufactured by Nippon Pneumatic Industry Co., Ltd.) and classified by an air current classifier (MDS-I, manufactured by Nippon Pneumatic Industry Co., Ltd.) to obtain toner particles with 8 μm of particle diameter D50. Next, colloidal silica (Aerosil R972: manufactured by Nippon Aerosil Co., Ltd.) 0.5 part was added to each obtained toner particles 100 part and mixed by a sample mill to obtain toners (21) to (23) within a scope of the invention and a toner (21) for comparison.

The toners were evaluated by the above-mentioned evaluation methods and the evaluation results are shown in Table 3. The image density were measured by carrying out fixing evaluation in the same manner as the above-mentioned MFT and measuring the density by a Macbeth Densitometer.

TABLE 3

| Toner No. | MFT (°C.) | Gross (°C.) | HOT (°C.) | Fluidity | Grindability average particle diameter (μm) | Image density |
|---|---|---|---|---|---|---|
| Toner (21) | 135 | 145 | 200 | ○ | 11 | 1.31 |
| Toner (22) | 135 | 145 | 200 | ○ | 11 | 1.30 |
| Toner (23) | 130 | 145 | 230 | ○ | 11 | 1.35 |
| Toner for comparison (21) | 140 | 145 | 200 | ΔX | 12 | 1.18 |

Examples Relevant to the Fifth Invention

Production Examples 31 to 33 and Comparative Production Examples 31 and 32

Production Example 31

Polyester Resin

[Synthesis of Linear Polyester]
The linear polyester (Aa-1) of Example 1 was synthesized and employed as linear polyester (Aa-31).
[Synthesis of Non-Linear Polyester]
The non-linear polyester (Ab-1) of Example 1 was synthesized and employed as non-linear polyester (Ab-31).

Production Example 32

Polyester Resin

[Synthesis of Linear Polyester]
The linear polyester (Aa-2) of Example 2 was synthesized and employed as linear polyester (Aa-32).
[Synthesis of Non-Linear Polyester]
The non-linear polyester (Ab-2) of Example 2 was synthesized and employed as non-linear polyester (Ab-32).

Production Example 33

Additive for Toner

To an autoclave reaction tank equipped with a thermometer and a stirrer, xylene 600 part, thermal degradation type low molecular weight polypropylene (Viscol 440P: softening point 153° C., manufactured by Sanyo Chemical Industries, Ltd.) 480 part, and thermal degradation type low molecular weight polypropylene (Sanwax LEL-400: softening point 128° C., manufactured by Sanyo Chemical Industries, Ltd.) 120 part were loaded and sufficiently dissolved and after replacement of the gas with nitrogen, a mixed solution containing styrene 1992 part, acrylonitrile 168 part, monobutyl maleate 240 part, di-tert-butyl peroxyhexahydroterephthalate 78 part, and xylene 455 part was dropwise added at 175° C. for 3 hours to carry out polymerization and the temperature was kept further for 30 minutes. Next, De-solvation was carried out to obtain an additive (B-1) for a toner, which was modified wax.

The additive (B-1) had 2950 of Mn, 10900 of weight average molecular weight, and 20.9 mgKOH/g of acid value.

Comparative Production Example 31

Polyester Resin

[Synthesis of Linear Polyester]
The linear polyester (Aa'-6) of Comparative Example 2 was synthesized and employed as linear polyester (Aa'-31) for comparison.
[Synthesis of Non-Linear Polyester]
The non-linear polyester (Ab'-5) of Comparative Example 1 was synthesized and employed as non-linear polyester (Ab'-31) for comparison.

Comparative Production Example 32

To an autoclave reaction tank equipped with a thermometer and a stirrer, xylene 1200 part was loaded and after replacement of the gas with nitrogen, a mixed solution containing styrene 1992 part, acrylonitrile 168 part, monobutyl maleate 240 part, di-tert-butyl peroxyhexahydroterephthalate 78 part, and xylene 455 part was dropwise added at 175° C. for 3 hours to carry out polymerization and the temperature was kept further for 30 minutes. Next, De-solvation was carried out to obtain an additive (B'-1) for a toner for comparison.

The additive (B'-1) had 2900 of Mn, 9800 of weight average molecular weight, and 25.8 mgKOH/g of acid value.

Examples 31 and 32 and Comparative Examples 31 and 32

Example 31

Production of Polyester Resin Composition for Toner

The linear polyester (Aa-31) 580 part, the non-linear polyester (Ab-31) 400 part, and the additive for a toner (B-1) 20 part were melted and kneaded at 150° C. jacket temperature for stagnation duration 3 minutes by a continuous kneader. The resulting melted resin was cooled to a room temperature and successively pulverized by a pulverizer for granulation to obtain a polyester resin composition (31) for a toner of the invention.

The polyester resin composition (31) for a toner had Tg of 64° C., 2200 of Mn, 3200 of Mp, and 13% of the THF-insoluble fractions.

Example 32

Production of Polyester Resin Composition for Toner

The linear polyester (Aa-32) 580 part, the non-linear polyester (Ab-32) 400 part, and the additive for a toner (B-1) 20 part were melted and kneaded at 150° C. jacket temperature for stagnation duration 3 minutes by a continuous kneader. The resulting melted resin was cooled to a room temperature and successively pulverized by a pulverizer for granulation to obtain a polyester resin composition for a toner (32) of the invention.

The polyester resin composition for a toner (32) had Tg of 64° C., 3200 of Mn, 6700 of Mp, and 13% of the THF-insoluble fractions.

Comparative Example 31

Production of Polyester Resin Composition for Toner

The linear polyester (Aa'-31) 580 part, the non-linear polyester (Ab'-31) 400 part, and the additive for a toner (B-1) 20 part were melted and kneaded at 150° C. jacket temperature for stagnation duration 3 minutes by a continuous kneader. The resulting melted resin was cooled to a room temperature and successively pulverized by a pulverizer for granulation to obtain a polyester resin composition (31) for a toner for comparison.

The polyester resin composition (31) for a toner for comparison had Tg of 64° C., 3200 of Mn, 6700 of Mp, and 13% of the THF-insoluble fractions.

Comparative Example 32

Production of Polyester Resin Composition for Toner

The linear polyester (Aa-32) 580 part, the non-linear polyester (Ab-32) 400 part, and the additive for a toner (B'-1) for comparison 20 part were melted and kneaded at 150° C. jacket temperature for stagnation duration 3 minutes by a continuous kneader. The resulting melted resin was cooled to a room temperature and successively pulverized by a pulverizer for granulation to obtain a polyester resin composition (32) for a toner for comparison.

The polyester resin composition (32) for a toner for comparison had Tg of 64° C., 3200 of Mn, 6700 of Mp, and 13% of the THF-insoluble fractions.

Evaluation Examples (31) and (32) and Comparative Evaluation Examples (31) and (32)

Carbon black MA-100 (manufactured by Mitsubishi Chemical Corp.) 8 part, carnauba wax 5 part, a charge control agent T-77 (manufactured by Hodogaya Chemical Co., Ltd.) 1 part were added to respective resin compositions for a toner (31) and (32) within the scope of the invention and resin compositions for a toner for comparison (31) and (32) and toners were produced by the following method.

At first, each mixture was preliminarily mixed by a Henshel mixer (FM10B, manufactured by Mitsui Miike Chemical Plant Service Inc.) and then kneaded by a biaxial kneader (PCM-30, manufactured by Ikegai Co., Ltd.). Successively, each mixture was finely pulverized by ultrasonic jet pulverizer Labo-Jet (manufactured by Nippon Pneumatic Industry Co., Ltd.) and classified by an air current classifier (MDS-I, manufactured by Nippon Pneumatic Industry Co., Ltd.) to obtain toner particles with 8 µm of particle diameter D50. Next, colloidal silica (Aerosil R972: manufactured by Nippon Aerosil Co., Ltd.) 0.5 part was added to each obtained toner particles 100 part and mixed by a sample mill to obtain toners (31) and (32) within a scope of the invention and toners (31) and (32) for comparison.

The toners were evaluated by the following evaluation methods and the evaluation results are shown in Table 4.

TABLE 4

| Toner No. | MFT (° C.) | HOT (° C.) | Toner fluidity | Image stability |
|---|---|---|---|---|
| Toner (31) | 120 | 230 | ○ | ○ |
| Toner (32) | 120 | 230 | ○ | ○ |
| Toner for comparison (31) | 135 | 230 | Δ | Δ |
| Toner for comparison (32) | 130 | 210 | X | X |

[Evaluation Methods]
[1] Minimum Fixing Temperature (MFT)
  According to the above-mentioned method.
[2] Hot offset occurrence temperature (HOT)
  According to the above-mentioned method.
[3] Toner Fluidity
  According to the above-mentioned method.
[4] Image Stability
  Using a commercialized printer (LP-1300), each produced toner was loaded and mat printing was carried out continuously. The image of the 5000th printing was observed by eye observation and the image stability was evaluated according to the following criteria.
No unevenness and no white streak: ○
White streaks slightly observed but no unevenness: Δ
White streaks observed and unevenness noticeable: x

Examples Relevant to the Sixth Invention

Production Examples 41 to 43 and Comparative Production Examples 41 to 44

Production Example 41

Synthesis of Linear Polyester

To the reaction tank same as that of Example 1, propylene glycol 792 part (22.8 mole), terephthalic acid dimethyl ester 868 part (9.8 mole), adipic acid 13 part (0.2 mole), and as a condensation catalyst, tetrabutoxy titanate 3 part were loaded and under nitrogen gas stream, reaction was carried out at 180° C. for 8 hours while the produced methanol was removed. Successively, while the reaction system was gradually heated to 230° C. and the produced propylene glycol and water were removed under nitrogen gas stream, reaction was carried out for 4 hours and further continued at a pressure reduced to 5 to 20 mmHg and when the softening point (Tm) reached 80° C., the reaction system was cooled to 180° C. and trimellitic anhydride 26 part (0.3 mole) was added and after 2 hour reaction in closed state at a normal pressure, the product was discharged. The recovered propylene glycol was 410 part (11.8 mole). After being cooled to a room temperature, the discharged resin was pulverized for granulation. The obtained product was linear polyester (Aa-41).

The linear polyester (Aa-41) had Tg of 56° C., 2200 of Mn, 4000 of Mp, 0% of the THF-insoluble fractions, 73 kJ of En, $2 \times 10^2$ of G', Tm of 82° C., 4 to 12 of tan δ.

[Synthesis of Non-Linear Polyester]

To the reaction tank same as described above, propylene glycol 810 part (22.4 mole), terephthalic acid dimethyl ester 774 part (8.4 mole), adipic acid 111 part (1.6 mole), and as a condensation catalyst, tetrabutoxy titanate 3 part were loaded and under nitrogen gas stream, reaction was carried out at 180° C. for 8 hours while the produced methane was removed. Successively, while the reaction system was gradually heated to 230° C. and the produced propylene glycol and water were removed under nitrogen gas stream, reaction was carried out for 4 hours and further continued for 1 hour at a pressure reduced to 5 to 20 mmHg. The recovered propylene glycol was 427 part (11.8 mole). Then the reaction system was cooled to 180° C., trimellitic anhydride 18 part (0.2 mole) was added and after 2-hour reaction in closed state at a normal pressure, reaction was carried out at 220° C. in a pressure reduced to 5 to 20 mmHg and when the softening point (Tm) reached 125° C., the product was discharged and cooled to a room temperature and pulverized for granulation. The obtained product was non-linear polyester (Ab-41).

The non-linear polyester (Ab-41) had Tg of 55° C., 7000 of Mn, 16000 of Mp, 3% of the THF-insoluble fractions, 73 kJ of En, $6.8 \times 10^2$ of G', Tm of 125° C., and 2.8 to 4 of tan δ.
[Production of Polyester Resin For Toner]

The linear polyester (Aa-41) 600 part and the non-linear polyester (Ab-41) 400 part were melted and kneaded at 150° C. jacket temperature for stagnation duration 3 minutes by a continuous kneader. The resulting melted resin was cooled to a room temperature and successively pulverized by a pulverizer for granulation to obtain a polyester resin (A-41) for a toner of the invention.

The polyester resin (A-41) for a toner had Tg of 55° C., Sp of 98° C., 4500 of Mn, 5000 of Mp, and 2% of the THF-insoluble fractions. As shown in FIG. 1, Tg and Sp was within the area surrounded with the equations (1) to (4).

Production Example 42

Synthesis of Linear Polyester

To the reaction tank same as that of Example 1, propylene glycol 803 part (22.6 mole), terephthalic acid dimethyl ester 816 part (9.0 mole), adipic acid 68 part (1.0 mole), and as a condensation catalyst, tetrabutoxy titanate 3 part were loaded and under nitrogen gas stream, reaction was carried out at 180° C. for 8 hours while the produced methanol was removed. Successively, while the reaction system was gradually heated to 230° C. and the produced propylene glycol and water were removed under nitrogen gas stream, reaction was carried out for 4 hours and further continued at a pressure reduced to 5 to 20 mmHg and when the softening point (Tm) reached 93° C., the reaction system was cooled to 180° C. and trimellitic anhydride 26 part (0.3 mole) was added and after 2 hour reaction in closed state at a normal pressure, the product was discharged. The recovered propylene glycol was 427 part (12.0 mole). After being cooled to a room temperature, the discharged resin was pulverized for granulation. The obtained product was linear polyester (Aa-42).

The linear polyester (Aa-42) had Tg of 55° C., 3000 of Mn, 5800 of Mp, 0% of the THF-insoluble fractions, 73 kJ of En, $2.2 \times 10^2$ of G', Tm of 95° C., 5 to 11 of tan δ.
[Synthesis of Non-Linear Polyester]

To the reaction tank same as described above, propylene glycol 780 part (22.6 mole), terephthalic acid dimethyl ester 793 part (9.0 mole), adipic acid 66 part (1.0 mole), and as a condensation catalyst, tetrabutoxy titanate 3 part were loaded and under nitrogen gas stream, reaction was carried out at 180° C. for 8 hours while the produced methanol was removed. Successively, while the reaction system was gradually heated to 230° C. and the produced propylene glycol and water were removed under nitrogen gas stream, reaction was carried out for 4 hours and further continued for 1 hour at a pressure reduced to 5 to 20 mmHg. The recovered propylene glycol was 397 part (11.5 mole). Then the reaction system was cooled to 180° C., trimellitic anhydride 44 part (0.5 mole) was added and after 2-hour reaction in closed state at a normal pressure, reaction was carried out at 220° C. in a pressure reduced to 5 to 20 mmHg and when the softening point (Tm) reached 145° C., the product was discharged and cooled to a room temperature and pulverized for granulation. The obtained product was non-linear polyester (Ab-42).

The non-linear polyester (Ab-42) had Tg of 66° C., 6800 of Mn, 10500 of Mp, 2% of the THF-insoluble fractions, 73 kJ of En, $2.0 \times 10^3$ of G', Tm of 145° C., and 1.5 to 1.9 of tan δ.
[Production of Polyester Resin for Toner]

The linear polyester (Aa-42) 600 part and the non-linear polyester (Ab-42) 400 part were melted and kneaded at 150° C. jacket temperature for stagnation duration 3 minutes by a continuous kneader. The resulting melted resin was cooled to a room temperature and successively pulverized by a pulverizer for granulation to obtain a polyester resin (A-42) for a toner of the invention.

The polyester resin (A-42) for a toner had Tg of 60° C., 110° C. of Sp, 5000 of Mn, 6500 of Mp, and 1% of the THF-insoluble fractions. As shown in FIG. 1, Tg and Sp was within the area surrounded with the equations (1) to (4).

Production Example 43

Synthesis of Linear Polyester

To the reaction tank same as that of Example 1, propylene glycol 634 part (22.7 mole), bisphenol A-2 mole PO adduct 256 part (2.0 mole), terephthalic acid dimethyl ester 658 part (9.2 mole), adipic acid 43 part (0.8 mole), and as a condensation catalyst, tetrabutoxy titanate 3 part were loaded and under nitrogen gas stream, reaction was carried out at 180° C. for 8 hours while the produced methanol was removed. Successively, while the reaction system was gradually heated to 230° C. and the produced propylene glycol and water were removed under nitrogen gas stream, reaction was carried out for 4 hours and further continued at a pressure reduced to 5 to 20 mmHg and when the softening point (Tm) reached 93° C., the reaction system was cooled to 180° C. and trimellitic anhydride 26 part (0.4 mole) was added and after 2 hour reaction in closed state at a normal pressure, the product was discharged. The recovered propylene glycol was 390 part (13.9 mole). After being cooled to a room temperature, the discharged resin was pulverized for granulation. The obtained product was linear polyester (Aa-43).

The linear polyester (Aa-43) had Tg of 65° C., 3300 of Mn, 6200 of Mp, 0% of the THF-insoluble fractions, 90 kJ of En, $2.2 \times 10^2$ of G', Tm of 95° C., 5 to 11 of tan δ.
[Synthesis of Non-Linear Polyester]

To the reaction tank same as described above, propylene glycol 582 part (22.7 mole), bisphenol A-3 mole PO adduct 326 part (2.4 mole), terephthalic acid dimethyl ester 603 part (9.2 mole), adipic acid 39 part (0.8 mole), and as a condensation catalyst, tetrabutoxy titanate 3 part were loaded and under nitrogen gas stream, reaction was carried out at 180° C. for 8 hours while the produced methanol was removed. Successively, while the reaction system was gradually heated to 230° C. and the produced propylene glycol and water were removed under nitrogen gas stream, reaction was carried out for 4 hours and further continued for 1 hour at a pressure reduced to 5 to 20 mmHg. The recovered propylene glycol was 360 part (14.0 mole). Then the reaction system was cooled to 180° C., trimellitic anhydride 23 part (0.4 mole) was added and after 2-hour reaction in closed state at a normal pressure, reaction was carried out at 220° C. in a pressure reduced to 5 to 20 mmHg and when the softening point (Tm) reached 160° C., the product was discharged and cooled to a room temperature and pulverized for granulation. The obtained product was non-linear polyester (Ab-43).

The non-linear polyester (Ab-43) had Tg of 65° C., 7000 of Mn, 13200 of Mp, 3% of the THF-insoluble fractions, 97 kJ of En, 9.5×10³ of G', 160° C. of Tm, and 1.2 to 2.2 of tan δ.

[Production of Polyester Resin for Toner]

The linear polyester (Aa-43) 600 part and the non-linear polyester (Ab-43) 400 part were melted and kneaded at 150° C. jacket temperature for stagnation duration 3 minutes by a continuous kneader. The resulting melted resin was cooled to a room temperature and successively pulverized by a pulverizer for granulation to obtain a polyester resin (A-43) for a toner of the invention.

The polyester resin (A-43) for a toner had Tg of 65° C., Sp of 125° C., 5100 of Mn, 6500 of Mp, and 2% of the THF-insoluble fractions. As shown in FIG. 1, Tg and Sp was within the area surrounded with the equations (1) to (4).

Comparative Production Example 41

Synthesis of Linear Polyester

To the reaction tank same as that of Example 1, bisphenol A-2 mole PO adduct 642 part (11.9 mole), bisphenol A-3 mole PO adduct 131 part (2.1 mole), terephthalic acid 275 part (10.0 mole), and as a condensation catalyst tetrabutoxy titanate 3 part were loaded and under nitrogen gas stream, reaction was carried out at 230° C. for 5 hours while the produced water was removed. Successively, reaction was carried out under a pressure reduced to 5 to 20 mmHg and when the acid value reached 2 or lower, the reaction system was cooled to 180° C. and trimellitic anhydride 26 part (0.9 mole) was added and the product was discharged after reaction for 2 hours in closed condition at a normal pressure and after cooled to a room temperature, the discharged resin was pulverized for granulation. The obtained product was linear polyester (Aa'-41).

The linear polyester (Aa'-41) had Tg of 55° C., 2000 of Mn, 4000 of Mp, 0% of the THF-insoluble fractions, 170 kJ of En, 2.0×10² of G', Tm of 82° C., 4 to 12 of tan δ.

[Synthesis of Non-Linear Polyester]

To the reaction tank same as described above, bisphenol A-3 mole PO adduct 777 part (12.5 mole), terephthalic acid 171 part (6.7 mole), trimellitic anhydride 59 part (2.0 mole), and as a condensation catalyst, tetrabutoxy titanate 3 part were loaded and under nitrogen gas stream, reaction was carried out at 230° C. for 7 hours while the produced water was removed. Successively, reaction was carried out under a pressure reduced to 5 to 20 mmHg and when the acid value reached 2 or lower, the reaction system was cooled to 180° C. and fumaric acid 60 part (3.3 mole) was added and after 4 our reaction at a normal pressure, the reaction was carried out in a pressure reduced to 5 to 20 mmHg and when the softening point (Tm) reached 115° C., the product was discharged, cooled to a room temperature, and then pulverized for granulation. The obtained product was non-linear polyester (Ab'-41).

The non-linear polyester (Ab'-41) had Tg of 56° C., 6500 of Mn, 9500 of Mp, 5% of the THF-insoluble fractions, 184 kJ of En, 6.8×10² of G', Tm of 125° C., and 0.7 to 1.1 of tan δ.

[Production of Polyester Resin for Toner]

The linear polyester (Aa'-41) 600 part and the non-linear polyester (Ab'-41) 400 part were melted and kneaded at 150° C. jacket temperature for stagnation duration 3 minutes by a continuous kneader. The resulting melted resin was cooled to a room temperature and successively pulverized by a pulverizer for granulation to obtain a polyester resin (A'-41) for a toner for comparison.

The polyester resin (A'-41) for a toner for comparison had Tg of 56° C., Sp of 96° C., 4000 of Mn, 5000 of Mp, 3% of the THF-insoluble fractions. As shown in FIG. 1, Tg and Sp was within the area surrounded with the equations (1) to (4).

Comparative Production Example 42

Synthesis of Linear Polyester

To the reaction tank same as that of Example 1, bisphenol A-2 mole PO adduct 490 part (8.4 mole), bisphenol A-3 mole PO adduct 266 part (4.0 mole), terephthalic acid 278 part (10.0 mole), and as a condensation catalyst tetrabutoxy titanate 3 part were loaded and under nitrogen gas stream, reaction was carried out at 230° C. for 5 hours while the produced water was removed. Successively, reaction was carried out under a pressure reduced to 5 to 20 mmHg and when the acid value reached 2 or lower, the reaction system was cooled to 180° C. and trimellitic anhydride 26 part (0.8 mole) was added and the product was discharged after reaction for 2 hours in closed condition at a normal pressure and after cooled to a room temperature, the discharged resin was pulverized for granulation. The obtained product was linear polyester (Aa'-42).

The linear polyester (Aa'-42) had Tg of 65° C., 3000 of Mn, 5900 of Mp, 0% of the THF-insoluble fractions, 172 kJ of En, 2.3×10² of G', Tm of 95° C., 5 to 11 of tan δ.

[Synthesis of Non-Linear Polyester]

To the reaction tank same as described above, bisphenol A-2 mole PO adduct 210 part (4.2 mole), bisphenol A-3 mole PO adduct 567 part (9.8 mole), terephthalic acid 159 part (6.7 mole), fumaric acid 56 part (3.3 mole), and as a condensation catalyst, tetrabutoxy titanate 3 part were loaded and under nitrogen gas stream, reaction was carried out at 210° C. for 7 hours while the produced water was removed. Successively, reaction was carried out under a pressure reduced to 5 to 20 mmHg and when the acid value reached 2 or lower, the reaction system was cooled to 180° C. and trimellitic acid 74 part (2.7 mole) was added and after 2 our reaction at a normal pressure, the reaction was carried out at 220° C. in a pressure reduced to 5 to 20 mmHg and when the softening point (Tm) reached 160° C., the product was discharged, cooled to a room temperature, and then pulverized for granulation. The obtained product was non-linear polyester (Ab'-42).

The non-linear polyester (Ab'-42) had Tg of 67° C., 4000 of Mn, 7500 of Mp, 45% of the THF-insoluble fractions, 179 kJ of En, 1.2×10⁴ of G', Tm of 160° C., and 0.5 to 0.8 of tan δ.

[Production of Polyester Resin for Toner]

The linear polyester (Aa'-42) 600 part and the non-linear polyester (Ab'-42) 400 part were melted and kneaded at 150° C. jacket temperature for stagnation duration 3 minutes by a continuous kneader. The resulting melted resin was cooled to a room temperature and successively pulverized by a pulverizer for granulation to obtain a polyester resin (A'-42) for a toner for comparison.

The polyester resin (A'-42) for a toner for comparison had Tg of 66° C., Sp of 125° C., 3500 of Mn, 6000 of Mp, 23% of the THF-insoluble fractions. As shown in FIG. 1, Tg and Sp was within the area surrounded with the equations (1) to (4).

Comparative Production Example 43

Synthesis of Linear Polyester

To the reaction tank same as that of Example 1, propylene glycol 385 part (22.6 mole), bisphenol A-2 mole PO adduct 156 part (2.0 mole), bisphenol A-3 mole PO adduct 451 part (5.0 mole), terephthalic acid dimethyl ester 391 part (9.0 mole), adipic acid 33 part (1.0 mole), and as a condensation catalyst, tetrabutoxy titanate 3 part were loaded and under nitrogen gas stream, reaction was carried out at 180° C. for 8 hours while the produced methanol was removed. Successively, while the reaction system was gradually heated to 230° C. and the produced propylene glycol and water were removed under nitrogen gas stream, reaction was carried out for 4 hours and further continued at a pressure reduced to 5 to 20 mmHg and when the softening point (Tm) reached 93° C., the reaction system was cooled to 180° C. and trimellitic anhydride 26 part (0.6 mole) was added and after 2 hour reaction in closed state at a normal pressure, the product was discharged. The recovered propylene glycol was 304 part (17.9 mole). After being cooled to a room temperature, the discharged resin was pulverized for granulation. The obtained product was linear polyester (Aa'-43).

The linear polyester (Aa'-43) had Tg of 52° C., 2900 of Mn, 5800 of Mp, 0% of the THF-insoluble fractions, 136 kJ of En, $2.3 \times 10^2$ of G', Tm of 95° C., 5 to 11 of tan δ.

[Synthesis of Non-Linear Polyester]

To the reaction tank same as described above, propylene glycol 132 part (8.0 mole), bisphenol A-3 mole PO adduct 653 part (7.5 mole), terephthalic acid dimethyl ester 140 part (3.3 mole), trimellitic anhydride 83 part (2.0 mole), and as a condensation catalyst, tetrabutoxy titanate 3 part were loaded and under nitrogen gas stream, reaction was carried out at 180° C. for 8 hours while the produced methanol was removed. Successively, while the reaction system was gradually heated to 230° C. and the produced propylene glycol and water were removed under nitrogen gas stream, reaction was carried out for 4 hours and further continued for 1 hour at a pressure reduced to 5 to 20 mmHg. The recovered propylene glycol was 61 part (3.7 mole). Then the reaction system was cooled to 180° C., fumaric acid 167 part (6.7 mole) was added and after 4-hour reaction at a normal pressure, reaction was carried out under a pressure reduced to 5 to 20 mmHg and when the softening point (Tm) reached 130° C., the product was discharged and cooled to a room temperature and pulverized for granulation. The obtained product was non-linear polyester (Ab'-43).

The non-linear polyester (Ab'-43) had Tg of 52° C., 6500 of Mn, 10000 of Mp, 5% of the THF-insoluble fractions, 143 kJ of En, $1.8 \times 10^3$ of G', Tm of 130° C., and 0.7 to 1.1 of tan δ.

[Production of Polyester Resin for Toner]

The linear polyester (Aa'-43) 600 part and the non-linear polyester (Ab'-43) 400 part were melted and kneaded at 150° C. jacket temperature for stagnation duration 3 minutes by a continuous kneader. The resulting melted resin was cooled to a room temperature and successively pulverized by a pulverizer for granulation to obtain a polyester resin (A'-43) for a toner of the invention.

The polyester resin (A'-43) for a toner had Tg of 52° C., Sp of 108° C., 4500 of Mn, 6500 of Mp, and 3% of the THF-insoluble fractions. As shown in FIG. 1, Tg and Sp was out of the area surrounded with the equations (1) to (4).

Comparative Production Example 44

Synthesis of Linear Polyester

To the reaction tank same as that of Example 1, propylene glycol 329 part (22.9 mole), bisphenol A-2 mole PO adduct 395 part (6.0 mole), bisphenol A-3 mole PO adduct 304 part (4.0 mole), terephthalic acid dimethyl ester 363 part (9.9 mole), adipic acid 3 part (0.1 mole), and as a condensation catalyst, tetrabutoxy titanate 3 part were loaded and under nitrogen gas stream, reaction was carried out at 180° C. for 8 hours while the produced methanol was removed. Successively, while the reaction system was gradually heated to 230° C. and the produced propylene glycol and water were removed under nitrogen gas stream, reaction was carried out for 4 hours and further continued at a pressure reduced to 5 to 20 mmHg and when the softening point (Tm) reached 95° C., the reaction system was cooled to 180° C. and trimellitic anhydride 26 part (0.7 mole) was added and after 2 hour reaction in closed state at a normal pressure, the product was discharged. The recovered propylene glycol was 299 part (20.8 mole). After being cooled to a room temperature, the discharged resin was pulverized for granulation. The obtained product was linear polyester (Aa'-44).

The linear polyester (Aa'-44) had Tg of 77° C., 3000 of Mn, 6000 of Mp, 0% of the THF-insoluble fractions, 156 kJ of En, $2.4 \times 10^2$ of G', Tm of 97° C., 2 to 8 of tan δ.

[Synthesis of Non-Linear Polyester]

To the reaction tank same as described above, propylene glycol 330 part (22.6 mole), bisphenol A-2 mole PO adduct 656 part (9.8 mole), terephthalic acid dimethyl ester 373 part (10.0 mole), and as a condensation catalyst, tetrabutoxy titanate 3 part were loaded and under nitrogen gas stream, reaction was carried out at 180° C. for 8 hours while the produced methanol was removed. Successively, while the reaction system was gradually heated to 230° C. and the produced propylene glycol and water were removed under nitrogen gas stream, reaction was carried out for 4 hours and further continued for 1 hour at a pressure reduced to 5 to 20 mmHg. The recovered propylene glycol was 297 part (20.3 mole). Then the reaction system was cooled to 180° C., trimellitic anhydride 74 part (2.0 mole) was added and after 2-hour reaction in closed state at a normal pressure, reaction was carried out at 230° C. under a pressure reduced to 5 to 20 mmHg and when the softening point (Tm) reached 132° C., the product was discharged and cooled to a room temperature and pulverized for granulation. The obtained product was non-linear polyester (Ab'-44).

The non-linear polyester (Ab'-44) had Tg of 77° C., 6600 of Mn, 9800 of Mp, 5% of the THF-insoluble fractions, 149 kJ of En, $1.9 \times 10^3$ of G', Tm of 132° C., and 0.7 to 1.1 of tan δ.

[Production of Polyester Resin for Toner]

The linear polyester (Aa'-44) 600 part and the non-linear polyester (Ab'-44) 400 part were melted and kneaded at 150° C. jacket temperature for stagnation duration 3 minutes by a continuous kneader. The resulting melted resin was cooled to a room temperature and successively pulverized by a pulverizer for granulation to obtain a polyester resin (A'-44) for a toner of the invention.

The polyester resin (A'-43) for a toner had Tg of 77° C., Sp of 110° C., 4200 of Mn, 6600 of Mp, and 3% of the THF-insoluble fractions. As shown in FIG. 1, Tg and Sp was out of the area surrounded with the equations (1) to (4).

Examples 41 to 43 and Comparative
Example 41 to 44

A yellow pigment (Toner Yellow HG VP2155, manufactured by Clariant Japan K.K.) 4 part, carnauba wax 5 part, a charge control agent T-77 (manufactured by Hodogaya Chemical Co., Ltd.) 1 part were added to respective polyester resins for a toner (A-41) to (A-43) within the scope of the invention and polyester resins for a toner (A'-41) to (A'-44) for comparison and toners were produced by the following method.

At first, each mixture was preliminarily mixed by a Henshel mixer (FM10B, manufactured by Mitsui Miike Chemical Plant Service Inc.) and then kneaded by a biaxial kneader (PCM-30, manufactured by Ikegai Co., Ltd.). Successively, each mixture was finely pulverized by ultrasonic jet pulverizer Labo-Jet (manufactured by Nippon Pneumatic Industry Co., Ltd.) and classified by an air current classifier (MDS-I, manufactured by Nippon Pneumatic Industry Co., Ltd.) to obtain toner particles with 8 μm of particle diameter D50. Next, colloidal silica (Aerosil R972: manufactured by Nippon Aerosil Co., Ltd.) 0.5 part was added to each obtained toner particles 100 part and mixed by a sample mill to obtain toners (41) to (43) within a scope of the invention and toners (41) to (44) for comparison.

The toners were evaluated by the following evaluation methods and the evaluation results are shown in Table 5.

TABLE 5

| Toner No. | MFT (° C.) | HOT (° C.) | Color tone | Grindability average particle diameter (μm) |
|---|---|---|---|---|
| Toner (41) | 120 | 225 | ○ | 11 |
| Toner (42) | 120 | 230 | ○ | 11 |
| Toner (43) | 120 | 230 | ○ | 11 |
| Toner for comparison (41) | 120 | 225 | Δ | 13 |
| Toner for comparison (42) | 125 | 230 | X | 15 |
| Toner for comparison (43) | 120 | 215 | Δ | 12 |
| Toner for comparison (44) | 130 | 225 | X | 14 |

[Evaluation Methods]
[1] Minimum Fixing Temperature (MFT)
According to the above-mentioned method.
[2] Hot Offset Occurrence Temperature (HOT)
According to the above-mentioned method.
[3] Color Tone
In the same manner as the above-mentioned MFT, an image was fixed on an OHP film at a fixing roll temperature of 170° C. and the fixed image was projected by an overhead projector and the color tone was evaluated by eye observation.
Judgment Criteria:
○: clear pale yellow color,
Δ: clear yellow color, and
x: slightly foggy yellow color
[4] Grindability
According to the above-mentioned method.

Examples Relevant to the Seventh and the Eighth Inventions

Production Examples 51 to 53

Production Example 51

Production of Water-Based Medium

To a reaction container equipped with a stirring rod and a thermometer, water 753 part, alkylallylsulfosuccinic acid sodium salt (Eleminol JS-2, manufactured by Sanyo Chemical Industries, Ltd.) 8 part, styrene 58 part, methacrylic acid 58 part, butyl acrylate 77 part, ammonium persulfate 1 part, and a surfactant (polyoxysorbitan monooleate) 9 part were loaded and the mixture was stirred at 400 rpm for 15 minutes to obtain a white emulsion. The emulsion was heated to 75° C. temperature of the system and reacted for 5 hours. Further an aqueous 1% ammonium persulfate solution 30 part was added, the reaction product was aged at 75° C. for 5 hours to obtain a water-based dispersion of vinyl resin (styrene-methacrylic acid-butyl acrylate-sodium alkylallylsulfosuccinate copolymer).

Further, carboxymethyl cellulose sodium salt 2 part, an aqueous solution of 48.5% of dodecyl diphenyl ether disulfonic acid sodium salt (Eleminol MON-7, manufactured by Sanyo Chemical Industries, Ltd.) 40 part, and ion exchange water 443 part were added to the above-mentioned water-based dispersion 15 part and evenly stirred to obtain a water-based medium. The volume average particle diameter of the obtained water-based medium measured by LA-920 was 0.05 μm.

Production Example 52

Production of Colorant Dispersion

Copper phthalocyanine 20 part, a colorant dispersion (Solsperse 28000: manufactured by Avecia K.K.) 4 part, and ethyl acetate 76 part were loaded to a beaker and stirred and evenly dispersed and then the copper phthalocyanine was micro-dispersed by a bead mill to obtain [Colorant dispersion]. The volume average particle diameter of the obtained [Colorant dispersion] measured by LA-920 was 0.3 μm.

Production Example 53

Production of Release Agent Dispersion

Paraffin wax 20 part and ethyl acetate 80 part were loaded to a beaker and stirred and evenly dispersed and then the paraffin wax was micro-dispersed by a bead mill to obtain [Release agent dispersion]. The volume average particle diameter of the obtained [Release agent dispersion] measured by LA-920 was 0.5 μm.

Examples 51 to 55 and Comparative Examples 51 to 54

Example 51

Synthesis of Linear Polyester

The linear polyester (Aa-1) of Example 1 was synthesized and employed as linear polyester (K1a-51).
[Synthesis of Non-Linear Polyester]
The non-linear polyester (Ab-1) of Example 1 was synthesized and employed as non-linear polyester (K1b-51).
[Production of Oil Type Mixed Solution]
The linear polyester (K1a-51) 24 part, the non-linear polyester (K1b-51) 16 part, [Colorant dispersion] produced in Production Example 52 10 part, [Release agent dispersion] produced in Production Example 53 25 part, and ethyl acetate 25 part were mixed and stirred evenly to obtain an oil type mixed solution (I-1).
[Production of Resin Particles]
The oil type mixed solution (I-1) 40 part was added to the [Water-based medium] produced in Production Example 51 60 part and stirred at 12000 rpm for 3 minutes by TK type homomixer. Next, the mixed solution was transferred to a flask equipped with a stirring blade and a thermometer and heated by a hot bath at 40° C. under reduced pressure to remove ethyl acetate and obtain a water-based dispersion of resin particles. Next, the dispersion was filtered and separated particles were dried at 40° C. for 18 hours by an air circulation drying apparatus to obtain resin particles (51).

Example 52

Synthesis of Linear Polyester

The linear polyester (Aa-2) of Example 2 was synthesized and employed as linear polyester (K1a-52).
[Synthesis of Non-Linear Polyester]
The non-linear polyester (Ab-2) of Example 2 was synthesized and employed as non-linear polyester (K1b-52).
[Production of Oil Type Mixed Solution]
An oil type mixed solution (1-2) was obtained in the same manner as Example 51, except that the linear polyester (K1a-52) was used in place of the linear polyester (K1a-51) and the non-linear polyester (K1b-52) was used in place of the non-linear polyester (K1b-51).
[Production of Resin Particles]
Resin particles (52) were obtained in the same manner as Example 51, except that the oil type mixed solution (1-2) was used in place of the oil type mixed solution (1-1).

Example 53

Synthesis of Linear Polyester

The linear polyester (Aa-3) of Example 3 was synthesized and employed as linear polyester (K1a-53).
[Synthesis of Non-Linear Polyester]
The non-linear polyester (Ab-3) of Example 3 was synthesized and employed as non-linear polyester (K1b-53).
[Production of Oil Type Mixed Solution]
An oil type mixed solution (1-3) was obtained in the same manner as Example 51, except that the linear polyester (K1a-53) was used in place of the linear polyester (K1a-51) and the non-linear polyester (K1b-53) was used in place of the non-linear polyester (K1b-51).
[Production of Resin Particles]
Resin particles (53) were obtained in the same manner as Example 51, except that the oil type mixed solution (I-3) was used in place of the oil type mixed solution (I-1).

Example 54

Synthesis of Linear Polyester

The linear polyester (Aa-4) of Example 4 was synthesized and employed as linear polyester (K1a-54).
[Synthesis of Non-Linear Polyester]
The non-linear polyester (Ab-4) of Example 4 was synthesized and employed as non-linear polyester (K1b-54).
[Production of Oil Type Mixed Solution]
An oil type mixed solution (I-4) was obtained in the same manner as Example 51, except that the linear polyester (K1a-54) was used in place of the linear polyester (K1a-51) and the non-linear polyester (K1b-54) was used in place of the non-linear polyester (K1b-51).
[Production of Resin Particles]
Resin particles (54) were obtained in the same manner as Example 51, except that the oil type mixed solution (I-4) was used in place of the oil type mixed solution (I-1).

Example 55

Synthesis of Styrene-Acryl Resin

After replacement of the gas with nitrogen, xylene 150 part was loaded to a 1 L autoclave and heated to 150° C. in closed state under stirring condition. A mixed solution containing styrene 425 part, n-butyl acrylate 75 part, dibutyl peroxide 5 part, and xylene 95 part was dropwise added for 3 hours while the temperature in the autoclave was kept at 150° C. to carry out polymerization. After that, the temperature was kept as it was for 1 hour to complete the polymerization. The obtained polymer solution was vacuum dried at 180° C. and cooled to a room temperature and pulverized to obtain a polymer (G1). The obtained styrene-acrylic resin (G1) had 7500 of Mn and 1400 of Mp.
[Production of Oil Type Mixed Solution]
The linear polyester (K1a-51) 20 part, the non-linear polyester (K1b-51) 17 part, [Colorant dispersion] produced in Production Example 52 10 part, [Release agent dispersion] produced in Production Example 53 25 part, and ethyl acetate 25 part were mixed and stirred evenly to obtain an oil type mixed solution (I-5).
[Production of Resin Particles]
The oil type mixed solution (I-5) 40 part was added to the [Water-based medium] produced in Production Example 51 60 part and stirred at 12000 rpm for 3 minutes by TK type homomixer. Next, the mixed solution was transferred to a flask equipped with a stirring blade and a thermometer and heated by a hot bath at 40° C. under reduced pressure to remove ethyl acetate and obtain a water-based dispersion of resin particles. Next, the dispersion was filtered and separated particles were dried at 40° C. for 18 hours by an air circulation drying apparatus to obtain resin particles (55).

Comparative Example 51

Synthesis of Linear Polyester

The linear polyester (Aa'-5) of Comparative Example 1 was synthesized and employed as linear polyester (K1a'-55).
[Synthesis of Non-Linear Polyester]
The non-linear polyester (Ab'-5) of Comparative Example 1 was synthesized and employed as non-linear polyester (K1b'-55).
[Production of Oil Type Mixed Solution]
An oil type mixed solution (I-6) was obtained in the same manner as Example 51, except that the linear polyester (K1a'-55) was used in place of the linear polyester (K1a-51) and the non-linear polyester (K1b'-55) was used in place of the non-linear polyester (K1b-51).
[Production of Resin Particles]
Comparative resin particles (51) were obtained in the same manner as Example 51, except that the oil type mixed solution (I-6) was used in place of the oil type mixed solution (I-1).

Comparative Example 52

Synthesis of Linear Polyester

The linear polyester (Ab'-6) of Comparative Example 2 was synthesized and employed as linear polyester (K1b'-56).
[Production of Oil Type Mixed Solution]
An oil type mixed solution (1-7) was obtained in the same manner as Example 51, except that the linear polyester (K1a'-56) was used in place of the linear polyester (K1a-51) and the non-linear polyester (K1b'-55) was used in place of the non-linear polyester (K1b-51).
[Production of Resin Particles]
Comparative resin particles (52) were obtained in the same manner as Example 51, except that the oil type mixed solution (1-7) was used in place of the oil type mixed solution (1-1).

Comparative Example 53

Synthesis of Linear Polyester

The linear polyester (Aa'-7) of Comparative Example 3 was synthesized and employed as linear polyester (K1a'-57). Since the polyester (K1a'-57) could not be turned to be resin, it was not used for producing resin particles.

Comparative Example 54

Synthesis of Linear Polyester

The linear polyester (Aa'-8) of Comparative Example 4 was synthesized and employed as linear polyester (K1a'-58).
[Synthesis of Non-Linear Polyester]
The non-linear polyester (Ab'-8) of Comparative Example 4 was synthesized and employed as non-linear polyester (K1b'-58).
[Production of Oil Type Mixed Solution]
An oil type mixed solution (I-8) was obtained in the same manner as Example 51, except that the linear polyester (K1a'-58) was used in place of the linear polyester (K1a-51) and the non-linear polyester (K1b'-58) was used in place of the non-linear polyester (K1b-51).
[Production of Resin Particles]
Comparative resin particles (54) were obtained in the same manner as Example 51, except that the oil type mixed solution (I-8) was used in place of the oil type mixed solution (I-1).

Evaluations were carried out by the following evaluation methods and the evaluation results are shown in Table 6.

TABLE 6

| Resin particle No. | MFT (° C.) | HOT (° C.) | Toner fluidity | Volume average particle diameter (μm) |
|---|---|---|---|---|
| Resin particle (51) | 125 | 230 | ○△ | 5.8 |
| Resin particle (52) | 120 | 230 | ○ | 5.7 |
| Resin particle (53) | 125 | 230 | ○ | 5.8 |
| Resin particle (54) | 125 | 230 | ○ | 6.0 |
| Resin particle (55) | 125 | 230 | ○ | 5.8 |
| Comparative resin particles (51) | 135 | 215 | △X | 5.9 |
| Comparative resin particles (52) | 130 | 230 | △X | 5.8 |
| Comparative resin particles (54) | 130 | 230 | △ | 5.6 |

[Evaluation Methods]
[1] Minimum Fixing Temperature (MFT)
According to the above-mentioned method.
[2] Hot Offset Occurrence Temperature (HOT)
According to the above-mentioned method.
[3] Toner Fluidity
According to the above-mentioned method.
[4] Volume Average Particle Diameter
The volume average primary particle diameter of resin particles was measured by using Coulter Counter AT II (manufactured by US Coulter Electronics Corp.).

Production Examples 61 to 68

Production Example 61

Production of Water-Based Dispersion Containing Resin Fine Particles (Q-1)

To a reaction container equipped with a stirring rod and a thermometer, styrene-modified phenol polyethylene oxide adduct (Eleminol HB-12, manufactured by Sanyo Chemical Industries, Ltd.) 48 part and bisphenol A diglycidyl ether (Epikote 828, manufactured by Yuka Shell Epoxy K. K.) 232 part were loaded and evenly dissolved. Water was dropwise added to the reaction container under stirring condition. When water 31 part was added, the reaction system was emulsified and turned to be opaque. Further, water 224 part was dropwise added to obtain an emulsion. After the system was heated to 70° C. system temperature, a solution obtained by dissolving ethylene diamine 20 part in water 446 part was dropwise added for 2 hours while the temperature was kept at 70° C. as it was. On completion of the titration, the reaction system was reacted and aged at 70° C. for 5 hours and 90° C. for 5 hours to obtain a water-based dispersion of amine-cured epoxy resin (Q-1).

Further, carboxymethyl cellulose sodium salt 2 part, an aqueous solution of 48.5% dodecyl diphenyl ether disulfonic acid sodium salt (Eleminol MON-7, manufactured by Sanyo Chemical Industries, Ltd.) 40 part and ion exchanged water 443 part were added to the above-mentioned water-based dispersion 18 part and evenly stirred to obtain a water-based dispersion containing the resin fine particles (Q-1).

The volume average particle diameter of the resin fine particles (Q-1) measured by laser type particle diameter distribution measurement apparatus LA-920 (manufactured by Horiba Seisakusho) was 0.81 μm. Also, a portion of the water-based dispersion containing the resin fine particles (Q-1) was centrifuged and further subjected to the centrifugation by adding water two times and dried to separate the resin component. Tg (measured by DSC, hereinafter the same for Tg) of the resin component was 120° C.

Production Example 62

Production of Water-Based Dispersion Containing Resin Fine Particles (Q-2)

To a reaction container equipped with a stirring rod and a thermometer, styrene-modified phenol polyethylene oxide adduct (Eleminol HB-12, manufactured by Sanyo Chemical Industries, Ltd.) 38 part, bisphenol A diglycidyl ether (Epikote 828, manufactured by Yuka Shell Epoxy K. K.) 232 part, and dioctyl phthalate 10 part were loaded and evenly dissolved. Water was dropwise added to the reaction container under stirring condition. When water 31 part was added, the reaction system was emulsified and turned to be opaque. Further, water 224 part was dropwise added to obtain an emulsion (1). After the system was heated to 70° C. system temperature, a solution obtained by dissolving ethylene diamine 20 part in water 446 part was dropwise added for 2 hours while the temperature was kept at 70° C. as it was. On completion of the titration, the reaction system was reacted and aged at 70° C. for 5 hours and 90° C. for 5 hours to obtain a water-based dispersion of amine-cured epoxy resin (Q-2).

Further, carboxymethyl cellulose sodium salt 2 part, an aqueous solution of 48.5% dodecyl diphenyl ether disulfonic acid sodium salt (Eleminol MON-7, manufactured by Sanyo Chemical Industries, Ltd.) 40 part and ion exchanged water 443 part were added to the above-mentioned water-based dispersion 18 part and evenly stirred to obtain a water-based dispersion containing the resin fine particles (Q-2).

The volume average particle diameter of the resin fine particles (Q-1) measured by laser type particle diameter distribution measurement apparatus LA-920 (manufactured by Horiba Seisakusho) was 0.75 μm. Also, a portion of the water-based dispersion containing the resin fine particles (Q-2) was centrifuged and further subjected to the centrifugation by adding water two times and dried to separate the resin component. Tg (measured by DSC, hereinafter the same for Tg) of the resin component was 114° C.

Production Example 63

Production of Water-Based Dispersion Containing Resin Fine Particles (Q-3)

To a reaction container equipped with a stirring rod and a thermometer, water 753 part, alkylallylsulfosuccinic acid sodium salt (Eleminol JS-2, manufactured by Sanyo Chemical Industries, Ltd.) 8 part, styrene 58 part, methacrylic acid 58 part, butyl acrylate 77 part, ammonium persulfate 1 part, and a surfactant (polyoxysorbitan monooleate) 9 part were loaded and stirred at 400 rpm for 15 minutes to obtain an opaque emulsion. After the reaction system was heated to 75° C. system temperature, reaction was carried out for 5 hours. Further, an aqueous 1% ammonium persulfate solution 30 part was added and the reaction system aged at 75° C. for 5 hours to obtain a water-based dispersion of vinyl resin (styrene-methacrylic acid-butyl acrylate-sodium alkylallylsulfosuccinate copolymer) (Q-3).

Further, carboxymethyl cellulose sodium salt 2 part, an aqueous solution of 48.5% of dodecyl diphenyl ether disulfonic acid sodium salt (Eleminol MON-7, manufactured by Sanyo Chemical Industries, Ltd.) 40 part, and ion exchange water 443 part were added to the above-mentioned water-based dispersion 15 part and evenly stirred to obtain a water-based medium containing the vinyl resin (Q-3).

The volume average particle diameter of the water-based dispersion measured by electrophoresis particle diameter distribution measurement apparatus ELS-8000 (manufactured by Otsuka Denshi) was 0.05 μm. Also, a portion of the water-based dispersion containing the resin fine particles (Q-3) was centrifuged and further subjected to the centrifugation by adding water two times and dried to separate the resin component. Tg was 75° C.

Production Example 64

Production of Water-Based Dispersion Containing Resin Fine Particles (Q-4)

To a reaction container equipped with a stirring rod and a thermometer, water 753 part, alkylallylsulfosuccinic acid sodium salt (Eleminol JS-2, manufactured by Sanyo Chemical Industries, Ltd.) 8 part, styrene 58 part, methacrylic acid 58 part, butyl acrylate 72 part, E-84 (salicylic acid type metal complex: manufactured by Client Chemical Industries Ltd.) 5 part, ammonium persulfate 1 part, and a surfactant (polyoxysorbitan monooleate) 9 part were loaded and stirred at 400 rpm for 15 minutes to obtain an opaque emulsion. After the reaction system was heated to 75° C. system temperature, reaction was carried out for 5 hours. Further, an aqueous 1% ammonium persulfate solution 30 part was added and the reaction system aged at 75° C. for 5 hours to obtain a water-based dispersion of vinyl resin (styrene-methacrylic acid-butyl acrylate-sodium alkylallylsulfosuccinate copolymer containing the salicylic acid metal complex) (Q-4).

Further, carboxymethyl cellulose sodium salt 2 part, an aqueous solution of 48.5% of dodecyl diphenyl ether disulfonic acid sodium salt (Eleminol MON-7, manufactured by Sanyo Chemical Industries, Ltd.) 40 part, and ion exchange water 443 part were added to the above-mentioned water-based dispersion 15 part and evenly stirred to obtain a water-based medium containing the vinyl resin (Q-4). The volume average particle diameter of the water-based dispersion measured by electrophoresis particle diameter distribution measurement apparatus ELS-8000 was 0.05 μm. Also, a portion of the water-based dispersion containing the resin fine particles (Q-4) was centrifuged and further subjected to the centrifugation by adding water two times and dried to separate the resin component. Tg was 80° C.

Production Example 65

Production of Curing Agent (β-1)

To a reaction container equipped with a stirring rod and a thermometer, ethylenediamine 50 part and MIBK 50 part were loaded and reacted at 50° C. for 5 hours. The obtained ketimine compound is used as a curing agent (β-1).

Production Example 66

Production of Curing Agent (β-2)

To a reaction container equipped with a stirring rod and a thermometer, isophorone diisocyanate 45 part and MEK 55 part were loaded and reacted at 50° C. for 5 hours. The obtained ketimine compound is used as a curing agent (β-2).

Production Example 66

Production of Colorant Dispersion Solution

Copper phthalocyanine 20 part by weight and colorant dispersion (Solsperse 28000: manufactured by Avecia K.K.) 4 part, and ethyl acetate 76 part were loaded to a beaker and stirred and evenly dispersed and then the copper phthalocyanine was micro-dispersed by a bead mill to obtain [Colorant dispersion]. The volume average particle diameter of the obtained [Colorant dispersion] measured by LA-920 was 0.3 μm.

Production Example 68

Production of Release Agent Dispersion

Paraffin wax 20 part and ethyl acetate 80 part were loaded to a beaker and stirred and evenly dispersed and then the paraffin wax was micro-dispersed by a bead mill to obtain [Release agent dispersion]. The volume average particle diameter of the obtained [Release agent dispersion] measured by LA-920 was 0.5 μm.

Examples 61 to 66 and Comparative Example 61 to 64

Example 61

Synthesis of Polyester (61)

The linear polyester (Aa-1) of Example 1 was synthesized and employed as polyester (61). Hydroxy value was 75 and acid value was 1.
[Synthesis of Polyurethane Resin (61)]
To the reaction tank same as that of Example 1, polyester (61) 68 part, isophorone diisocyanate 10 part, and ethyl acetate 78 part were loaded and reaction was carried out at 75° C. for 18 hours under nitrogen gas stream to obtain an ethyl acetate solution of polyurethane resin (61). The polyurethane resin (61) had 3300 of Mn, solid matter 50% in the polyurethane resin-containing ethyl acetate solution, and 2,400 mPa·s of viscosity.

[Synthesis of Polyester (62)]

The linear polyester (Aa-2) of Example 2 was synthesized and employed as polyester (62). Hydroxy value was 42 and acid value was 1.

[Production of Solvent Solution (p-1) of Resin (p)]

The polyester (62) 14 part, the ethyl acetate solution of polyurethane resin (61) 52 part, the [Colorant dispersion] obtained by Production Example 62 10 part, the [Release agent dispersion] obtained by Production Example 63 25 part, and ethyl acetate 25 part were mixed and evenly stirred to obtain solvent solution (p-1) of resin (p).

[Production of Resin Particles]

The solvent solution (p-1) of resin (p) 40 part was added to the water-based dispersion containing resin fine particles (Q-1) produced in Production Example 61 60 part and stirred at 12000 rpm for 3 minutes by TK type homomixer. Then, the mixed solution was transferred to a flask equipped with a stirring blade and a thermometer and heated by a hot bath at 40° C. under reduced pressure to remove ethyl acetate and obtain a water-based dispersion of resin particles. Next, the dispersion was filtered and separated particles were dried at 40° C. for 18 hours by an air circulation drying apparatus to obtain resin particles (61). The resin particles (61) had Tg of 65° C., 95 μm of particle diameter, and 0.0085 of volume average particle diameter ratio to the resin fine particles (Q-1).

Further, MEK oxime-blocked HDI 20 part was added to the resin particles (61) 100 part and the mixture was mixed by Henshel mixer for 30 minutes to obtain a coating composition (1).

Example 62

Synthesis of Isocyanate-Containing Prepolymer (α-1)

To the reaction tank same as that of Example 1, polyester (p-1) 31 part, isophorone diisocyanate 19 part, and ethyl acetate 50 part were loaded and reaction was carried out at 75° C. for 18 hours under nitrogen gas stream to obtain an ethyl acetate solution of isocyanate-containing prepolymer (α-1). The isocyanate-containing prepolymer (α-1) contains 50% of solid matter and 2.1% content of isocyanate.

[Production of Solvent Solution (p-2) of Resin (p)]

The solvent solution (p-2) of resin (p) was obtained in the same manner as Example 61, except that the ethyl acetate solution of isocyanate-containing prepolymer (α-1) 52 part was used in place of the ethyl acetate solution of polyurethane resin (1) 52 part and the curing agent (β-1) produced in Production Example 65 5.3 part was used.

[Production of Resin Particles]

Resin particles (62) and a coating composition (62) were obtained in the same manner as Example 61, except that the water-based dispersion containing the resin fine particles (Q-2) was used in place of the water-based dispersion containing the resin fine particles (Q-1) and solvent solution (p-2) was used in place of the solvent solution (p-1) of resin (p). The resin particles (62) had Tg of 70° C., 120 μm of particle diameter, and 0.0063 of volume average particle diameter ratio to the resin fine particles (Q-2).

Example 63

Synthesis of Styrene-Acrylic Copolymer

Ethyl acetate 160 part was loaded to a reaction container equipped with a cooling tube, a stirrer, and a nitrogen introduction tube and heated to 75° C. and successively, a mixed solution containing styrene 40 part, butyl methacrylate 120 part, acrylic acid 60 part, ethyl acetate 60 part, and azobis(isobutyronitrile) 0.3 part was dropwise added for 4 hours and further azobis(isobutyronitrile) 0.5 part was additionally added and the reaction system was aged at 75° C. for 8 hours to obtain a resin solution containing styrene-acryl copolymer with 4,200 of Mn, 0 of hydroxy value, 210 of acid value in 50% solid matter concentration.

[Production of Solvent Solution (p-3) of Resin (p)]

The solvent solution (p-3) of resin (p) was obtained in the same manner as Example 61, except that the resin solution containing styrene-acryl copolymer in 50% solid matter concentration 28 part was used in place of the polyester (62) 14 part, the ethyl acetate solution of isocyanate-containing prepolymer (α-1) 52 part was used in place of the ethyl acetate solution of polyurethane resin (61) 52 part, and the curing agent (β-1) produced in Production Example 65 5.3 part was used.

[Production of Resin Particles]

Resin particles (63) and a coating composition (63) were obtained in the same manner as Example 61, except that the water-based dispersion containing the resin fine particles (Q-2) was used in place of the water-based dispersion containing the resin fine particles (Q-1) and solvent solution (p-3) was used in place of the solvent solution (p-1) of resin (p). The resin particles (63) had Tg of 81° C., 142 μm of particle diameter, and 0.0057 of volume average particle diameter ratio to the resin fine particles (Q-1).

Example 64

Synthesis of Polyester (63)

The linear polyester (Aa-4) of Example 4 was synthesized and employed as polyester (63).

[Production of Solvent Solution of Resin (p-4)]

Polyester (63) 70 part, the ethyl acetate solution containing isocyanate-containing prepolymer (α-1) 30 part, the curing agent (β-2) produced in Production Example 66 1.8 part, [Colorant dispersion] produced in Production Example 67 25 part, [Release agent dispersion] produced in Production Example 68 50 part, and ethyl acetate 25 part were mixed and stirred evenly to obtain a solvent solution (p-4) of resin (p).

[Production of Resin Particles]

Resin particles (64) were obtained in the same manner as Example 61, except that the water-based dispersion containing the resin fine particles (Q-3) was used in place of the water-based dispersion containing the resin fine particles (Q-1) and solvent solution (p-4) was used in place of the solvent solution (p-1) of resin (p). The resin particles (64) had Tg of 48° C., 4.8 μm of particle diameter, and 0.010 of volume average particle diameter ratio to the resin fine particles (Q-3).

Further, the resin particles (64) 100 part were mixed with colloidal silica (Aerosil R972: manufactured by Nippon Aerosil Co., Ltd.) 0.5 part by a sample mill to obtain a toner composition (64).

Example 65

Synthesis of Polyester (64)

In a reaction container equipped with a cooling tube, a stirrer, and a nitrogen introduction tube, polycondensation reaction of bisphenol A-2 mole ethylene oxide adduct 570 part and terephthalic acid 217 part was carried out at 230° C.

and a normal pressure for 6 hours and a reduced pressure for 6 hours to obtain polyester having 2,600 of Mn, 48 of hydroxy value and 2 of acid value and then ring opening addition reaction of trimellitic acid anhydride 26 part with the polyester was carried out at 180° C. and a normal pressure for 2 hours to obtain carboxyl-terminated polyester (64) having 2,700 of Mn, 35 of hydroxy value, and 26 of acid value. The polyester (64) had Tg of 48° C.
[Production of Solvent Solution of Resin (p-5)]

The solvent solution (p-5) of resin (p) was obtained in the same manner as Example 64, except that the polyester (64) was used in place of the polyester (63).
[Production of Resin Particles]

Resin particles (65) and a coating composition (65) were obtained in the same manner as Example 64, except that the water-based dispersion containing the resin fine particles (Q-4) was used in place of the water-based dispersion containing the resin fine particles (Q-1) and solvent solution (p-5) was used in place of the solvent solution (p-4) of resin (p). The resin particles (65) had Tg of 48° C., 5.2 µm of particle diameter, and 0.01 of volume average particle diameter ratio to the resin fine particles (Q-4).

Example 66

Production of Solvent Solution of Resin (p-6)

The solvent solution (p-6) of resin (p) was obtained in the same manner as Example 64, except that the ethyl acetate solution of isocyanate-containing prepolymer (α-1) 30 part and the ethyl acetate solution of polyurethane resin (1) produced in Example 61 was used in place of the curing agent (β-2) produced in Production Example 66.
[Production of Resin Particles]

Resin particles (66) and a toner composition (66) were obtained in the same manner as Example 64, except that the water-based dispersion containing the resin fine particles (Q-4) was used in place of the water-based dispersion containing the resin fine particles (Q-1) and solvent solution (p-6) was used in place of the solvent solution (p-4) of resin (p). The resin particles (66) had Tg of 53° C., 5.0 µm of particle diameter, and 0.010 of volume average particle diameter ratio to the resin fine particles (Q-4).

Comparative Example 61

Synthesis of Polyester (65)

The linear polyester (Aa'-5) of Comparative Example 1 was synthesized and employed as comparative linear polyester (65).
[Synthesis of Polyester (66)]

The non-linear polyester (Ab'-5) of Comparative Example 1 was synthesized and employed as comparative linear polyester (66).
[Production of Solvent Solution of Resin]

The solvent solution (X-1) of comparative resin was obtained in the same manner as Example 61, except that polyester (65) was used in place of the polyester (62) and polyester (66) 26 part and ethyl acetate 26 part were used in place of the ethyl acetate solution of polyurethane resin (1) 52 part.
[Production of Resin Particles]

Resin particles (X1) and a coating composition (X1) were obtained in the same manner as Example 61, except that the solvent solution of the comparative resin (X-1) was used in place of the solvent solution (p-1) of the resin (p). The resin particles (X1) had Tg of 61° C., 88 µm of particle diameter, and 0.009 of volume average particle diameter ratio to the resin fine particles (Q-1).

Comparative Example 62

Synthesis of Polyester (67)

The linear polyester (Aa'-6) of Comparative Example 2 was synthesized and employed as comparative linear polyester (67).
[Production of Oil Type Mixed Solution]

The solvent solution (X-2) of comparative resin was obtained in the same manner as Example 64, except that polyester (67) was used in place of the polyester (63) of Example 64 and polyester (66) 15 part and ethyl acetate 15 part were used in place of the ethyl acetate solution of isocyanate-containing prepolymer (α-1) 30 part and the curing agent (β-2) produced in Production Example 66 1.8 part.
[Production of Resin Particles]

Resin particles (X2) and a toner composition (X2) were obtained in the same manner as Example 64, except that the solvent solution of the comparative resin (X-2) was used in place of the solvent solution (p-4) of the resin (p). The resin particles (X2) had Tg of 47° C., 5.5 µm of particle diameter, and 0.011 of volume average particle diameter ratio to the resin fine particles (Q-3).

Comparative Example 63

Synthesis of Polyester (p67)

The linear polyester (Aa'-7) of Comparative Example 3 was synthesized and employed as comparative linear polyester (P67). Since the polyester (P67) was not turned to be resin, it was not used for resin particle production.

Comparative Example 64

Synthesis of Polyester (68)

The linear polyester (Aa'-8) of Comparative Example 4 was synthesized and employed as comparative polyester (68).
[Synthesis of Polyester (69)]

The non-linear polyester (Ab'-8) of Comparative Example 4 was synthesized and employed as comparative polyester (69).
[Production of Oil Type Mixed Solution]

The solvent solution (X-3) of comparative resin was obtained in the same manner as Example 64, except that linear polyester (68) was used in place of the polyester (63) of Example 64 and polyester (69) was used in place of the ethyl acetate solution of isocyanate-containing prepolymer (α-1) 30 part and the curing agent (β-2) produced in Production Example 66 1.8 part.
[Production of Resin Particles]

Resin particles (X3) and a toner composition (X3) were obtained in the same manner as Example 64, except that the solvent solution of the comparative resin (X-3) was used in place of the solvent solution (p-4) of the resin (p). The resin particles (X3) had Tg of 51° C., 5.3 µm of particle diameter, and 0.009 of volume average particle diameter ratio to the resin fine particles (Q-3).

Evaluations were carried out by the following evaluation methods and the evaluation results are shown in Table 7.

[Evaluation Methods]
[1] Volume Average Particle Diameter

The volume average particle diameter of resin particles (61) to (63) and comparative resin particles (X1) obtained in Example 61 to 63 and Comparative Example 61 was measured by dispersing the particles and using Coulter Counter (Multisizer III manufactured by US Coulter Electronics Corp.).

[2] Leveling Property

Each of the coating compositions (61) to (63) and comparative coating composition (X1) obtained in Example 61 to 63 and Comparative Example 61 was applied in a coating thickness of 40 to 60 μm to a standardized plate of a zinc phosphate-treated steel plate manufactured by Nippon Test Panel Co., Ltd. by electrostatic coating using a commercialized corona charging spray gun and baked at 180° C. for 20 minutes and the surface smoothness was observed by eye observation and evaluated according to the following criteria:
⊚: smooth and glossy surface,
○: surface having slight roughness and gloss,
Δ: rough surface and no gloss, and
x: rough surface and trace of foams existing and no gloss.

[3] Thermal Storability

Each of the coating compositions was stored at 40° C. for 7 days and occurrence of melt adhesion was observed. The observation was carried out by sieving each stored coating composition 50 g was sieved by a standard sieve with 150 μm mesh by shaking for 15 minutes and the amount of resin particles remaining on the sieve was measured and the storability was evaluated based on the ratio of the amount according to the following criteria:
⊚: less than 0.2% of agglomerates,
○: less than 1% of agglomerates,
Δ: less than 2.0% of agglomerates, and
x: 2.0% or more of agglomerates.

[4] Adhesion Property (Cohesion)

Each of the coating compositions was applied in a coating thickness of 40 to 60 μm to a standardized plate of a zinc phosphate-treated steel plate manufactured by Nippon Test Panel Co., Ltd. by electrostatic coating using a commercialized corona charging spray gun and baked at 180° C. for 20 minutes and then the each coating was subjected to a shearing adhesion test according to a method standardized in JIS K6830. The adhesion property (Cohesion) was evaluated according to the following criteria:
○: Complete cohesive failure,
Δ: partial interfacial failure leaving traces of breakage, and
x: complete interfacial failure.

[5] Water-Proof Adhesion

Each of the coating compositions of Examples and Comparative Example was applied and baked in the above-mentioned manner and then each coating was immersed in hot water at 40° C. for 10 days. The longitudinal shear strength test was carried out according to a method standardized in JIS K6830. Evaluation criteria were same as those for the above-mentioned adhesion property (Cohesion).

TABLE 7

| Resin particle No. | Surface smoothness | Thermal storability | Adhesion property (Cohesion) | Water-proof adhesion | Volume average particle diameter (μm) |
|---|---|---|---|---|---|
| Resin particle (61) | ⊚ | ⊚ | ○ | ○ | 95 |

TABLE 7-continued

| Resin particle No. | Surface smoothness | Thermal storability | Adhesion property (Cohesion) | Water-proof adhesion | Volume average particle diameter (μm) |
|---|---|---|---|---|---|
| Resin particle (62) | ○ | ⊚ | ○ | Δ | 120 |
| Resin particle (63) | ⊚ | ○ | ○ | Δ | 142 |
| Comparative resin particle (X1) | X | Δ | Δ | X | 88 |

Evaluations were carried out by the following evaluation methods and the evaluation results are shown in Table 8.

[6] Minimum Fixing Temperature (MFT)
According to the above-mentioned method.
[7] Hot Offset Generating Temperature (HOT)
According to the above-mentioned method.
[8] Toner Fluidity
According to the above-mentioned method.
[9] Volume Average Particle Diameter
According to the above-mentioned method [1].

TABLE 8

| Resin particle No. | MFT (° C.) | HOT (° C.) | Toner fluidity | Volume average particle diameter (μm) |
|---|---|---|---|---|
| Resin particle (64) | 125 | 240 | ○Δ | 5.1 |
| Resin particle (65) | 125 | 240 | ○ | 5.0 |
| Resin particle (66) | 125 | 240 | ○ | 5.3 |
| Comparative resin particle (X2) | 135 | 230 | ΔX | 5.5 |
| Comparative resin particle (X3) | 140 | 240 | ○Δ | 5.8 |

INDUSTRIAL APPLICABILITY

A toner composition of the invention containing a polyester resin for a toner of the invention is excellent in the balance among the low temperature fixing property, hot offset resistance, and grindability and is useful for a toner for electrostatic image development and particularly for a color toner.

The toner of the sixth invention is excellent in the balance among the low temperature fixing property, hot offset resistance, and grindability and is useful for a toner for electrostatic image development and particularly for a color toner in terms of the luster and transparency.

The composite resin particles of the seventh and eighth inventions are highly useful for a powder coating, a resin for slush molding, a toner to be used for electrophotography, electrostatic recording, and electrostatic printing, a hot-melt adhesive, and other molding materials.

The invention claimed is:

1. A composite resin particle comprising a resin particle (P) comprising a resin (p) and an optional additive and a resin particle (Q) comprising a resin (q) and an optional additive and adhering to the surface of the resin particle (P), wherein the resin (p) comprising one or more kinds of polyester resins (p1) obtained by polycondensing a polyol component and a polycarboxylic acid component and the polyol component comprises 85 to 100% by mole of an aliphatic diol having 2 to 6 carbon atoms or 70 to 100% by mole of 1,2-propylene glycol and a tetrahydrofuran-soluble fraction of the resin(s) (p1) has a number average molecular weight of 1000 to 9500, or the resin (p) comprising a resin (p2) containing the resin (p1) as a component unit.

2. The resin particle according to claim 1, wherein (p1) or (p2) is one or more kinds of polyester resins having a polyol component having a molar average cohesive energy of $7.0 \times 10^4$ to $1.4 \times 10^5$ J and has a storage modulus in a range of $2.5 \times 10^3$ Pa to $5 \times 10^6$ Pa at 150° C.

3. The resin particle according to claim 1, wherein (p1) or (p2) is one or more kinds of polyester resins having a softening point in a range from 120° C. to 180° C. and a loss tangent of 0.9 or higher at a temperature from 130 to 200° C.

4. The resin particle according to claim 1, wherein the resin particle is obtained by forming resin particles (P) in a water-based dispersion containing resin fine particles (Q) comprising a resin (q) and an optional additive by dispersing the resin (p) and an optional additive, or dispersing their solvent solutions, or dispersing a precursor (p0) of the resin (p) and an optional additive, or dispersing their solvent solutions in the water-based dispersion containing resin fine particles (Q); and causing reaction of the precursor (p0) in the case the precursor (p0) or its solvent solution is used.

5. The resin particle according to claim 4, wherein the precursor (p0) has a component unit of the resin (p1) and comprises a reactive group-containing prepolymer ($\alpha$) and a curing agent ($\beta$).

6. The resin particle according to claim 1, wherein the additive include a colorant and based on necessity, one or more kinds of agents selected from the group consisting of a release agent, a charge control agent, and a fluidizing agent.

7. The resin particle according to claim 1, wherein the resin particle is for a resin for slush molding, a powder coating, an electrophotographic toner, an electrostatic recording toner, an electrostatic printing toner, or a hot-melt adhesive.

* * * * *